United States Patent
Murphy

(10) Patent No.: US 12,516,060 B2
(45) Date of Patent: Jan. 6, 2026

(54) SOLID FREEBASE FORMS OF 5-CHLORO-2-(4-((2-HYDROXY-2-METHYL-PROPYL)AMINO)PYRIDO[3,4-D]PYRIDAZIN-1-YL)PHENOL FOR INHIBITING NLRP3 AND USES THEREOF

(71) Applicant: Ventus Therapeutics U.S., Inc., Waltham, MA (US)

(72) Inventor: Luke J. Murphy, Dartmouth (CA)

(73) Assignee: Ventus Therapeutics U.S., Inc., Waltham, MA (US)

( * ) Notice: Subject to any disclaimer, the term of this patent is extended or adjusted under 35 U.S.C. 154(b) by 0 days.

(21) Appl. No.: 18/952,401

(22) Filed: Nov. 19, 2024

(65) Prior Publication Data

US 2025/0163060 A1     May 22, 2025

Related U.S. Application Data

(60) Provisional application No. 63/600,886, filed on Nov. 20, 2023.

(30) Foreign Application Priority Data

Jan. 16, 2024 (EP) ..................... 24152258

(51) Int. Cl.
    *C07D 471/04*     (2006.01)
    *A61K 31/5025*    (2006.01)

(52) U.S. Cl.
    CPC ........ *C07D 471/04* (2013.01); *A61K 31/5025* (2013.01); *C07B 2200/13* (2013.01)

(58) Field of Classification Search
    CPC .................................................. C07D 471/04
    USPC ....................................................... 544/238
    See application file for complete search history.

(56) References Cited

U.S. PATENT DOCUMENTS 11,319,319 B1 * 5/2022 Dorich .................... A61P 19/02

FOREIGN PATENT DOCUMENTS

| WO | 2023275366 | * | 7/2021 | |
|---|---|---|---|---|
| WO | 2022216971 A1 | | 10/2022 | |
| WO | WO-2023275366 A1 | * | 1/2023 | ........... A61K 31/502 |
| WO | 2024141534 A1 | | 7/2024 | |

OTHER PUBLICATIONS

Dobelin, "Validation of XRD phase quantification using semi-synthetic data", Powder Diffraction, Dec. 2020, vol. 35, No. 4, pp. 262-275.

Griffen et al., "Rapid quantification of low level polymorph content in a solid dose form using transmission Raman spectroscopy", Journal of Pharmaceutical and Biomedical Analysis, Sep. 2016, vol. 128, pp. 35-45.

Li et al., "Solid-state NMR spectroscopy in pharmaceutical sciences", TrAC Trends in Analytical Chemistry, Dec. 2020, vol. 135, Article No. 116152, pp. 1-20.

Li et al., "Therapeutic potential of MCC950, a specific inhibitor of NLRP3 inflammasome", European Journal of Pharmacology, Jun. 2022, vol. 928, 175091, pp. 1-9.

Nguyen et al., "Role of NLRP3 Inflammasome in Parkinson's Disease and Therapeutic Considerations", J Parkinsons Dis., Oct. 2022, vol. 12, No. 7, pp. 2117-2133.

Pallipurath et al., "Sulfamerazine: understanding the influence of slip-planes in polymorphic phase-transformation through X-ray crystallographic studies and ab initio lattice dynamics", Molecular Pharmaceutics, Aug. 2015, vol. 12, No. 10, pp. 3735-3748.

Su et al., "Recent Progress on the Discovery of NLRP3 Inhibitors and their Therapeutic Potential", Curr Med Chem, Jan. 2020, vol. 28, No. 3, pp. 569-582.

Wahyudi et al., "The crystal packing and slip plane analysis in mechanical properties improvement of mefenamic acid by cocrystallization with nicotinamide coformer", Communications in Science & Technology, 2020, vol. 5, No. 2, pp. 93-97.

Zahid et al., "Pharmacological Inhibitors of the NLRP3 Inflammasome", Front Immunol., Oct. 2019, vol. 10, Article No. 2538, pp. 1-10.

Haleblian, "Characterization of habits and crystalline modification of solids and their pharmaceutical applications", Journal of Pharmaceutical Sciences, Aug. 1975, vol. 64, No. 8, pp. 1269-1288.

Kazuhide et al., "Chemistry of Pharmaceutical Polymorphism and Crystallization", 2002, pp. 273, 278, 305-317.

* cited by examiner

*Primary Examiner* — Niloofar Rahmani
(74) *Attorney, Agent, or Firm* — Elizabeth A. Dingess-Hammond; Leon Y. Lum

(57) ABSTRACT

The present disclosure relates to solid state forms of Compound 1 freebase. The present disclosure also relates to processes for the preparation of the solid state forms, the pharmaceutical compositions comprising the forms, and the use thereof, e.g., in the treatment and prevention of disorders in which NLRP3 activity is implicated.

26 Claims, 34 Drawing Sheets

SOLID FREEBASE FORMS OF 5-CHLORO-2-(4-((2-HYDROXY-2-METHYL-PROPYL)AMINO)PYRIDO[3,4-D]PYRIDAZIN-1-YL)PHENOL FOR INHIBITING NLRP3 AND USES THEREOF

CROSS-REFERENCE TO RELATED APPLICATIONS

This application claims priority to U.S. Provisional Application 63/600,886, filed Nov. 20, 2023; the content of which is incorporated herein by reference; and This application claims priority to European Patent Application 24152258.0, filed Jan. 16, 2024; the content of which is incorporated herein by reference.

BACKGROUND

Innate immune responses are mediated by different types of receptors termed pattern-recognition receptors (PRRs). PRRs recognize the presence of pathogen-associated molecular patterns (PAMPs) and damage-associated molecular patterns (DAMPs). Once engaged these receptors trigger the activation of downstream inflammatory pathways that will help resolve injury. However, in many instances this activation can be uncontrolled and leads to disease.

The inflammasomes represent a class of PRRs that are crucial components of the innate immune response. Activation of the inflammasomes trigger a cascade of events that releases IL-1β, IL-18, and promotes an inflammatory form of cell death called pyroptosis induced by the activation of Gasdermin. Pyroptosis is a unique form of inflammatory cell death that leads to the release of not only cytokines but also other intracellular components that promote a broader immune response both of the innate and acquired immune system. Thus, inflammasome activation is a major regulatory of the inflammatory cascade.

NLRP3 is the most characterized inflammasome and has been shown to be critical in innate immunity and inflammatory responses. While several other NLR complexes, such as NLRC4, are activated under very specific circumstances, NLRP3 can be activated by numerous stimuli and should be seen as a sensor of intracellular homeostatic imbalance. Therefore, its precise functioning is essential. In addition to playing a role in host immune defense, dysregulation of NLRP3 has been linked to the pathogenesis of many inflammatory disorders. These include genetic diseases such as cryopyrin-associated periodic syndromes (CAPS) which is caused by gain-of-function mutations in the NLRP3 gene, as well as many prevalent neurologic and systemic diseases. Importantly, NLRP3 hyperactivation has been demonstrated pre-clinically to play a critical role in a plethora of inflammatory and degenerative diseases including, NASH, atherosclerosis and other cardiovascular diseases, Alzheimer's disease, Parkinson's disease, diabetes, gout, and numerous other autoinflammatory diseases. See, e.g., Li et al., *European Journal of Pharmacology* (2022) 928:175091; Nguyen et al., *Journal of Parkinson's Disease* (2022) 12:2117-2133; Su et al., *Current Medicinal Chemistry* (2021) 28:569-582; Zahid et al., *Frontiers in Immunology* (2019) 10:2538. Thus, there is an unmet need in the field to develop small molecules for modulating NLRP3 activity to treat various diseases and disorders.

SUMMARY

The present disclosure provides a solid state forms of Compound 1 freebase.

"Compound 1" is 5-chloro-2-(4-((2-hydroxy-2-methylpropyl)amino)pyrido[3,4-d]pyridazin-1-yl)phenol, having the structure:

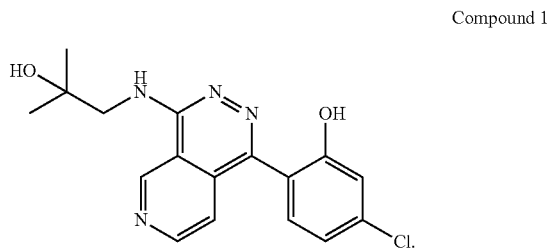 [SMILES: CC(C)(O)CNc1nnc(-c2ccc(Cl)cc2O)c2ccncc12]

Compound 1

Compound 1 is an orally bioavailable, potent and reversible small molecule inhibitor of NLRP3 being developed to treat inflammatory diseases. Compound 1 is described in Example 3 of PCT Application Publication No. WO 2022/216971 and U.S. Pat. No. 11,319,319 as Compound 82.

In some embodiments, the solid state form of Compound 1 freebase is the amorphous freebase.

In some embodiments, the solid state form of Compound 1 freebase is the crystalline form.

In some embodiments, the solid state form of Compound 1 freebase is crystalline Form V freebase.

In some embodiments, the solid state form of Compound 1 freebase is crystalline Form I freebase.

In some embodiments, the solid state form of Compound 1 freebase is crystalline Form II freebase.

In some embodiments, the solid state form of Compound 1 freebase is crystalline Form III freebase.

In some embodiments, the solid state form of Compound 1 freebase is crystalline Form IV freebase.

In some embodiments, provided is a composition comprising a mixture of Compound 1 freebase forms. In some embodiments, the composition is a pharmaceutical composition comprising a pharmaceutically acceptable carrier.

In some aspects, the present disclosure provides a pharmaceutical composition comprising a solid state form of Compound 1 freebase as described herein, and one or more pharmaceutically acceptable carriers.

In other aspects, provided is a method of treating or preventing a disease or disorder, the method comprising administering to a subject a form as described herein, or a composition as described herein.

In some aspects, the present disclosure provides a method of preparing a solid state form of Compound 1 freebase.

DEFINITIONS

Figure 1A:
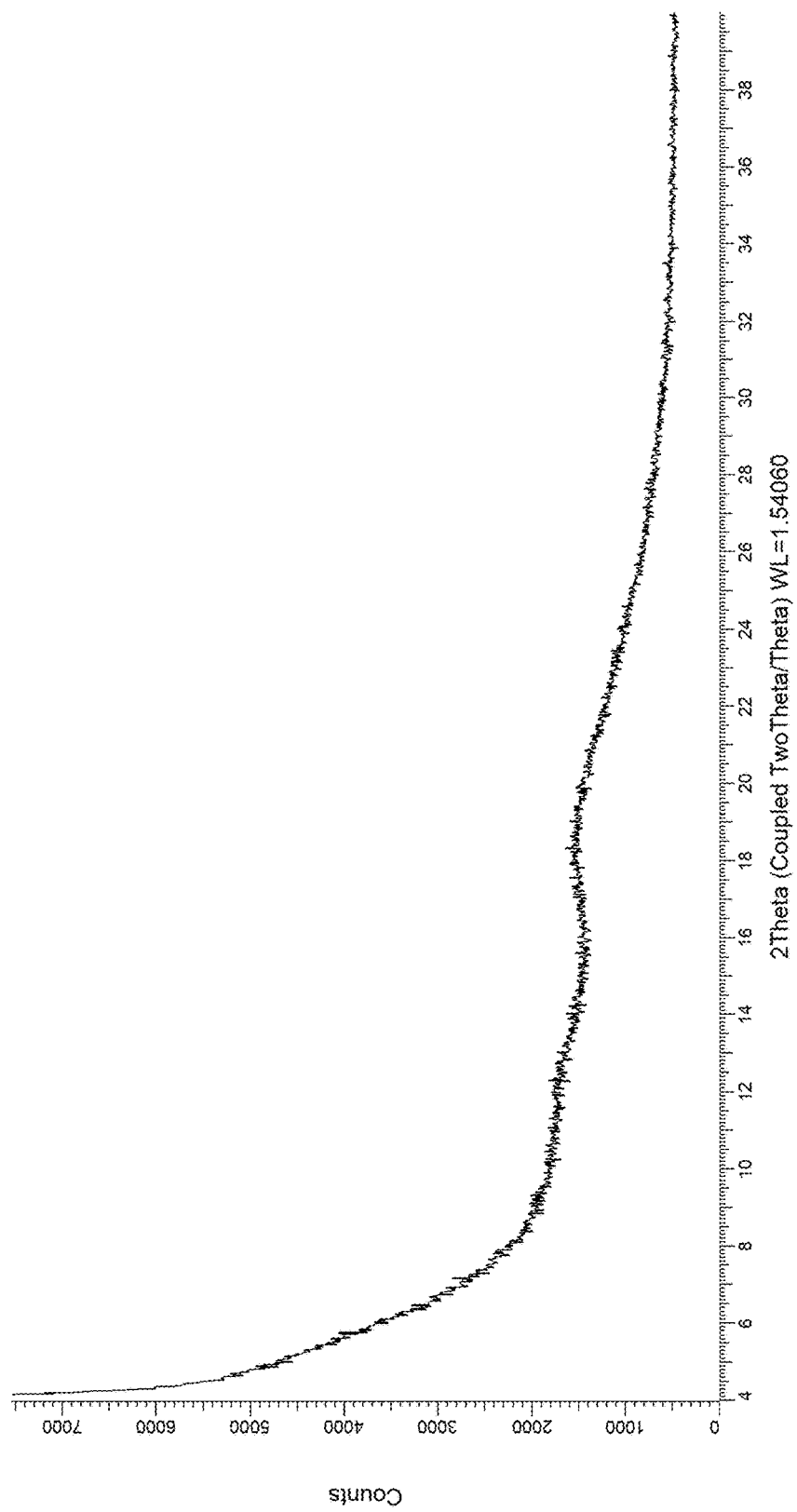
FIG. 1A depicts the XRPD of amorphous Compound 1 Freebase.

Unless otherwise stated, the following terms used in the specification and claims have the following meanings set out below.

Terms of degree such as "about," "substantially similar," and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

"Morphic purity level" refers to a determination by solid state NMR (ssNMR), vibrational (Raman) spectroscopy and/or X-ray Powder Diffraction (XRPD) of a given form's purity percentage level (w/w %) relative to other known solid state forms (e.g., crystalline forms, amorphous forms) of the same compound. See, for example, Mingyue et al., *TrAC Trends in Analytical Chemistry* (2021) 135:116152 (ss NMR); Griffen et al., *Journal of Pharmaceutical and Biomedical Analysis*, (2016) 128:35-45 (Raman); and Döbelin, *Powder Diffraction* (2020) 35(4), 262-275 (XRPD), for methods describing determining purity levels. A "morphic purity level" of 95% or greater is considered "substantially free" of other known solid state forms of the same compound.

"Pure-phase" refers to a qualitative assessment by XRPD of a given form, using Cu K alpha radiation when measured at 25° C., wherein characteristic non-overlapping signals associated with the other crystalline forms of that same compound are not observed by XRPD. A "morphic purity level" of 100% of a given form as determined by XRPD, using Cu K alpha radiation when measured at 25° C., and "pure-phase" form of that given form are used interchangeably herein.

The term "stable" refers to a given form that maintains its form over a period of time, e.g., at least one week at short-term stability study conditions (e.g., 75%±5% relative humidity (RH) at 40° C.±2° C.).

A "patient" or "subject" is used interchangeably herein, and refers to a mammal, e.g., a human, mouse, rat, guinea pig, dog, cat, horse, cow, pig, or non-human primate, such as a monkey, chimpanzee, baboon, or rhesus. In some embodiments, the patient or subject is human.

"Effective amount" or "therapeutically effective amount" are used interchangeably herein, and refer to an amount of a crystalline form of Compound 1 freebase sufficient to provide a therapeutic benefit in the treatment of a disease or disorder, or to delay or minimize one or more symptoms associated with the disease or disorder in a subject in need thereof. An effective amount can encompass an amount that improves overall therapy, reduces or avoids symptoms or causes of disease or disorder, or enhances the therapeutic efficacy of another therapeutic agent. The effective amount of a compound may vary depending on such factors as the desired biological endpoint, the pharmacokinetics of the compound, the disease being treated, the mode of administration, and the age, health, and condition of the subject.

"Disease" or "disorder" are used interchangeably herein.

"Treating," "treat," or "treatment" describes the management and care of a subject in need thereof, for the purpose of combating a disease or disorder in the subject and includes the administration of a solid state form of Compound 1 freebase, as described herein, to alleviate the symptoms or complications of a disease or disorder, or to eliminate the disease or disorder. The term "treat" can also include treatment of a cell in vitro or treatment of an animal model (in vivo). It is to be appreciated that references to "treating" or "treatment" include the alleviation of established symptoms of a disease or disorder in a subject in need thereof, and therefore includes: (1) delaying the appearance of at least one clinical or subclinical symptom of the disease or disorder developing in a subject that is afflicted with the disease or disorder, (2) arresting, reducing or delaying the continued development of the disease or a relapse thereof in a subject (e.g., in case of maintenance treatment) or at least one clinical or subclinical symptom thereof, or (3) relieving or attenuating the disease in a subject, i.e., causing regression of the disease or disorder or at least one of its clinical or subclinical symptoms.

As used herein, the term "preventing," "prevent," or "protecting against" describes the management and care of a subject in need thereof that may have or has a predisposition for the disease or disorder but has not yet experienced or displayed clinical or subclinical symptoms of the disease or disorder, for the purpose of preventing the appearance of at least one clinical or subclinical symptom of the disease or disorder in the subject, and includes the administration of a solid state form of Compound 1 freebase, as described herein.

"Inhibition," "inhibiting," "inhibit" and "inhibitor," and the like, refer to the ability of a solid state form of Compound 1 freebase, to reduce, slow, halt or prevent activity of a particular biological process (e.g., NLRP3 activity) in a cell relative to vehicle.

The phrase "at least one" refers to one instance or more than one instance.

The articles "a" and "an" are used in this disclosure to refer to one or more than one (i.e., to at least one) of the grammatical object of the article.

The term "and/or" is used in this disclosure to mean either "and" or "or" unless indicated otherwise.

"Solid state form" refers to crystalline and amorphous forms.

The term "freebase" of Compound 1 refers to a neutral non-ionized form of the compound. It is understood that the freebase is not a salt.

The term "solvate" of Compound 1 refers to a crystalline form with at least one stoichiometric or non-stoichiometric amount of a solvent (non-water molecule) as a part of the unit cell within the crystalline lattice. Being "not-solvated" and being not a "solvate" are used interchangeably, and refer to a form free of solvent molecule(s).

The term "hydrate" of Compound 1 refers to a crystalline form with at least one stoichiometric or non-stoichiometric amount of a water molecule as a part of the unit cell within the crystalline lattice. "Anhydrous" and being not a "hydrate" are used interchangeably and refer to a form free of water molecule(s).

"Slightly hygroscopic" means an increase in mass wt. % from 0.2 to <2 wt. %, and "hygroscopic" means an increase in mass wt. % of 2 wt. % to <15%, each related to an increase in water content as determined by Dynamic Vapor Sorption (DVS). "Deliquescent" means sufficient water is absorbed to form a liquid. A mass wt. % of <0.2 is considered "non-hygroscopic."

DETAILED DESCRIPTION (i) Compound 1 Freebase

The present disclosure provides solid state forms of Compound 1 freebase.

"Compound 1" as used herein, refers to a compound with the structure shown below:

(Compound 1)

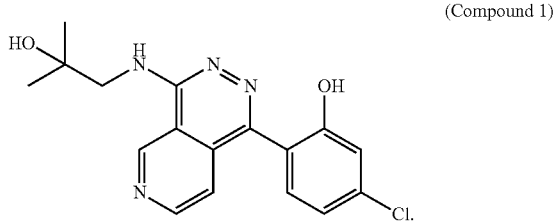 [SMILES: CC(C)(O)CNc1nnc(-c2ccc(Cl)cc2O)c2ccncc12]

also referred to herein as 5-chloro-2-(4-((2-hydroxy-2-methylpropyl)amino)pyrido[3,4-d]pyridazin-1-yl)phenol. Compound 1 is described in Example 3 of PCT Application Publication No. WO 2022/216971 and U.S. Pat. No. 11,319,319.

In some aspects, the solid state form is a crystalline form of Compound 1 freebase.

In some aspects, the solid state form is an amorphous form of Compound 1 freebase.

In some embodiments, the solid state form of Compound 1 is crystalline Form V freebase.

In some embodiments, the solid state form of Compound 1 is crystalline Form I freebase.

In some embodiments, the solid state form of Compound 1 is crystalline Form II freebase.

In some embodiments, the solid state form of Compound 1 is crystalline Form III freebase.

In some embodiments, the solid state form of Compound 1 is crystalline Form IV freebase.

In some embodiments, the solid state form of Compound 1 is crystalline Pattern A freebase.

In some embodiments, the solid state form of Compound 1 is crystalline Pattern B freebase.

In some embodiments, the solid state form of Compound 1 is crystalline Pattern C freebase.

In some embodiments, Compound 1 is amorphous Compound 1 freebase.

In some embodiments, the solid state form is a mixture of one or more solid state forms of Compound 1 selected from amorphous freebase, Form I freebase, Form II freebase, Form III freebase, Form IV freebase, and Form V freebase.

In some embodiments, the solid state form is substantially free of amorphous Compound 1 freebase.

In some embodiments, the solid state form is substantially free of crystalline Pattern A freebase.

In some embodiments, the solid state form is substantially free of crystalline Pattern B freebase.

In some embodiments, the solid state form is substantially free of crystalline Pattern C freebase.

In some embodiments, the solid state form is a stable form.

In some embodiments, the solid state form is a pure-phase form.

(a) X-Ray Powder Diffraction (XRPD) Characterizations of Crystalline Forms (i) Crystalline Form V Freebase In some embodiments, the crystalline form of Compound 1 freebase is crystalline Form V freebase. In some embodiments, crystalline freebase Form V freebase is characterized by an XRPD pattern as defined in the present section (a)(i).

In some embodiments, the crystalline form of Compound 1 freebase is characterized by an XRPD pattern comprising a signal at 6.8±0.2 °2θ, using Cu K alpha radiation when measured at 25° C.

In some embodiments, the crystalline form of Compound 1 freebase is characterized by an XRPD pattern comprising a signal at 11.7±0.2 °2θ, using Cu K alpha radiation when measured at 25° C.

In some embodiments, the crystalline form of Compound 1 freebase is characterized by an XRPD pattern comprising signals at 6.8±0.2 and 11.7±0.2 °2θ, using Cu K alpha radiation when measured at 25° C.

In some embodiments, the crystalline form of Compound 1 freebase is characterized by an XRPD pattern comprising signals at 6.8±0.5, 18.9±0.5, and 20.5±0.5 °2θ (e.g., 6.8±0.2, 18.9±0.2, and 20.5±0.2 °2θ (e.g., 6.8±0.1, 18.9±0.1, and 20.5±0.1 °2θ (e.g., 6.8, 18.9, and 20.5 °2θ))), using Cu K alpha radiation when measured at 25° C.

In some embodiments, the crystalline form of Compound 1 freebase is characterized by an XRPD pattern comprising signals at 6.8±0.5, 18.9±0.5, and 22.9±0.5 °2θ, e.g., 6.8±0.2, 18.9±0.2, and 22.9±0.2 °2θ, e.g., 6.8±0.1, 18.9±0.1, and 22.9±0.1 °2θ, e.g., 6.8, 18.9, and 22.9 °2θ, using Cu K alpha radiation when measured at 25° C.

In some embodiments, the crystalline form of Compound 1 freebase is characterized by an XRPD pattern comprising signals at 6.8±0.5, 20.5±0.5, and 22.9±0.5 °2θ (e.g., 6.8±0.2, 20.5±0.2, and 22.9±0.2 °2θ (e.g., 6.8±0.1, 20.5±0.1, and 22.9±0.1 °2θ (e.g., 6.8, 20.5, and 22.9 °2θ))), using Cu K alpha radiation when measured at 25° C.

In some embodiments, the crystalline form of Compound 1 freebase is characterized by an XRPD pattern comprising signals at 6.8±0.5, 18.9±0.5, 20.5±0.5, and 22.9±0.5 °2θ, e.g., 6.8±0.2, 18.9±0.2, 20.5±0.2, and 22.9±0.2 °2θ, e.g., 6.8±0.1, 18.9±0.1, 20.5±0.1, and 22.9±0.1 °2θ, e.g., 6.8, 18.9, 20.5, and 22.9 °2θ, using Cu K alpha radiation when measured at 25° C.

In some embodiments, the crystalline form of Compound 1 freebase is characterized by an XRPD pattern comprising signals at 11.7±0.5, 18.9±0.5, and 20.5±0.5 °2θ (e.g., 11.7±0.2, 18.9±0.2, and 20.5±0.2 °2θ (e.g., 11.7±0.1, 18.9±0.1, and 20.5±0.1 °2θ (e.g., 11.7, 18.9, and 20.5 °2θ))), using Cu K alpha radiation when measured at 25° C.

In some embodiments, the crystalline form of Compound 1 freebase is characterized by an XRPD pattern comprising signals at 11.7±0.5, 18.9±0.5, and 22.9±0.5 °2θ, e.g., 11.7±0.2, 18.9±0.2, and 22.9±0.2 °2θ, e.g., 11.7±0.1, 18.9±0.1, and 22.9±0.1 °2θ, e.g., 11.7, 18.9, and 22.9 °2θ, using Cu K alpha radiation when measured at 25° C.

In some embodiments, the crystalline form of Compound 1 freebase is characterized by an XRPD pattern comprising signals at 11.7±0.5, 20.5±0.5, and 22.9±0.5 °2θ (e.g., 11.7±0.2, 20.5±0.2, and 22.9±0.2 °2θ (e.g., 11.7±0.1, 20.5±0.1, and 22.9±0.1 °2θ (e.g., 11.7, 20.5, and 22.9 °2θ))), using Cu K alpha radiation when measured at 25° C.

In some embodiments, the crystalline form of Compound 1 freebase is characterized by an XRPD pattern comprising signals at 11.7±0.5, 18.9±0.5, 20.5±0.5, and 22.9±0.5 °2θ, e.g., 11.7±0.2, 18.9±0.2, 20.5±0.2, and 22.9±0.2 °2θ, e.g., 11.7±0.1, 18.9±0.1, 20.5±0.1, and 22.9±0.1 °2θ, e.g., 11.7, 18.9, 20.5, and 22.9 °2θ, using Cu K alpha radiation when measured at 25° C.

In some embodiments, the crystalline form of Compound 1 freebase is characterized by an XRPD pattern comprising signals at 6.8±0.5, 11.7±0.5, 18.9±0.5, 20.5±0.5, and 22.9±0.5 °2θ (e.g., 6.8±0.2, 11.7±0.2, 18.9±0.2, 20.5±0.2, and 22.9±0.2 °2θ (e.g., 6.8±0.1, 11.7±0.1, 18.9±0.1, 20.5±0.1, and 22.9±0.1 °2θ (e.g., 6.8, 11.7, 18.9, 20.5, and 22.9 °2θ))), using Cu K alpha radiation when measured at 25° C.

In some embodiments, the crystalline form of Compound 1 freebase is characterized by an XRPD pattern comprising signals at 6.8±0.2, 11.7±0.2, 18.9±0.2, 20.5±0.2, 22.9±0.2 °2θ using Cu K alpha radiation when measured at 25° C.

In some embodiments, the crystalline form of Compound 1 freebase is characterized by an XRPD pattern comprising signals at 6.8±0.5, 11.7±0.5, 18.9±0.5, 20.5±0.5, 22.9±0.5, and 23.8±0.5 °2θ (e.g., 6.8±0.2, 11.7±0.2, 18.9±0.2, 20.5±0.2, 22.9±0.2, and 23.8±0.2 °2θ (e.g., 6.8±0.1, 11.7±0.1, 18.9±0.1, 20.5±0.1, 22.9±0.1, and 23.8±0.1 °2θ (e.g., 6.8, 11.7, 18.9, 20.5, 22.9, and 23.8 °2θ))), using Cu K alpha radiation when measured at 25° C.

In some embodiments, the crystalline form of Compound 1 freebase is characterized by an XRPD pattern comprising signals at 6.8±0.5, 11.7±0.5, 18.9±0.5, 20.5±0.5, 22.9±0.5, and 26.5±0.5 °2θ, e.g., 6.8±0.2, 11.7±0.2, 18.9±0.2, 20.5±0.2, 22.9±0.2, and 26.5±0.2 °2θ, e.g., 6.8±0.1, 11.7±0.1, 18.9±0.1, 20.5±0.1, 22.9±0.1, and 26.5±0.1 °2θ, e.g., 6.8, 11.7, 18.9, 20.5, 22.9, and 26.5 °2θ, using Cu K alpha radiation when measured at 25° C.

In some embodiments, the crystalline form of Compound 1 freebase is characterized by an XRPD pattern comprising signals at 6.8±0.5, 11.7±0.5, 18.9±0.5, 20.5±0.5, 22.9±0.5, 23.8±0.5, and 26.5±0.5 °2θ (e.g., 6.8±0.2, 11.7±0.2, 18.9±0.2, 20.5±0.2, 22.9±0.2, 23.8±0.2, and 26.5±0.2 °2θ (e.g., 6.8±0.1, 11.7±0.1, 18.9±0.1, 20.5±0.1, 22.9±0.1, 23.8±0.1, and 26.5±0.1 °2θ (e.g., 6.8, 11.7, 18.9, 20.5, 22.9, 23.8, and 26.5 °2θ))), using Cu K alpha radiation when measured at 25° C.

In some embodiments, the crystalline form of Compound 1 freebase is characterized by an XRPD pattern comprising signals at 6.8±0.2, 11.7±0.2, 18.9±0.2, 20.5±0.2, 22.9±0.2, 23.8±0.2, and 26.5±0.2 °2θ using Cu K alpha radiation when measured at 25° C.

In some embodiments, the crystalline form of Compound 1 freebase is characterized by an XRPD pattern comprising signals at 6.8±0.2, 11.7±0.2, 18.9±0.2, 20.5±0.2, 22.9±0.2, 23.8±0.2, and 26.5±0.2 °2θ, using Cu K alpha radiation when measured at 25° C., and further comprises signal(s) at one or more of 11.8±0.2, 13.7±0.2, 17.0±0.2, 19.6±0.2, 22.2±0.2, 22.5±0.2, 23.9±0.2, 25.4±0.2, 29.2±0.2, and 29.6±0.2 °2θ, using Cu K alpha radiation when measured at 25° C.

In some embodiments, the crystalline form of Compound 1 freebase is characterized by an XRPD pattern comprising signals at 26.5±0.5 °2θ, such as 6.8±0.2, 11.7±0.2, 18.9±0.2, 20.5±0.2, 22.9±0.2, 23.8±0.2, and 26.5±0.2 °2θ, using Cu K alpha radiation when measured at 25° C., and further comprises signals at two or more of 11.8±0.2, 13.7±0.2, 17.0±0.2, 19.6±0.2, 22.2±0.2, 22.5±0.2, 23.9±0.2, 25.4±0.2, 29.2±0.2, and 29.6±0.2 °2θ, using Cu K alpha radiation when measured at 25° C.

In some embodiments, the crystalline form of Compound 1 freebase is characterized by an XRPD pattern comprising signals at 26.5±0.5 °2θ, such as 6.8±0.2, 11.7±0.2, 18.9±0.2, 20.5±0.2, 22.9±0.2, 23.8±0.2, and 26.5±0.2 °2θ, using Cu K alpha radiation when measured at 25° C., and further comprises signals at three or more of 11.8±0.2, 13.7±0.2, 17.0±0.2, 19.6±0.2, 22.2±0.2, 22.5±0.2, 23.9±0.2, 25.4±0.2, 29.2±0.2, and 29.6±0.2 °2θ, using Cu K alpha radiation when measured at 25° C.

In some embodiments, the crystalline form of Compound 1 freebase is characterized by an XRPD pattern comprising signals at 26.5±0.5 °2θ, such as 6.8±0.2, 11.7±0.2, 18.9±0.2, 20.5±0.2, 22.9±0.2, 23.8±0.2, and 26.5±0.2 °2θ, using Cu K alpha radiation when measured at 25° C., and further comprises signals at four or more of 11.8±0.2, 13.7±0.2, 17.0±0.2, 19.6±0.2, 22.2±0.2, 22.5±0.2, 23.9±0.2, 25.4±0.2, 29.2±0.2, and 29.6±0.2 °2θ, using Cu K alpha radiation when measured at 25° C. M.

In some embodiments, the crystalline form of Compound 1 freebase is characterized by an XRPD pattern comprising signals at 6.8±0.5, 11.7±0.5, 18.9±0.5, 20.5±0.5, 22.9±0.5, 23.8±0.5, 23.9±0.5, and 26.5±0.5 °2θ (e.g., 6.8±0.2, 11.7±0.2, 18.9±0.2, 20.5±0.2, 22.9±0.2, 23.8±0.2, 23.9±0.2, and 26.5±0.2 °2θ (e.g., 6.8±0.1, 11.7±0.1, 18.9±0.1, 20.5±0.1, 22.9±0.1, 23.8±0.1, 23.9±0.1, and 26.5±0.1 °2θ (e.g., 6.8, 11.7, 18.9, 20.5, 22.9, 23.8, 23.9, and 26.5 °2θ))), using Cu K alpha radiation when measured at 25° C.

In some embodiments, the crystalline form of Compound 1 freebase is characterized by an XRPD pattern comprising signals at 6.8±0.5, 11.7±0.5, 11.8±0.5, 13.7±0.5, 17.0±0.5, 18.9±0.5, 19.6±0.5, 20.5±0.5, 22.2±0.5, 22.5±0.5, 22.9±0.5, 23.8±0.5, 23.9±0.5, 25.4±0.5, 26.5±0.5, 29.2±0.5, and 29.6±0.5 °2θ (e.g., 6.8±0.2, 11.7±0.2, 11.8±0.2, 13.7±0.2, 17.0±0.2, 18.9±0.2, 19.6±0.2, 20.5±0.2, 22.2±0.2, 22.5±0.2, 22.9±0.2, 23.8±0.2, 23.9±0.2, 25.4±0.2, 26.5±0.2, 29.2±0.2, and 29.6±0.2 °2θ (e.g., 6.8±0.1, 11.7±0.1, 11.8±0.1, 13.7±0.1, 17.0±0.1, 18.9±0.1, 19.6±0.1, 20.5±0.1, 22.2±0.1, 22.5±0.1, 22.9±0.1, 23.8±0.1, 23.9±0.1, 25.4±0.1, 26.5±0.1, 29.2±0.1, and 29.6±0.1 °2θ (e.g., 6.8, 11.7, 11.8, 13.7, 17.0, 18.9, 19.6, 20.5, 22.2, 22.5, 22.9, 23.8, 23.9, 25.4, 26.5, 29.2, and 29.6 °2θ))), using Cu K alpha radiation when measured at 25° C.

In some embodiments, the crystalline form of Compound 1 freebase is characterized by an XRPD pattern having at least one signal selected from 6.8±0.5, 18.9±0.5, and 20.5±0.5 °2θ (e.g., 6.8±0.2, 18.9±0.2, and 20.5±0.2 °2θ

(e.g., 6.8±0.1, 18.9±0.1, and 20.5±0.1 °2θ (e.g., 6.8, 18.9, and 20.5 °2θ))), using Cu K alpha radiation when measured at 25° C.

In some embodiments, the crystalline form of Compound 1 freebase is characterized by an XRPD pattern having at least one signal selected from 6.8±0.5, 20.5±0.5, and 22.9±0.5 °2θ (e.g., 6.8±0.2, 20.5±0.2, and 22.9±0.2 °2θ (e.g., 6.8±0.1, 20.5±0.1, and 22.9±0.1 °2θ (e.g., 6.8, 20.5, and 22.9 °2θ))), using Cu K alpha radiation when measured at 25° C.

In some embodiments, the crystalline form of Compound 1 freebase is characterized by an XRPD pattern having at least one signal selected from 11.7±0.5, 18.9±0.5, and 20.5±0.5 °2θ (e.g., 11.7±0.2, 18.9±0.2, and 20.5±0.2 °2θ (e.g., 11.7±0.1, 18.9±0.1, and 20.5±0.1 °2θ (e.g., 11.7, 18.9, and 20.5 °2θ))), using Cu K alpha radiation when measured at 25° C.

In some embodiments, the crystalline form of Compound 1 freebase is characterized by an XRPD pattern having at least one signal selected from 11.7±0.5, 20.5±0.5, and 22.9±0.5 °2θ (e.g., 11.7±0.2, 20.5±0.2, and 22.9±0.2 °2θ (e.g., 11.7±0.1, 20.5±0.1, and 22.9±0.1 °2θ (e.g., 11.7, 20.5, and 22.9 °2θ))), using Cu K alpha radiation when measured at 25° C.

In some embodiments, the crystalline form of Compound 1 freebase is characterized by an XRPD pattern having at least two signal selected from 6.8±0.5, 11.7±0.5, 18.9±0.5, 20.5±0.5, and 22.9±0.5 °2θ (e.g., 6.8±0.2, 11.7±0.2, 18.9±0.2, 20.5±0.2, and 22.9±0.2 °2θ (e.g., 6.8±0.1, 11.7±0.1, 18.9±0.1, 20.5±0.1, and 22.9±0.1 °2θ (e.g., 6.8, 11.7, 18.9, 20.5, and 22.9 °2θ))), using Cu K alpha radiation when measured at 25° C.

In some embodiments, the crystalline form of Compound 1 freebase is characterized by an XRPD pattern having at least three signals selected from 6.8±0.5, 11.7±0.5, 18.9±0.5, 20.5±0.5, and 22.9±0.5 °2θ (e.g., 6.8±0.2, 11.7±0.2, 18.9±0.2, 20.5±0.2, and 22.9±0.2 °2θ (e.g., 6.8±0.1, 11.7±0.1, 18.9±0.1, 20.5±0.1, and 22.9±0.1 °2θ (e.g., 6.8, 11.7, 18.9, 20.5, and 22.9 °2θ))), using Cu K alpha radiation when measured at 25° C.

In some embodiments, the crystalline form of Compound 1 freebase is characterized by an XRPD pattern having at least four signals selected from 6.8±0.5, 11.7±0.5, 18.9±0.5, 20.5±0.5, and 22.9±0.5 °2θ (e.g., 6.8±0.2, 11.7±0.2, 18.9±0.2, 20.5±0.2, and 22.9±0.2 °2θ (e.g., 6.8±0.1, 11.7±0.1, 18.9±0.1, 20.5±0.1, and 22.9±0.1 °2θ (e.g., 6.8, 11.7, 18.9, 20.5, and 22.9 °2θ))), using Cu K alpha radiation when measured at 25° C.

In some embodiments, the crystalline form of Compound 1 freebase is characterized by an XRPD pattern having at least five signals selected from 6.8±0.5, 11.7±0.5, 18.9±0.5, 20.5±0.5, 22.9±0.5, and 23.8±0.5 °2θ (e.g., 6.8±0.2, 11.7±0.2, 18.9±0.2, 20.5±0.2, 22.9±0.2, and 23.8±0.2 °2θ (e.g., 6.8±0.1, 11.7±0.1, 18.9±0.1, 20.5±0.1, 22.9±0.1, and 23.8±0.1 °2θ (e.g., 6.8, 11.7, 18.9, 20.5, 22.9, and 23.8 °2θ))), using Cu K alpha radiation when measured at 25° C.

In some embodiments, the crystalline form of Compound 1 freebase is characterized by an XRPD pattern having at least five signals selected from 6.8±0.5, 11.7±0.5, 18.9±0.5, 20.5±0.5, 22.9±0.5, 23.8±0.5, and 26.5±0.5 °2θ (e.g., 6.8±0.2, 11.7±0.2, 18.9±0.2, 20.5±0.2, 22.9±0.2, 23.8±0.2, and 26.5±0.2 °2θ (e.g., 6.8±0.1, 11.7±0.1, 18.9±0.1, 20.5±0.1, 22.9±0.1, 23.8±0.1, and 26.5±0.1 °2θ (e.g., 6.8, 11.7, 18.9, 20.5, 22.9, 23.8, and 26.5 °2θ))), using Cu K alpha radiation when measured at 25° C.

In some embodiments, the crystalline form of Compound 1 freebase is characterized by an XRPD pattern having at least five signals selected from 6.8±0.5, 11.7±0.5, 18.9±0.5, 20.5±0.5, 22.9±0.5, 23.8±0.5, 23.9±0.5, and 26.5±0.5 °2θ (e.g., 6.8±0.2, 11.7±0.2, 18.9±0.2, 20.5±0.2, 22.9±0.2, 23.8±0.2, 23.9±0.2, and 26.5±0.2 °2θ (e.g., 6.8±0.1, 11.7±0.1, 18.9±0.1, 20.5±0.1, 22.9±0.1, 23.8±0.1, 23.9±0.1, and 26.5±0.1 °2θ (e.g., 6.8, 11.7, 18.9, 20.5, 22.9, 23.8, 23.9, and 26.5 °2θ))) using Cu K alpha radiation when measured at 25° C.

In some embodiments, the crystalline form of Compound 1 freebase is characterized by an XRPD pattern having at least one X-ray powder diffraction signal at 6.8±0.5, 11.7±0.5, 11.8±0.5, 13.7±0.5, 17.0±0.5, 18.9±0.5, 19.6±0.5, 20.5±0.5, 22.2±0.5, 22.5±0.5, 22.9±0.5, 23.8±0.5, 23.9±0.5, 25.4±0.5, 26.5±0.5, 29.2±0.5, and 29.6±0.5 °2θ (e.g., 6.8±0.2, 11.7±0.2, 11.8±0.2, 13.7±0.2, 17.0±0.2, 18.9±0.2, 19.6±0.2, 20.5±0.2, 22.2±0.2, 22.5±0.2, 22.9±0.2, 23.8±0.2, 23.9±0.2, 25.4±0.2, 26.5±0.2, 29.2±0.2, and 29.6±0.2 °2θ (e.g., 6.8±0.1, 11.7±0.1, 11.8±0.1, 13.7±0.1, 17.0±0.1, 18.9±0.1, 19.6±0.1, 20.5±0.1, 22.2±0.1, 22.5±0.1, 22.9±0.1, 23.8±0.1, 23.9±0.1, 25.4±0.1, 26.5±0.1, 29.2±0.1, and 29.6±0.1 °2θ (e.g., 6.8, 11.7, 11.8, 13.7, 17.0, 18.9, 19.6, 20.5, 22.2, 22.5, 22.9, 23.8, 23.9, 25.4, 26.5, 29.2, and 29.6 °2θ))), using Cu K alpha radiation when measured at 25° C.

In some embodiments, the crystalline form of Compound 1 freebase is characterized by an XRPD pattern having at least one X-ray powder diffraction signal at 6.8±0.2, 11.7±0.2, 13.7±0.2, 17.0±0.2, 18.9±0.2, 19.6±0.2, 20.5±0.2, 22.2±0.2, 22.5±0.2, 22.9±0.2, 23.8±0.2, 23.9±0.2, 25.4±0.2, 26.5±0.2, 29.2±0.2, and 29.6±0.2 °2θ, using Cu K alpha radiation when measured at 25° C.

In some embodiments, the crystalline form of Compound 1 freebase is characterized by an XRPD pattern comprising signals at 18.9±0.5, 20.5±0.5, and 22.9±0.5 °2θ, e.g., 18.9±0.2, 20.5±0.2, and 22.9±0.2 °2θ, e.g., 18.9±0.1, 20.5±0.1, and 22.9±0.1 °2θ, e.g., 18.9, 20.5, and 22.9 °2θ, using Cu K alpha radiation when measured at 25° C.

In some embodiments, the crystalline form of Compound 1 freebase is characterized by an XRPD pattern comprising signals at 18.9±0.5, 20.5±0.5, 22.9±0.5, 23.8±0.5, 23.9±0.5, and 26.5±0.5 °2θ (e.g., 18.9±0.2, 20.5±0.2, 22.9±0.2, 23.8±0.2, 23.9±0.2, and 26.5±0.2 °2θ (e.g., 18.9±0.1, 20.5±0.1, 22.9±0.1, 23.8±0.1, 23.9±0.1, and 26.5±0.1 °2θ (e.g., 6.8, 11.7, 18.9, 20.5, 22.9, 23.8, 23.9, and 26.5 °2θ))), using Cu K alpha radiation when measured at 25° C.

In some embodiments, the crystalline form of Compound 1 freebase is characterized by an XRPD pattern comprising one or more signals as described in Table 1 below.

In some embodiments, the crystalline form of Compound 1 freebase is characterized by an XRPD pattern comprising two or more signals as described in Table 1 below.

In some embodiments, the crystalline form of Compound 1 freebase is characterized by an XRPD pattern comprising three or more signals as described in Table 1 below.

In some embodiments, the crystalline form of Compound 1 freebase is characterized by an XRPD pattern comprising four or more signals as described in Table 1 below.

In some embodiments, the crystalline form of Compound 1 freebase is characterized by an XRPD pattern comprising five or more signals as described in Table 1 below.

In some embodiments, the crystalline form of Compound 1 freebase is characterized by an XRPD pattern comprising six or more signals as described in Table 1 below.

In some embodiments, the crystalline form of Compound 1 freebase is characterized by an XRPD pattern comprising seven or more signals as described in Table 1 below.

In some embodiments, the crystalline form of Compound 1 freebase is characterized by an XRPD pattern comprising eight or more signals as described in Table 1 below.

In some embodiments, the crystalline form of Compound 1 freebase is characterized by an XRPD pattern comprising nine or more signals as described in Table 1 below.

In some embodiments, the crystalline form of Compound 1 freebase is characterized by an XRPD pattern comprising ten or more signals as described in Table 1 below.

In some embodiments, the crystalline form of Compound 1 freebase is characterized by an XRPD pattern comprising eleven or more signals as described in Table 1 below.

TABLE 1

| Signal No. | Angle (°2θ) | Relative intensity |
|---|---|---|
| 1 | 6.8 | 18 |
| 2 | 11.7 | 46 |
| 3 | 11.8 | 18 |
| 4 | 13.7 | 5 |
| 5 | 17.0 | 5 |
| 6 | 18.9 | 77 |
| 7 | 19.6 | 6 |
| 8 | 20.5 | 100 |
| 9 | 22.2 | 5 |
| 10 | 22.5 | 6 |
| 11 | 22.9 | 61 |
| 12 | 23.8 | 14 |
| 13 | 23.9 | 17 |
| 14 | 25.4 | 7 |
| 15 | 26.5 | 26 |
| 16 | 29.2 | 7 |
| 17 | 29.6 | 5 |

*The values shown in the above table are approximate value and subject to instrument differentiation and standard error.

Figure 6A:
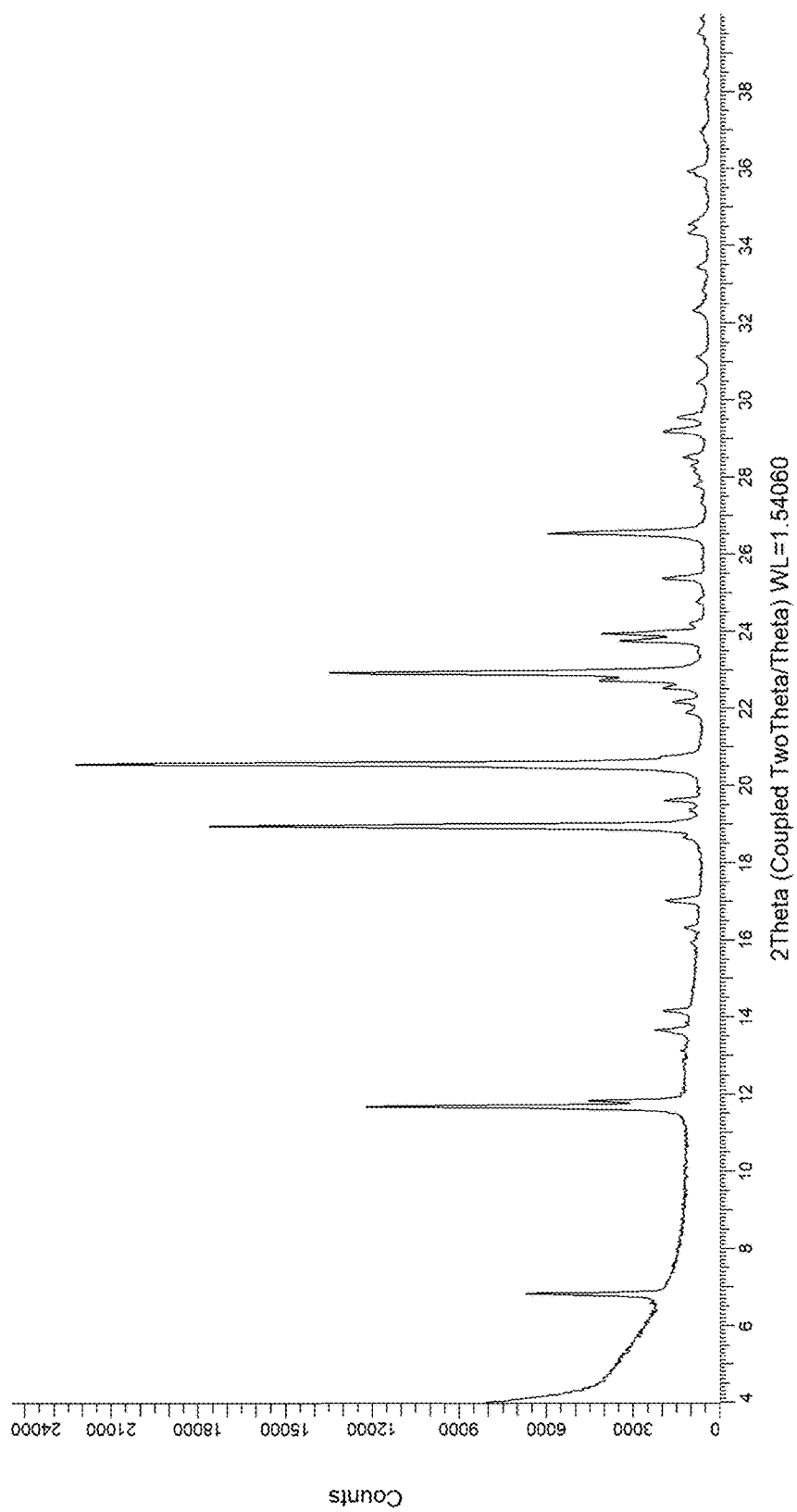
FIG. 6A depicts the XRPD of Form V Freebase.

In some embodiments, the crystalline form of Compound 1 freebase is characterized by an XRPD pattern substantially similar to that set forth in FIG. 6A and/or Table 1. In some embodiments, the crystalline form of Compound 1 freebase so characterized is crystalline Form V freebase.

In some embodiments, Form V freebase is pure-phase Form V freebase.

(ii) Crystalline Form I Freebase

In some embodiments, the crystalline form of Compound 1 freebase is crystalline Form I freebase. In some embodiments, crystalline freebase Form I is as defined in the present section (a)(ii).

In some embodiments, the crystalline form of Compound 1 freebase is characterized by an XRPD pattern comprising a signal at 11.2±0.2 °2θ, using Cu K alpha radiation when measured at 25° C.

In some embodiments, the crystalline form of Compound 1 freebase is characterized by an XRPD pattern comprising a signal at 12.0±0.2 °2θ, using Cu K alpha radiation when measured at 25° C.

In some embodiments, the crystalline form of Compound 1 freebase is characterized by an XRPD pattern comprising signals at 11.2±0.2 °2θ and 12.0±0.2 °2θ, using Cu K alpha radiation when measured at 25° C.

In some embodiments, the crystalline form of Compound 1 freebase is characterized by an XRPD pattern comprising signals at 5.6±0.5, 11.2±0.5, and 12.0±0.5 °2θ (e.g., 5.6±0.2, 11.2±0.2, and 12.0±0.2 °2θ (e.g., 5.6±0.1, 11.2±0.1, and 12.0±0.1 °2θ (e.g., 5.6, 11.2, and 12.0 °2θ))), using Cu K alpha radiation when measured at 25° C.

In some embodiments, the crystalline form of Compound 1 freebase is characterized by an XRPD pattern comprising signals at 5.6±0.5, 11.2±0.5, 12.0±0.5, 21.3±0.5, and 28.3±0.5 °2θ (e.g., 5.6±0.2, 11.2±0.2, 12.0±0.2, 21.3±0.2, and 28.3±0.2 °2θ (e.g., 5.6±0.1, 11.2±0.1, 12.0±0.1, 21.3±0.1, and 28.3±0.1 °2θ (e.g., 5.6, 11.2, 12.0, 21.3, and 28.3 °2θ))), using Cu K alpha radiation when measured at 25° C.

In some embodiments, the crystalline form of Compound 1 freebase is characterized by an XRPD pattern comprising signals at 5.6±0.5, 11.2±0.5, 12.0±0.5, 16.9±0.5, 21.3±0.5, 26.8±0.5, and 28.3±0.5 °2θ (e.g., 5.6±0.2, 11.2±0.2, 12.0±0.2, 16.9±0.2, 21.3±0.2, 26.8±0.2, and 28.3±0.2 °2θ (e.g., 5.6±0.1, 11.2±0.1, 12.0±0.1, 16.9±0.1, 21.3±0.1, 26.8±0.1, and 28.3±0.1 °2θ (e.g., 5.6, 11.2, 12.0, 16.9, 21.3, 26.8, and 28.3 °2θ))), using Cu K alpha radiation when measured at 25° C.

In some embodiments, the crystalline form of Compound 1 freebase is characterized by an XRPD pattern comprising signals at 5.6±0.5, 11.2±0.5, 12.0±0.5, 13.1±0.5, 14.0±0.5, 15.4±0.5, 16.9±0.5, 21.3±0.5, 22.9±0.5, 24.0±0.5, 24.9±0.5, 26.8±0.5, and 28.3±0.5 °2θ (e.g., 5.6±0.2, 11.2±0.2, 12.0±0.2, 13.1±0.2, 14.0±0.2, 15.4±0.2, 16.9±0.2, 21.3±0.2, 22.9±0.2, 24.0±0.2, 24.9±0.2, 26.8±0.2, and 28.3±0.2 °2θ (e.g., 5.6±0.1, 11.2±0.1, 12.0±0.1, 13.1±0.1, 14.0±0.1, 15.4±0.1, 16.9±0.1, 21.3±0.1, 22.9±0.1, 24.0±0.1, 24.9±0.1, 26.8±0.1, and 28.3±0.1 °2θ (e.g., 5.6, 11.2, 12.0, 13.1, 14.0, 15.4, 16.9, 21.3, 22.9, 24.0, 24.9, 26.8, and 28.3 °2θ))), using Cu K alpha radiation when measured at 25° C.

In some embodiments, the crystalline form of Compound 1 freebase is characterized by an XRPD pattern comprising signals at 5.6±0.5, 11.2±0.5, 12.0±0.5, 13.1±0.5, 14.0±0.5, 14.8±0.5, 15.4±0.5, 16.9±0.5, 17.1±0.5, 18.0±0.5, 18.4±0.5, 20.3±0.5, 21.3±0.5, 22.5±0.5, 22.9±0.5, 23.0±0.5, 23.6±0.5, 24.0±0.5, 24.9±0.5, 26.6±0.5, 26.8±0.5, 27.2±0.5, 28.3±0.5, 29.0±0.5, and 31.0±0.5 °2θ (e.g., 5.6±0.2, 11.2±0.2, 12.0±0.2, 13.1±0.2, 14.0±0.2, 14.8±0.2, 15.4±0.2, 16.9±0.2, 17.1±0.2, 18.0±0.2, 18.4±0.2, 20.3±0.2, 21.3±0.2, 22.5±0.2, 22.9±0.2, 23.0±0.2, 23.6±0.2, 24.0±0.2, 24.9±0.2, 26.6±0.2, 26.8±0.2, 27.2±0.2, 28.3±0.2, 29.0±0.2, and 31.0±0.2 °2θ (e.g., 5.6±0.1, 11.2±0.1, 12.0±0.1, 13.1±0.1, 14.0±0.1, 14.8±0.1, 15.4±0.1, 16.9±0.1, 17.1±0.1, 18.0±0.1, 18.4±0.1, 20.3±0.1, 21.3±0.1, 22.5±0.1, 22.9±0.1, 23.0±0.1, 23.6±0.1, 24.0±0.1, 24.9±0.1, 26.6±0.1, 26.8±0.1, 27.2±0.1, 28.3±0.1, 29.0±0.1, and 31.0±0.1 °2θ (e.g., 5.6, 11.2, 12.0, 13.1, 14.0, 14.8, 15.4, 16.9, 17.1, 18.0, 18.4, 20.3, 21.3, 22.5, 22.9, 23.0, 23.6, 24.0, 24.9, 26.6, 26.8, 27.2, 28.3, 29.0, and 31.0 °2θ))), using Cu K alpha radiation when measured at 25° C.

In some embodiments, the crystalline form of Compound 1 freebase is characterized by an XRPD pattern having at least one signal selected from 5.6±0.5, 11.2±0.5, and 12.0±0.5 °2θ (e.g., 5.6±0.2, 11.2±0.2, and 12.0±0.2 °2θ (e.g., 5.6±0.1, 11.2±0.1, and 12.0±0.1 °2θ (e.g., 5.6, 11.2, and 12.0 °2θ))), using Cu K alpha radiation when measured at 25° C.

In some embodiments, the crystalline form of Compound 1 freebase is characterized by an XRPD pattern having at least two signal selected from 5.6±0.5, 11.2±0.5, 12.0±0.5, 21.3±0.5, and 28.3±0.5 °2θ (e.g., 5.6±0.2, 11.2±0.2, 12.0±0.2, 21.3±0.2, and 28.3±0.2 °2θ (e.g., 5.6±0.1, 11.2±0.1, 12.0±0.1, 21.3±0.1, and 28.3±0.1 °2θ (e.g., 5.6, 11.2, 12.0, 21.3, and 28.3 °2θ))), using Cu K alpha radiation when measured at 25° C.

In some embodiments, the crystalline form of Compound 1 freebase is characterized by an XRPD pattern having at least three signals selected from 5.6±0.5, 11.2±0.5, 12.0±0.5, 21.3±0.5, and 28.3±0.5 °2θ (e.g., 5.6±0.2, 11.2±0.2, 12.0±0.2, 21.3±0.2, and 28.3±0.2 °2θ (e.g., 5.6±0.1, 11.2±0.1, 12.0±0.1, 21.3±0.1, and 28.3±0.1 °2θ (e.g., 5.6, 11.2, 12.0, 21.3, and 28.3 °2θ))), using Cu K alpha radiation when measured at 25° C.

In some embodiments, the crystalline form of Compound 1 freebase is characterized by an XRPD pattern having at least four signals selected from 5.6±0.5, 11.2±0.5, 12.0±0.5, 21.3±0.5, and 28.3±0.5 °2θ (e.g., 5.6±0.2, 11.2±0.2, 12.0±0.2, 21.3±0.2, and 28.3±0.2 °2θ (e.g., 5.6±0.1, 11.2±0.1, 12.0±0.1, 21.3±0.1, and 28.3±0.1 °2θ (e.g., 5.6, 11.2, 12.0, 21.3, and 28.3 °2θ))), using Cu K alpha radiation when measured at 25° C.

In some embodiments, the crystalline form of Compound 1 freebase is characterized by an XRPD pattern having at least five signals selected from 5.6±0.5, 11.2±0.5, 12.0±0.5, 16.9±0.5, 21.3±0.5, 26.8±0.5, and 28.3±0.5 °2θ (e.g., 5.6±0.2, 11.2±0.2, 12.0±0.2, 16.9±0.2, 21.3±0.2, 26.8±0.2, and 28.3±0.2 °2θ (e.g., 5.6±0.1, 11.2±0.1, 12.0±0.1, 16.9±0.1, 21.3±0.1, 26.8±0.1, and 28.3±0.1 °2θ (e.g., 5.6, 11.2, 12.0, 16.9, 21.3, 26.8, and 28.3 °2θ))), using Cu K alpha radiation when measured at 25° C.

In some embodiments, the crystalline form of Compound 1 freebase is characterized by an XRPD pattern having at least five signals selected from 5.6±0.5, 11.2±0.5, 12.0±0.5, 13.1±0.5, 14.0±0.5, 15.4±0.5, 16.9±0.5, 21.3±0.5, 22.9±0.5, 24.0±0.5, 24.9±0.5, 26.8±0.5, and 28.3±0.5 °2θ (e.g., 5.6±0.2, 11.2±0.2, 12.0±0.2, 13.1±0.2, 14.0±0.2, 15.4±0.2, 16.9±0.2, 21.3±0.2, 22.9±0.2, 24.0±0.2, 24.9±0.2, 26.8±0.2, and 28.3±0.2 °2θ (e.g., 5.6±0.1, 11.2±0.1, 12.0±0.1, 13.1±0.1, 14.0±0.1, 15.4±0.1, 16.9±0.1, 21.3±0.1, 22.9±0.1, 24.0±0.1, 24.9±0.1, 26.8±0.1, and 28.3±0.1 °2θ (e.g., 5.6, 11.2, 12.0, 13.1, 14.0, 15.4, 16.9, 21.3, 22.9, 24.0, 24.9, 26.8, and 28.3 °2θ))), using Cu K alpha radiation when measured at 25° C.

In some embodiments, the crystalline form of Compound 1 freebase is characterized by an XRPD pattern having at least one X-ray powder diffraction signal at 5.6±0.5, 11.2±0.5, 12.0±0.5, 13.1±0.5, 14.0±0.5, 14.8±0.5, 15.4±0.5, 16.9±0.5, 17.1±0.5, 18.0±0.5, 18.4±0.5, 20.3±0.5, 21.3±0.5, 22.5±0.5, 22.9±0.5, 23.0±0.5, 23.6±0.5, 24.0±0.5, 24.9±0.5, 26.6±0.5, 26.8±0.5, 27.2±0.5, 28.3±0.5, 29.0±0.5, and 31.0±0.5 °2θ (e.g., 5.6±0.2, 11.2±0.2, 12.0±0.2, 13.1±0.2, 14.0±0.2, 14.8±0.2, 15.4±0.2, 16.9±0.2, 17.1±0.2, 18.0±0.2, 18.4±0.2, 20.3±0.2, 21.3±0.2, 22.5±0.2, 22.9±0.2, 23.0±0.2, 23.6±0.2, 24.0±0.2, 24.9±0.2, 26.6±0.2, 26.8±0.2, 27.2±0.2, 28.3±0.2, 29.0±0.2, and 31.0±0.2 °2θ (e.g., 5.6±0.1, 11.2±0.1, 12.0±0.1, 13.1±0.1, 14.0±0.1, 14.8±0.1, 15.4±0.1, 16.9±0.1, 17.1±0.1, 18.0±0.1, 18.4±0.1, 20.3±0.1, 21.3±0.1, 22.5±0.1, 22.9±0.1, 23.0±0.1, 23.6±0.1, 24.0±0.1, 24.9±0.1, 26.6±0.1, 26.8±0.1, 27.2±0.1, 28.3±0.1, 29.0±0.1, and 31.0±0.1 °2θ (e.g., 5.6, 11.2, 12.0, 13.1, 14.0, 14.8, 15.4, 16.9, 17.1, 18.0, 18.4, 20.3, 21.3, 22.5, 22.9, 23.0, 23.6, 24.0, 24.9, 26.6, 26.8, 27.2, 28.3, 29.0, and 31.0 °2θ))), using Cu K alpha radiation when measured at 25° C.

In some embodiments, the crystalline form of Compound 1 freebase is characterized by an XRPD pattern having at least one X-ray powder diffraction signal at 5.6±0.2, 11.2±0.2, 12.0±0.2, 13.1±0.2, 14.0±0.2, 14.8±0.2, 15.4±0.2, 16.9±0.2, 17.1±0.2, 18.0±0.2, 18.4±0.2, 20.3±0.2, 21.3±0.2, 22.5±0.2, 22.9±0.2, 23.0±0.2, 23.6±0.2, 24.0±0.2, 24.9±0.2, 26.6±0.2, 26.8±0.2, 27.2±0.2, 28.3±0.2, 29.0±0.2, and 31.0±0.2 °2θ, using Cu K alpha radiation when measured at 25° C.

In some embodiments, the crystalline form of Compound 1 freebase is characterized by an XRPD pattern comprising one or more signals as described in Table 2 below.

In some embodiments, the crystalline form of Compound 1 freebase is characterized by an XRPD pattern comprising two or more signals as described in Table 2 below.

In some embodiments, the crystalline form of Compound 1 freebase is characterized by an XRPD pattern comprising three or more signals as described in Table 2 below.

In some embodiments, the crystalline form of Compound 1 freebase is characterized by an XRPD pattern comprising four or more signals as described in Table 2 below.

TABLE 2

| Signal No. | Angle (°2θ) | Relative intensity |
|---|---|---|
| 1 | 5.6 | 45 |
| 2 | 11.2 | 81 |
| 3 | 12.0 | 100 |
| 4 | 13.1 | 17 |
| 5 | 14.0 | 25 |
| 6 | 14.8 | 5 |
| 7 | 15.4 | 18 |
| 8 | 16.9 | 49 |
| 9 | 17.1 | 6 |
| 10 | 18.0 | 8 |
| 11 | 18.4 | 7 |
| 12 | 20.3 | 8 |
| 13 | 21.3 | 70 |
| 14 | 22.5 | 7 |
| 15 | 22.9 | 32 |
| 16 | 23.0 | 6 |
| 17 | 23.6 | 8 |
| 18 | 24.0 | 26 |
| 19 | 24.9 | 37 |
| 20 | 26.6 | 5 |
| 21 | 26.8 | 64 |
| 22 | 27.2 | 8 |
| 23 | 28.3 | 65 |
| 24 | 29.0 | 12 |
| 25 | 31.0 | 5 |

*The values shown in the above table are approximate value and subject to instrument differentiation and standard error.

Figure 2A:
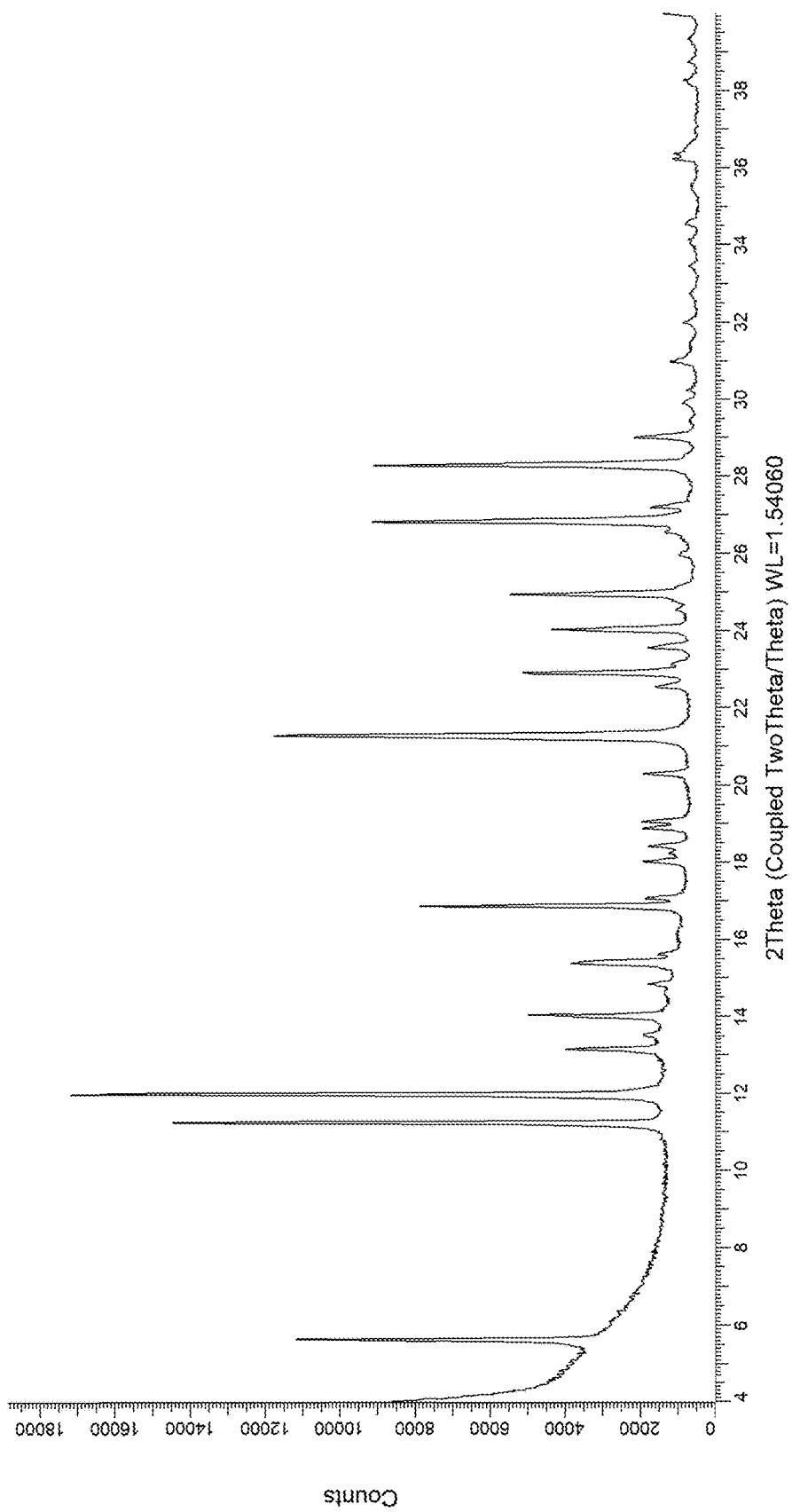
FIG. 2A depicts the XRPD of Form I Freebase.

In some embodiments, the crystalline form of Compound 1 freebase is characterized by an XRPD pattern substantially similar to that set forth in FIG. 2A and/or Table 2. In some embodiments, the crystalline form of Compound 1 freebase so characterized is crystalline Form I freebase.

In some embodiments, Form I freebase is pure-phase Form I freebase.

(iii) Crystalline Form II Freebase

In some embodiments, the crystalline form of Compound 1 freebase is crystalline Form II freebase. In some embodiments, crystalline freebase Form II freebase is as defined in the present section (a)(iii).

In some embodiments, the crystalline form of Compound 1 freebase is characterized by an XRPD pattern comprising a signal at 11.1±0.2 °2θ, using Cu K alpha radiation when measured at 25° C.

In some embodiments, the crystalline form of Compound 1 freebase is characterized by an XRPD pattern comprising a signal at 13.6±0.2 °2θ, using Cu K alpha radiation when measured at 25° C.

In some embodiments, the crystalline form of Compound 1 freebase is characterized by an XRPD pattern comprising signals at 11.1±0.2 °2θ and 13.6±0.2 °2θ, using Cu K alpha radiation when measured at 25° C.

In some embodiments, the crystalline form of Compound 1 freebase is characterized by an XRPD pattern comprising signals at 11.1±0.5, 12.1±0.5, and 13.6±0.5 °2θ (e.g., 11.1±0.2, 12.1±0.2, and 13.6±0.2 °2θ (e.g., 11.1±0.1, 12.1±0.1, and 13.6±0.1 °2θ (e.g., 11.1, 12.1, and 15.6 °2θ))), using Cu K alpha radiation when measured at 25° C.

In some embodiments, the crystalline form of Compound 1 freebase is characterized by an XRPD pattern comprising signals at 11.1±0.2, 12.1±0.2 and 13.6±0.2 °2θ using Cu K alpha radiation when measured at 25° C.

In some embodiments, the crystalline form of Compound 1 freebase is characterized by an XRPD pattern comprising signals at 11.1±0.5, 12.1±0.5, 13.6±0.5, 22.5±0.5, 26.3±0.5 °2θ (e.g., 11.1±0.2, 12.1±0.2, 13.6±0.2, 22.5±0.2, and 26.3±0.2 °2θ (e.g., 11.1±0.1, 12.1±0.1, 13.6±0.1, 22.5±0.1, and 26.3±0.1 °2θ (e.g., 11.1, 12.1, 13.6, 22.5, and 26.3 °2θ))), using Cu K alpha radiation when measured at 25° C.

In some embodiments, the crystalline form of Compound 1 freebase is characterized by an XRPD pattern comprising signals at 11.1±0.2, 12.1±0.2, 13.6±0.2, 22.5±0.2, and 26.3±0.2 °2θ using Cu K alpha radiation when measured at 25° C.

In some embodiments, the crystalline form of Compound 1 freebase is characterized by an XRPD pattern comprising signals at 11.1±0.5, 12.1±0.5, 13.6±0.5, 16.7±0.5, 22.5±0.5, 26.3±0.5, and 28.0±0.5 °2θ (e.g., 11.1±0.2, 12.1±0.2, 13.6±0.2, 16.7±0.2, 22.5±0.2, 26.3±0.2, and 28.0±0.2 °2θ (e.g., 11.1±0.1, 12.1±0.1, 13.6±0.1, 16.7±0.1, 22.5±0.1, 26.3±0.1, and 28.0±0.1 °2θ (e.g., 11.1, 12.1, 13.6, 16.7, 22.5, 26.3, and 28.0 °2θ))), using Cu K alpha radiation when measured at 25° C.

In some embodiments, the crystalline form of Compound 1 freebase is characterized by an XRPD pattern comprising signals at 11.1±0.2, 12.1±0.2, 13.6±0.2, 16.7±0.2, 22.5±0.2, 26.3±0.2, and 28.0±0.2 °2θ using Cu K alpha radiation when measured at 25° C.

In some embodiments, the crystalline form of Compound 1 freebase is characterized by an XRPD pattern comprising signals at 11.1±0.2, 12.1±0.2, 13.6±0.2, 16.7±0.2, 22.5±0.2, 26.3±0.2, and 28.0±0.2 °2θ using Cu K alpha radiation when measured at 25° C. and further comprises signal(s) at one or more of 14.8±0.2, 15.5±0.2, 16.1±0.2, 18.2±0.2, 19.7±0.2, 19.9±0.2, 20.1±0.2, 20.4±0.2, 21.6±0.2, 24.4±0.2, 24.8±0.2, 27.0±0.2, and 28.0±0.2 °2θ using Cu K alpha radiation when measured at 25° C.

In some embodiments, the crystalline form of Compound 1 freebase is characterized by an XRPD pattern comprising signals at 11.1±0.2, 12.1±0.2, 13.6±0.2, 16.7±0.2, 22.5±0.2, 26.3±0.2, and 28.0±0.2 °2θ using Cu K alpha radiation when measured at 25° C. and further comprises signal(s) at two or more of 14.8±0.2, 15.5±0.2, 16.1±0.2, 18.2±0.2, 19.7±0.2, 19.9±0.2, 20.1±0.2, 20.4±0.2, 21.6±0.2, 24.4±0.2, 24.8±0.2, 27.0±0.2, and 28.0±0.2 °2θ using Cu K alpha radiation when measured at 25° C.

In some embodiments, the crystalline form of Compound 1 freebase is characterized by an XRPD pattern comprising signals at 11.1±0.2, 12.1±0.2, 13.6±0.2, 16.7±0.2, 22.5±0.2, 26.3±0.2, and 28.0±0.2 °2θ using Cu K alpha radiation when measured at 25° C. and further comprises signal(s) at three or more of 14.8±0.2, 15.5±0.2, 16.1±0.2, 18.2±0.2, 19.7±0.2, 19.9±0.2, 20.1±0.2, 20.4±0.2, 21.6±0.2, 24.4±0.2, 24.8±0.2, 27.0±0.2, and 28.0±0.2 °2θ using Cu K alpha radiation when measured at 25° C.

In some embodiments, the crystalline form of Compound 1 freebase is characterized by an XRPD pattern comprising signals at 11.1±0.2, 12.1±0.2, 13.6±0.2, 16.7±0.2, 22.5±0.2, 26.3±0.2, and 28.0±0.2 °2θ using Cu K alpha radiation when measured at 25° C. and further comprises signal(s) at four or more of 14.8±0.2, 15.5±0.2, 16.1±0.2, 18.2±0.2, 19.7±0.2, 19.9±0.2, 20.1±0.2, 20.4±0.2, 21.6±0.2, 24.4±0.2, 24.8±0.2, 27.0±0.2, and 28.0±0.2 °2θ using Cu K alpha radiation when measured at 25° C.

In some embodiments, the crystalline form of Compound 1 freebase is characterized by an XRPD pattern comprising signals at 11.1±0.5, 12.1±0.5, 13.6±0.5, 14.8±0.5, 15.5±0.5, 16.1±0.5, 16.7±0.5, 18.2±0.5, 19.7±0.5, 19.9±0.5, 20.1±0.5, 20.4±0.5, 21.6±0.5, 22.5±0.5, 24.4±0.5, 24.8±0.5, 26.3±0.5, 27.0±0.5, 27.4±0.5, and 28.0±0.5 °2θ (e.g., 11.1±0.2, 12.1±0.2, 13.6±0.2, 14.8±0.2, 15.5±0.2, 16.1±0.2, 16.7±0.2, 18.2±0.2, 19.7±0.2, 19.9±0.2, 20.1±0.2, 20.4±0.2, 21.6±0.2, 22.5±0.2, 24.4±0.2, 24.8±0.2, 26.3±0.2, 27.0±0.2, 27.4±0.2, and 28.0±0.2 °2θ (e.g., 11.1±0.1, 12.1±0.1, 13.6±0.1, 14.8±0.1, 15.5±0.1, 16.1±0.1, 16.7±0.1, 18.2±0.1, 19.7±0.1, 19.9±0.1, 20.1±0.1, 20.4±0.1, 21.6±0.1, 22.5±0.1, 24.4±0.1, 24.8±0.1, 26.3±0.1, 27.0±0.1, 27.4±0.1, and 28.0±0.1 °2θ (e.g., 11.1, 12.1, 13.6, 14.8, 15.5, 16.1, 16.7, 18.2, 19.7, 19.9, 20.1, 20.4, 21.6, 22.5, 24.4, 24.8, 26.3, 27.0, 27.4, and 28.0 °2θ))), using Cu K alpha radiation when measured at 25° C.

In some embodiments, the crystalline form of Compound 1 freebase is characterized by an XRPD pattern comprising signals at 5.6±0.5, 11.1±0.5, 12.1±0.5, 13.1±0.5, 13.6±0.5, 14.8±0.5, 15.5±0.5, 16.1±0.5, 16.7±0.5, 18.2±0.5, 19.7±0.5, 19.9±0.5, 20.1±0.5, 20.4±0.5, 21.6±0.5, 22.5±0.5, 24.4±0.5, 24.8±0.5, 26.3±0.5, 27.0±0.5, 27.4±0.5, 28.0±0.5, 29.4±0.5, 32.5±0.5, 33.6±0.5, 34.7±0.5, 38.0±0.5, and 39.6±0.5 °2θ (e.g., 5.6±0.2, 11.1±0.2, 12.1±0.2, 13.1±0.2, 13.6±0.2, 14.8±0.2, 15.5±0.2, 16.1±0.2, 16.7±0.2, 18.2±0.2, 19.7±0.2, 19.9±0.2, 20.1±0.2, 20.4±0.2, 21.6±0.2, 22.5±0.2, 24.4±0.2, 24.8±0.2, 26.3±0.2, 27.0±0.2, 27.4±0.2, 28.0±0.2, 29.4±0.2, 32.5±0.2, 33.6±0.2, 34.7±0.2, 38.0±0.2, and 39.6±0.2 °2θ (e.g., 5.6±0.1, 11.1±0.1, 12.1±0.1, 13.1±0.1, 13.6±0.1, 14.8±0.1, 15.5±0.1, 16.1±0.1, 16.7±0.1, 18.2±0.1, 19.7±0.1, 19.9±0.1, 20.1±0.1, 20.4±0.1, 21.6±0.1, 22.5±0.1, 24.4±0.1, 24.8±0.1, 26.3±0.1, 27.0±0.1, 27.4±0.1, 28.0±0.1, 29.4±0.1, 32.5±0.1, 33.6±0.1, 34.7±0.1, 38.0±0.1, and 39.6±0.1 °2θ (e.g., 5.6, 11.1, 12.1, 13.1, 13.6, 14.8, 15.5, 16.1, 16.7, 18.2, 19.7, 19.9, 20.1, 20.4, 21.6, 22.5, 24.4, 24.8, 26.3, 27.0, 27.4, 28.0, 29.4, 32.5, 33.6, 34.7, 38.0, and 39.6 °2θ))), using Cu K alpha radiation when measured at 25° C.

In some embodiments, the crystalline form of Compound 1 freebase is characterized by an XRPD pattern having at least one signal selected from 11.1±0.5, 12.1±0.5, and 13.6±0.5 °2θ (e.g., 11.1±0.2, 12.1±0.2, and 13.6±0.2 °2θ (e.g., 11.1±0.1, 12.1±0.1, and 13.6±0.1 °2θ (e.g., 11.1, 12.1, and 15.6 °2θ))), using Cu K alpha radiation when measured at 25° C.

In some embodiments, the crystalline form of Compound 1 freebase is characterized by an XRPD pattern having at least two signal selected from 11.1±0.5, 12.1±0.5, 13.6±0.5, 22.5±0.5, and 26.3±0.5 °2θ (e.g., 11.1±0.2, 12.1±0.2, 13.6±0.2, 22.5±0.2, and 26.3±0.2 °2θ (e.g., 11.1±0.1, 12.1±0.1, 13.6±0.1, 22.5±0.1, and 26.3±0.1 °2θ (e.g., 11.1, 12.1, 13.6, 22.5, and 26.3 °2θ))), using Cu K alpha radiation when measured at 25° C.

In some embodiments, the crystalline form of Compound 1 freebase is characterized by an XRPD pattern having at least three signals selected from 11.1±0.5, 12.1±0.5, 13.6±0.5, 22.5±0.5, and 26.3±0.5 °2θ (e.g., 11.1±0.2, 12.1±0.2, 13.6±0.2, 22.5±0.2, and 26.3±0.2 °2θ (e.g., 11.1±0.1, 12.1±0.1, 13.6±0.1, 22.5±0.1, and 26.3±0.1 °2θ (e.g., 11.1, 12.1, 13.6, 22.5, and 26.3 °2θ))), using Cu K alpha radiation when measured at 25° C.

In some embodiments, the crystalline form of Compound 1 freebase is characterized by an XRPD pattern having at least four signals selected from 11.1±0.5, 12.1±0.5, 13.6±0.5, 22.5±0.5, and 26.3±0.5 °2θ (e.g., 11.1±0.2, 12.1±0.2, 13.6±0.2, 22.5±0.2, and 26.3±0.2 °2θ (e.g., 11.1±0.1, 12.1±0.1, 13.6±0.1, 22.5±0.1, and 26.3±0.1 °2θ (e.g., 11.1, 12.1, 13.6, 22.5, and 26.3 °2θ))), using Cu K alpha radiation when measured at 25° C.

In some embodiments, the crystalline form of Compound 1 freebase is characterized by an XRPD pattern having at least five signals selected from 11.1±0.5, 12.1±0.5, 13.6±0.5, 16.7±0.5, 22.5±0.5, 26.3±0.5, and 28.0±0.5 °2θ (e.g., 11.1±0.2, 12.1±0.2, 13.6±0.2, 16.7±0.2, 22.5±0.2, 26.3±0.2, and 28.0±0.2 °2θ (e.g., 11.1±0.1, 12.1±0.1, 13.6±0.1, 16.7±0.1, 22.5±0.1, 26.3±0.1, and 28.0±0.1 °2θ (e.g., 11.1, 12.1, 13.6, 16.7, 22.5, 26.3, and 28.0 °2θ))), using Cu K alpha radiation when measured at 25° C.

In some embodiments, the crystalline form of Compound 1 freebase is characterized by an XRPD pattern having at least five signals selected from 11.1±0.5, 12.1±0.5, 13.6±0.5, 14.8±0.5, 15.5±0.5, 16.1±0.5, 16.7±0.5, 18.2±0.5, 19.7±0.5, 19.9±0.5, 20.1±0.5, 20.4±0.5, 21.6±0.5, 22.5±0.5, 24.4±0.5, 24.8±0.5, 26.3±0.5, 27.0±0.5, 27.4±0.5, and 28.0±0.5 °2θ (e.g., 11.1±0.2, 12.1±0.2, 13.6±0.2, 14.8±0.2, 15.5±0.2, 16.1±0.2, 16.7±0.2, 18.2±0.2, 19.7±0.2, 19.9±0.2, 20.1±0.2, 20.4±0.2, 21.6±0.2, 22.5±0.2, 24.4±0.2, 24.8±0.2, 26.3±0.2, 27.0±0.2, 27.4±0.2, and 28.0±0.2 °2θ (e.g., 11.1±0.1, 12.1±0.1, 13.6±0.1, 14.8±0.1, 15.5±0.1, 16.1±0.1, 16.7±0.1, 18.2±0.1, 19.7±0.1, 19.9±0.1, 20.1±0.1, 20.4±0.1, 21.6±0.1, 22.5±0.1, 24.4±0.1, 24.8±0.1, 26.3±0.1, 27.0±0.1, 27.4±0.1, and 28.0±0.1 °2θ (e.g., 11.1, 12.1, 13.6, 14.8, 15.5, 16.1, 16.7, 18.2, 19.7, 19.9, 20.1, 20.4, 21.6, 22.5, 24.4, 24.8, 26.3, 27.0, 27.4, and 28.0 °2θ))), using Cu K alpha radiation when measured at 25° C.

In some embodiments, the crystalline form of Compound 1 freebase is characterized by an XRPD pattern having at least one X-ray powder diffraction signal at 5.6±0.5, 11.1±0.5, 12.1±0.5, 13.1±0.5, 13.6±0.5, 14.8±0.5, 15.5±0.5, 16.1±0.5, 16.7±0.5, 18.2±0.5, 19.7±0.5, 19.9±0.5, 20.1±0.5, 20.4±0.5, 21.6±0.5, 22.5±0.5, 24.4±0.5, 24.8±0.5, 26.3±0.5, 27.0±0.5, 27.4±0.5, 28.0±0.5, 29.4±0.5, 32.5±0.5, 33.6±0.5, 34.7±0.5, 38.0±0.5, and 39.6±0.5 °2θ (e.g., 5.6±0.2, 11.1±0.2, 12.1±0.2, 13.1±0.2, 13.6±0.2, 14.8±0.2, 15.5±0.2, 16.1±0.2, 16.7±0.2, 18.2±0.2, 19.7±0.2, 19.9±0.2, 20.1±0.2, 20.4±0.2, 21.6±0.2, 22.5±0.2, 24.4±0.2, 24.8±0.2, 26.3±0.2, 27.0±0.2, 27.4±0.2, 28.0±0.2, 29.4±0.2, 32.5±0.2, 33.6±0.2, 34.7±0.2, 38.0±0.2, and 39.6±0.2 °2θ (e.g., 5.6±0.1, 11.1±0.1, 12.1±0.1, 13.1±0.1, 13.6±0.1, 14.8±0.1, 15.5±0.1, 16.1±0.1, 16.7±0.1, 18.2±0.1, 19.7±0.1, 19.9±0.1, 20.1±0.1, 20.4±0.1, 21.6±0.1, 22.5±0.1, 24.4±0.1, 24.8±0.1, 26.3±0.1, 27.0±0.1, 27.4±0.1, 28.0±0.1, 29.4±0.1, 32.5±0.1, 33.6±0.1, 34.7±0.1, 38.0±0.1, and 39.6±0.1 °2θ (e.g., 5.6, 11.1, 12.1, 13.1, 13.6, 14.8, 15.5, 16.1, 16.7, 18.2, 19.7, 19.9, 20.1, 20.4, 21.6, 22.5, 24.4, 24.8, 26.3, 27.0, 27.4, 28.0, 29.4, 32.5, 33.6, 34.7, 38.0, and 39.6 °2θ))), using Cu K alpha radiation when measured at 25° C.

In some embodiments, the crystalline form of Compound 1 freebase is characterized by an XRPD pattern having at least one X-ray powder diffraction signal at 5.6±0.2, 11.1±0.2, 12.1±0.2, 13.1±0.2, 13.6±0.2, 14.8±0.2, 15.5±0.2, 16.1±0.2, 16.7±0.2, 18.2±0.2, 19.7±0.2, 19.9±0.2, 20.1±0.2, 20.4±0.2, 21.6±0.2, 22.5±0.2, 24.4±0.2, 24.8±0.2, 26.3±0.2, 27.0±0.2, 27.4±0.2, 28.0±0.2, 29.4±0.2, 32.5±0.2, 33.6±0.2, 34.7±0.2, 38.0±0.2, and 39.6±0.2 °2θ, using Cu K alpha radiation when measured at 25° C.

In some embodiments, the crystalline form of Compound 1 freebase is characterized by an XRPD pattern comprising one or more signals as described in Table 3 below.

In some embodiments, the crystalline form of Compound 1 freebase is characterized by an XRPD pattern comprising two or more signals as described in Table 3 below.

In some embodiments, the crystalline form of Compound 1 freebase is characterized by an XRPD pattern comprising three or more signals as described in Table 3 below.

In some embodiments, the crystalline form of Compound 1 freebase is characterized by an XRPD pattern comprising four or more signals as described in Table 3 below.

TABLE 3

| Signal No. | Angle (°2θ) | Relative intensity |
|---|---|---|
| 1 | 5.6 | 7 |
| 2 | 11.1 | 79 |
| 3 | 12.1 | 63 |
| 4 | 13.1 | 5 |
| 5 | 13.6 | 86 |
| 6 | 14.8 | 11 |
| 7 | 15.5 | 8 |
| 8 | 16.1 | 23 |
| 9 | 16.7 | 41 |
| 10 | 18.2 | 23 |
| 11 | 19.7 | 14 |
| 12 | 19.9 | 14 |
| 13 | 20.1 | 18 |
| 14 | 20.4 | 6 |
| 15 | 21.6 | 27 |
| 16 | 22.5 | 100 |
| 17 | 24.4 | 23 |
| 18 | 24.8 | 29 |
| 19 | 26.3 | 92 |
| 20 | 27.0 | 16 |
| 21 | 27.4 | 13 |
| 22 | 28.0 | 50 |
| 23 | 29.4 | 7 |
| 24 | 32.5 | 6 |
| 25 | 33.6 | 6 |
| 26 | 34.7 | 5 |
| 27 | 38.0 | 5 |
| 28 | 39.6 | 5 |

*The values shown in the above table are approximate value and subject to instrument differentiation and standard error.

Figure 3A:
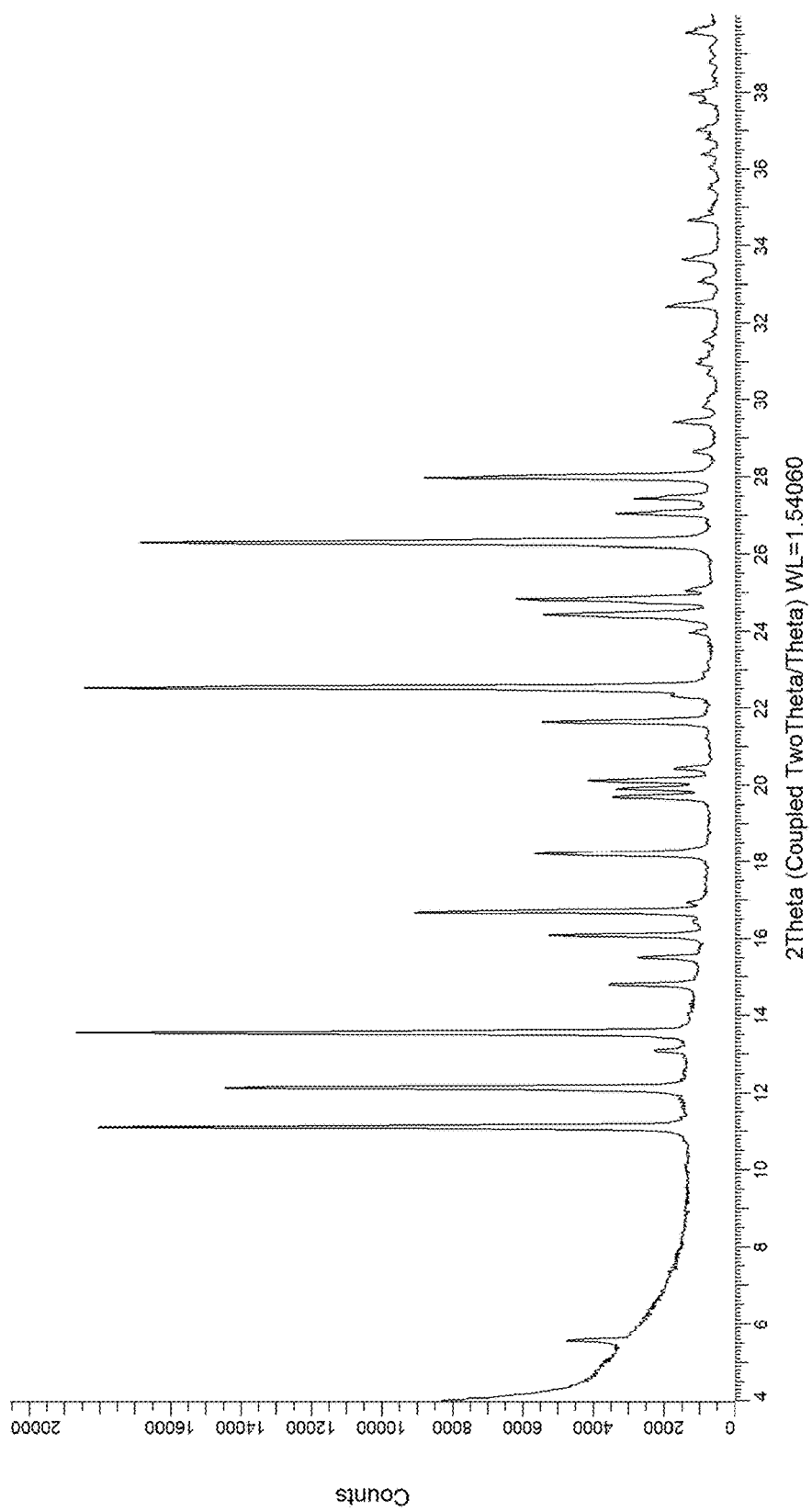
FIG. 3A depicts the XRPD of Form II Freebase.

In some embodiments, the crystalline form of Compound 1 freebase is characterized by an XRPD pattern substantially similar to that set forth in FIG. 3A and/or Table 3. In some embodiments, the crystalline form of Compound 1 freebase so characterized is crystalline Form II freebase.

In some embodiments, Form II freebase is pure-phase Form II freebase.

(iv) Crystalline Form III Freebase

In some embodiments, the crystalline form of Compound 1 freebase is crystalline Form III freebase. In some embodiments, crystalline freebase Form III freebase is as defined in the present section (a)(iv).

In some embodiments, the crystalline form of Compound 1 freebase is characterized by an XRPD pattern comprising a signal at 6.4±0.2 °2θ, using Cu K alpha radiation when measured at 25° C.

In some embodiments, the crystalline form of Compound 1 freebase is characterized by an XRPD pattern comprising signals at 6.4±0.5, 10.2±0.5, and 12.7±0.5 °2θ (e.g., 6.4±0.2, 10.2±0.2, and 12.7±0.2 °2θ (e.g., 6.4±0.1, 10.2±0.1, and 12.7±0.1 °2θ (e.g., 6.4, 10.2, and 12.7 °2θ))), using Cu K alpha radiation when measured at 25° C.

In some embodiments, the crystalline form of Compound 1 freebase is characterized by an XRPD pattern comprising signals at 6.4±0.5, 10.2±0.5, 12.7±0.5, 17.8±0.5, 18.1±0.5, 20.7±0.5, and 21.8±0.5 °2θ (e.g., 6.4±0.2, 10.2±0.2, 12.7±0.2, 17.8±0.2, 18.1±0.2, 20.7±0.2, and 21.8±0.2 °2θ (e.g., 6.4±0.1, 10.2±0.1, 12.7±0.1, 17.8±0.1, 18.1±0.1, 20.7±0.1, and 21.8±0.1 °2θ (e.g., 6.4, 10.2, 12.7, 17.8, 18.1, 20.7, and 21.8 °2θ))), using Cu K alpha radiation when measured at 25° C.

In some embodiments, the crystalline form of Compound 1 freebase is characterized by an XRPD pattern comprising signals at 6.4±0.5, 8.6±0.5, 10.2±0.5, 12.7±0.5, 16.3±0.5, 17.2±0.5, 17.8±0.5, 18.1±0.5, 20.7±0.5, 21.8±0.5, 23.4±0.5, 24.7±0.5, 24.9±0.5, 25.4±0.5, 25.5±0.5, 26.3±0.5, and 26.6±0.5 °2θ (e.g., 6.4±0.2, 8.6±0.2, 10.2±0.2, 12.7±0.2, 16.3±0.2, 17.2±0.2, 17.8±0.2, 18.1±0.2, 20.7±0.2, 21.8±0.2, 23.4±0.2, 24.7±0.2, 24.9±0.2, 25.4±0.2, 25.5±0.2, 26.3±0.2, and 26.6±0.2 °2θ (e.g., 6.4±0.1, 8.6±0.1, 10.2±0.1, 12.7±0.1, 16.3±0.1, 17.2±0.1, 17.8±0.1, 18.1±0.1, 20.7±0.1, 21.8±0.1, 23.4±0.1, 24.7±0.1, 24.9±0.1, 25.4±0.1, 25.5±0.1, 26.3±0.1, and 26.6±0.1 °2θ (e.g., 6.4, 8.6, 10.2, 12.7, 16.3, 17.2, 17.8, 18.1, 20.7, 21.8, 23.4, 24.7, 24.9, 25.4, 25.5, 26.3, and 26.6 °2θ))), using Cu K alpha radiation when measured at 25° C.

In some embodiments, the crystalline form of Compound 1 freebase is characterized by an XRPD pattern comprising signals at 6.4±0.5, 8.6±0.5, 10.2±0.5, 12.7±0.5, 15.0±0.5, 16.3±0.5, 17.2±0.5, 17.8±0.5, 18.1±0.5, 19.5±0.5, 20.5±0.5, 20.7±0.5, 21.8±0.5, 22.2±0.5, 22.6±0.5, 23.4±0.5, 24.7±0.5, 24.9±0.5, 25.4±0.5, 25.5±0.5, 26.3±0.5, 26.6±0.5, 28.1±0.5, 29.2±0.5, 32.4±0.5, 33.5±0.5, and 37.9±0.5 °2θ (e.g., 6.4±0.2, 8.6±0.2, 10.2±0.2, 12.7±0.2, 15.0±0.2, 16.3±0.2, 17.2±0.2, 17.8±0.2, 18.1±0.2, 19.5±0.2, 20.5±0.2, 20.7±0.2, 21.8±0.2, 22.2±0.2, 22.6±0.2, 23.4±0.2, 24.7±0.2, 24.9±0.2, 25.4±0.2, 25.5±0.2, 26.3±0.2, 26.6±0.2, 28.1±0.2, 29.2±0.2, 32.4±0.2, 33.5±0.2, and 37.9±0.2 °2θ (e.g., 6.4±0.1, 8.6±0.1, 10.2±0.1, 12.7±0.1, 15.0±0.1, 16.3±0.1, 17.2±0.1, 17.8±0.1, 18.1±0.1, 19.5±0.1, 20.5±0.1, 20.7±0.1, 21.8±0.1, 22.2±0.1, 22.6±0.1, 23.4±0.1, 24.7±0.1, 24.9±0.1, 25.4±0.1, 25.5±0.1, 26.3±0.1, 26.6±0.1, 28.1±0.1, 29.2±0.1, 32.4±0.1, 33.5±0.1, and 37.9±0.1 °2θ (e.g., 6.4, 8.6, 10.2, 12.7, 15.0, 16.3, 17.2, 17.8, 18.1, 19.5, 20.5, 20.7, 21.8, 22.2, 22.6, 23.4, 24.7, 24.9, 25.4, 25.5, 26.3, 26.6, 28.1, 29.2, 32.4, 33.5, and 37.9 °2θ))), using Cu K alpha radiation when measured at 25° C.

In some embodiments, the crystalline form of Compound 1 freebase is characterized by an XRPD pattern having at least one signal selected from 6.4±0.5, 10.2±0.5, and 12.7±0.5 °2θ (e.g., 6.4±0.2, 10.2±0.2, and 12.7±0.2 °2θ (e.g., 6.4±0.1, 10.2±0.1, and 12.7±0.1 °2θ (e.g., 6.4, 10.2, and 12.7 °2θ))), using Cu K alpha radiation when measured at 25° C.

In some embodiments, the crystalline form of Compound 1 freebase is characterized by an XRPD pattern having at least two signal selected from 6.4±0.5, 10.2±0.5, 12.7±0.5, 17.8±0.5, 18.1±0.5, 20.7±0.5, and 21.8±0.5 °2θ (e.g., 6.4±0.2, 10.2±0.2, 12.7±0.2, 17.8±0.2, 18.1±0.2, 20.7±0.2, and 21.8±0.2 °2θ (e.g., 6.4±0.1, 10.2±0.1, 12.7±0.1, 17.8±0.1, 18.1±0.1, 20.7±0.1, and 21.8±0.1 °2θ (e.g., 6.4, 10.2, 12.7, 17.8, 18.1, 20.7, and 21.8 °2θ))), using Cu K alpha radiation when measured at 25° C.

In some embodiments, the crystalline form of Compound 1 freebase is characterized by an XRPD pattern having at least three signals selected from 6.4±0.5, 10.2±0.5, 12.7±0.5, 17.8±0.5, 18.1±0.5, 20.7±0.5, and 21.8±0.5 °2θ (e.g., 6.4±0.2, 10.2±0.2, 12.7±0.2, 17.8±0.2, 18.1±0.2, 20.7±0.2, and 21.8±0.2 °2θ (e.g., 6.4±0.1, 10.2±0.1, 12.7±0.1, 17.8±0.1, 18.1±0.1, 20.7±0.1, and 21.8±0.1 °2θ (e.g., 6.4, 10.2, 12.7, 17.8, 18.1, 20.7, and 21.8 °2θ))), using Cu K alpha radiation when measured at 25° C.

In some embodiments, the crystalline form of Compound 1 freebase is characterized by an XRPD pattern having at least four signals selected from 6.4±0.5, 10.2±0.5, 12.7±0.5, 17.8±0.5, 18.1±0.5, 20.7±0.5, and 21.8±0.5 °2θ (e.g., 6.4±0.2, 10.2±0.2, 12.7±0.2, 17.8±0.2, 18.1±0.2, 20.7±0.2, and 21.8±0.2 °2θ (e.g., 6.4±0.1, 10.2±0.1, 12.7±0.1, 17.8±0.1, 18.1±0.1, 20.7±0.1, and 21.8±0.1 °2θ (e.g., 6.4, 10.2, 12.7, 17.8, 18.1, 20.7, and 21.8 °2θ))), using Cu K alpha radiation when measured at 25° C.

In some embodiments, the crystalline form of Compound 1 freebase is characterized by an XRPD pattern having at least five signals selected from 6.4±0.5, 10.2±0.5, 12.7±0.5, 17.8±0.5, 18.1±0.5, 20.7±0.5, and 21.8±0.5 °2θ (e.g., 6.4±0.2, 10.2±0.2, 12.7±0.2, 17.8±0.2, 18.1±0.2, 20.7±0.2, and 21.8±0.2 °2θ (e.g., 6.4±0.1, 10.2±0.1, 12.7±0.1, 17.8±0.1, 18.1±0.1, 20.7±0.1, and 21.8±0.1 °2θ (e.g., 6.4, 10.2, 12.7, 17.8, 18.1, 20.7, and 21.8 °2θ))), using Cu K alpha radiation when measured at 25° C.

In some embodiments, the crystalline form of Compound 1 freebase is characterized by an XRPD pattern having at least five signals selected from 6.4±0.5, 8.6±0.5, 10.2±0.5, 12.7±0.5, 16.3±0.5, 17.2±0.5, 17.8±0.5, 18.1±0.5, 20.7±0.5, 21.8±0.5, 23.4±0.5, 24.7±0.5, 24.9±0.5, 25.4±0.5, 25.5±0.5, 26.3±0.5, and 26.6±0.5 °2θ (e.g., 6.4±0.2, 8.6±0.2, 10.2±0.2, 12.7±0.2, 16.3±0.2, 17.2±0.2, 17.8±0.2, 18.1±0.2, 20.7±0.2, 21.8±0.2, 23.4±0.2, 24.7±0.2, 24.9±0.2, 25.4±0.2, 25.5±0.2, 26.3±0.2, and 26.6±0.2 °2θ (e.g., 6.4±0.1, 8.6±0.1, 10.2±0.1, 12.7±0.1, 16.3±0.1, 17.2±0.1, 17.8±0.1, 18.1±0.1, 20.7±0.1, 21.8±0.1, 23.4±0.1, 24.7±0.1, 24.9±0.1, 25.4±0.1, 25.5±0.1, 26.3±0.1, and 26.6±0.1 °2θ (e.g., 6.4, 8.6, 10.2, 12.7, 16.3, 17.2, 17.8, 18.1, 20.7, 21.8, 23.4, 24.7, 24.9, 25.4, 25.5, 26.3, and 26.6 °2θ))), using Cu K alpha radiation when measured at 25° C.

In some embodiments, the crystalline form of Compound 1 freebase is characterized by an XRPD pattern having at least five signals selected from 6.4±0.5, 8.6±0.5, 10.2±0.5, 12.7±0.5, 15.0±0.5, 16.3±0.5, 17.2±0.5, 17.8±0.5, 18.1±0.5, 19.5±0.5, 20.5±0.5, 20.7±0.5, 21.8±0.5, 22.2±0.5, 22.6±0.5, 23.4±0.5, 24.7±0.5, 24.9±0.5, 25.4±0.5, 25.5±0.5, 26.3±0.5, 26.6±0.5, 28.1±0.5, 29.2±0.5, 32.4±0.5, 33.5±0.5, and 37.9±0.5 °2θ (e.g., 6.4±0.2, 8.6±0.2, 10.2±0.2, 12.7±0.2, 15.0±0.2, 16.3±0.2, 17.2±0.2, 17.8±0.2, 18.1±0.2, 19.5±0.2, 20.5±0.2, 20.7±0.2, 21.8±0.2, 22.2±0.2, 22.6±0.2, 23.4±0.2, 24.7±0.2, 24.9±0.2, 25.4±0.2, 25.5±0.2, 26.3±0.2, 26.6±0.2, 28.1±0.2, 29.2±0.2, 32.4±0.2, 33.5±0.2, and 37.9±0.2 °2θ (e.g., 6.4±0.1, 8.6±0.1, 10.2±0.1, 12.7±0.1, 15.0±0.1, 16.3±0.1, 17.2±0.1, 17.8±0.1, 18.1±0.1, 19.5±0.1, 20.5±0.1, 20.7±0.1, 21.8±0.1, 22.2±0.1, 22.6±0.1, 23.4±0.1, 24.7±0.1, 24.9±0.1, 25.4±0.1, 25.5±0.1, 26.3±0.1, 26.6±0.1, 28.1±0.1, 29.2±0.1, 32.4±0.1, 33.5±0.1, and 37.9±0.1 °2θ (e.g., 6.4, 8.6, 10.2, 12.7, 15.0, 16.3, 17.2, 17.8, 18.1, 19.5, 20.5, 20.7, 21.8, 22.2, 22.6, 23.4, 24.7, 24.9, 25.4, 25.5, 26.3, 26.6, 28.1, 29.2, 32.4, 33.5, and 37.9 °2θ))), using Cu K alpha radiation when measured at 25° C.

In some embodiments, the crystalline form of Compound 1 freebase is characterized by an XRPD pattern having at least one X-ray powder diffraction signal at 6.4±0.5, 8.6±0.5, 10.2±0.5, 12.7±0.5, 15.0±0.5, 16.3±0.5, 17.2±0.5, 17.8±0.5, 18.1±0.5, 19.5±0.5, 20.5±0.5, 20.7±0.5, 21.8±0.5, 22.2±0.5, 22.6±0.5, 23.4±0.5, 24.7±0.5, 24.9±0.5, 25.4±0.5, 25.5±0.5, 26.3±0.5, 26.6±0.5, 28.1±0.5, 29.2±0.5, 32.4±0.5, 33.5±0.5, and 37.9±0.5 °2θ (e.g., 6.4±0.2, 8.6±0.2, 10.2±0.2, 12.7±0.2, 15.0±0.2, 16.3±0.2, 17.2±0.2, 17.8±0.2, 18.1±0.2, 19.5±0.2, 20.5±0.2, 20.7±0.2, 21.8±0.2, 22.2±0.2, 22.6±0.2, 23.4±0.2, 24.7±0.2, 24.9±0.2, 25.4±0.2, 25.5±0.2, 26.3±0.2, 26.6±0.2, 28.1±0.2, 29.2±0.2, 32.4±0.2, 33.5±0.2, and 37.9±0.2 °2θ (e.g., 6.4±0.1, 8.6±0.1, 10.2±0.1, 12.7±0.1, 15.0±0.1, 16.3±0.1, 17.2±0.1, 17.8±0.1, 18.1±0.1, 19.5±0.1, 20.5±0.1, 20.7±0.1, 21.8±0.1, 22.2±0.1, 22.6±0.1, 23.4±0.1, 24.7±0.1, 24.9±0.1, 25.4±0.1, 25.5±0.1, 26.3±0.1, 26.6±0.1, 28.1±0.1, 29.2±0.1, 32.4±0.1, 33.5±0.1, and 37.9±0.1 °2θ (e.g., 6.4, 8.6, 10.2, 12.7, 15.0, 16.3, 17.2, 17.8, 18.1, 19.5, 20.5, 20.7, 21.8, 22.2, 22.6, 23.4, 24.7, 24.9, 25.4, 25.5, 26.3, 26.6, 28.1, 29.2, 32.4, 33.5, and 37.9 °2θ))), using Cu K alpha radiation when measured at 25° C.

In some embodiments, the crystalline form of Compound 1 freebase is characterized by an XRPD pattern having at least one X-ray powder diffraction signal at 6.4±0.2, 8.6±0.2, 10.2±0.2, 12.7±0.2, 15.0±0.2, 16.3±0.2, 17.2±0.2, 17.8±0.2, 18.1±0.2, 19.5±0.2, 20.5±0.2, 20.7±0.2, 21.8±0.2, 22.2±0.2, 22.6±0.2, 23.4±0.2, 24.7±0.2, 24.9±0.2, 25.4±0.2, 25.5±0.2, 26.3±0.2, 26.6±0.2, 28.1±0.2, 29.2±0.2, 32.4±0.2, 33.5±0.2, and 37.9±0.2 °2θ, using Cu K alpha radiation when measured at 25° C.

In some embodiments, the crystalline form of Compound 1 freebase is characterized by an XRPD pattern comprising one or more signals as described in Table 4 below.

In some embodiments, the crystalline form of Compound 1 freebase is characterized by an XRPD pattern comprising two or more signals as described in Table 4 below.

In some embodiments, the crystalline form of Compound 1 freebase is characterized by an XRPD pattern comprising three or more signals as described in Table 4 below.

In some embodiments, the crystalline form of Compound 1 freebase is characterized by an XRPD pattern comprising four or more signals as described in Table 4 below.

TABLE 4

| Signal No. | Angle (°2θ) | Relative intensity |
|---|---|---|
| 1 | 6.4 | 100 |
| 2 | 8.6 | 14 |
| 3 | 10.2 | 22 |
| 4 | 12.7 | 20 |
| 5 | 15.0 | 7 |
| 6 | 16.3 | 19 |
| 7 | 17.2 | 17 |
| 8 | 17.8 | 33 |
| 9 | 18.1 | 29 |
| 10 | 19.5 | 11 |
| 11 | 20.5 | 9 |
| 12 | 20.7 | 27 |
| 13 | 21.8 | 35 |
| 14 | 22.2 | 11 |
| 15 | 22.6 | 10 |
| 16 | 23.4 | 21 |
| 17 | 24.7 | 10 |
| 18 | 24.9 | 12 |
| 19 | 25.4 | 23 |
| 20 | 25.5 | 16 |
| 21 | 26.3 | 18 |
| 22 | 26.6 | 12 |
| 23 | 28.1 | 6 |
| 24 | 29.2 | 7 |
| 25 | 32.4 | 5 |
| 26 | 33.5 | 8 |
| 27 | 37.9 | 6 |

*The values shown in the above table are approximate value and subject to instrument differentiation and standard error.

Figure 4A:
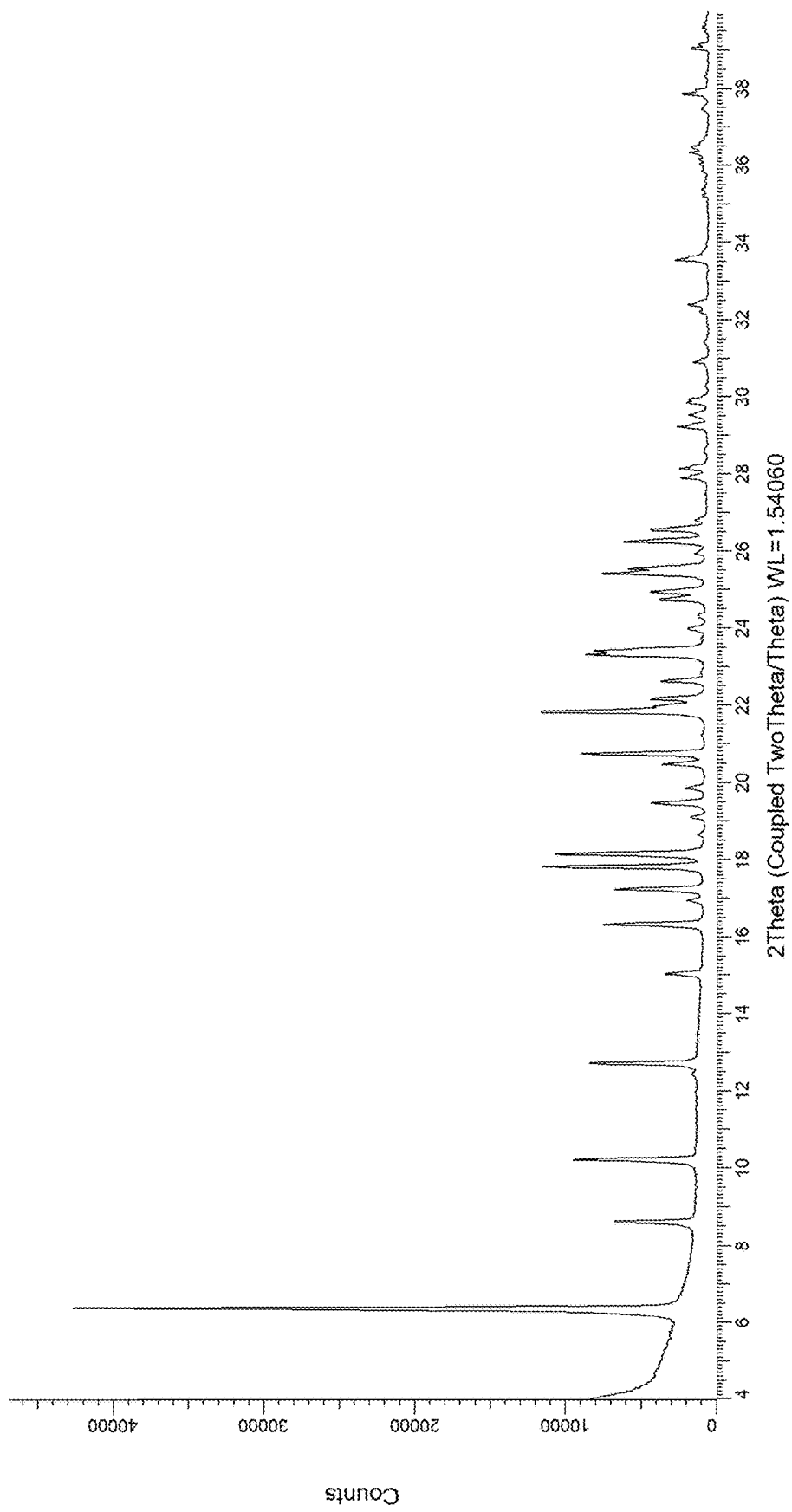
FIG. 4A depicts the XRPD of Form III Freebase.

In some embodiments, the crystalline form of Compound 1 freebase is characterized by an XRPD pattern substantially similar to that set forth in FIG. 4A and/or Table 4. In some embodiments, the crystalline form of Compound 1 freebase so characterized is crystalline Form III freebase.

In some embodiments, Form III freebase is pure-phase Form III freebase.

(v) Crystalline Form IV Freebase

In some embodiments, the crystalline form of Compound 1 freebase is crystalline Form IV freebase. In some embodiments, crystalline freebase Form IV freebase is as defined in the present section (a)(v).

In some embodiments, the crystalline form of Compound 1 freebase is characterized by an XRPD pattern comprising a signal at 16.0±0.2 °2θ, using Cu K alpha radiation when measured at 25° C.

In some embodiments, the crystalline form of Compound 1 freebase is characterized by an XRPD pattern comprising signals at 6.5±0.5, 8.5±0.5, and 16.0±0.5 °2θ (e.g., 6.5±0.2, 8.5±0.2, and 16.0±0.2 °2θ (e.g., 6.5±0.1, 8.5±0.1, and 16.0±0.1 °2θ (e.g., 6.5, 8.5, and 16.0 °2θ))), using Cu K alpha radiation when measured at 25° C.

In some embodiments, the crystalline form of Compound 1 freebase is characterized by an XRPD pattern comprising signals at 6.5±0.5, 10.2±0.5, and 16.0±0.5 °2θ (e.g., 6.5±0.2, 10.2±0.2, and 16.0±0.2 °2θ (e.g., 6.5±0.1, 10.2±0.1, and 16.0±0.1 °2θ (e.g., 6.5, 10.2, and 16.0 °2θ))), using Cu K alpha radiation when measured at 25° C.

In some embodiments, the crystalline form of Compound 1 freebase is characterized by an XRPD pattern comprising signals at 8.5±0.5, 10.2±0.5, and 16.0±0.5 °2θ (e.g., 8.5±0.2, 10.2±0.2, and 16.0±0.2 °2θ (e.g., 8.5±0.1, 10.2±0.1, and 16.0±0.1 °2θ (e.g., 8.5, 10.2, and 16.0 °2θ))), using Cu K alpha radiation when measured at 25° C.

In some embodiments, the crystalline form of Compound 1 freebase is characterized by an XRPD pattern comprising signals at 6.5±0.5, 8.5±0.5, 10.2±0.5, and 16.0±0.5 °2θ (e.g., 6.5±0.2, 8.5±0.2, 10.2±0.2, and 16.0±0.2 °2θ (e.g., 6.5±0.1, 8.5±0.1, 10.2±0.1, and 16.0±0.1 °2θ (e.g., 6.5, 8.5, 10.2, and 16.0 °2θ))), using Cu K alpha radiation when measured at 25° C.

In some embodiments, the crystalline form of Compound 1 freebase is characterized by an XRPD pattern comprising signals at 6.5±0.5, 8.5±0.5, 10.2±0.5, 16.0±0.5, 18.0±0.5, 20.5±0.5, 21.0±0.5, and 22.0±0.5 °2θ (e.g., 6.5±0.2, 8.5±0.2, 10.2±0.2, 16.0±0.2, 18.0±0.2, 20.5±0.2, 21.0±0.2, and 22.0±0.2 °2θ (e.g., 6.5±0.1, 8.5±0.1, 10.2±0.1, 16.0±0.1, 18.0±0.1, 20.5±0.1, 21.0±0.1, and 22.0±0.1 °2θ (e.g., 6.5, 8.5, 10.2, 16.0, 18.0, 20.5, 21.0, and 22.0 °2θ))), using Cu K alpha radiation when measured at 25° C.

In some embodiments, the crystalline form of Compound 1 freebase is characterized by an XRPD pattern comprising signals at 6.5±0.5, 8.5±0.5, 10.2±0.5, 16.0±0.5, 16.9±0.5, 18.0±0.5, 20.4±0.5, 20.5±0.5, 21.0±0.5, 22.0±0.5, 22.6±0.5, 23.4±0.5, 24.4±0.5, 25.1±0.5, 26.0±0.5, and 27.2±0.5 °2θ (e.g., 6.5±0.2, 8.5±0.2, 10.2±0.2, 16.0±0.2, 16.9±0.2, 18.0±0.2, 20.4±0.2, 20.5±0.2, 21.0±0.2, 22.0±0.2, 22.6±0.2, 23.4±0.2, 24.4±0.2, 25.1±0.2, 26.0±0.2, and 27.2±0.2 °2θ (e.g., 6.5±0.1, 8.5±0.1, 10.2±0.1, 16.0±0.1, 16.9±0.1, 18.0±0.1, 20.4±0.1, 20.5±0.1, 21.0±0.1, 22.0±0.1, 22.6±0.1, 23.4±0.1, 24.4±0.1, 25.1±0.1, 26.0±0.1, and 27.2±0.1 °2θ (e.g., 6.5, 8.5, 10.2, 16.0, 16.9, 18.0, 20.4, 20.5, 21.0, 22.0, 22.6, 23.4, 24.4, 25.1, 26.0, and 27.2 °2θ))), using Cu K alpha radiation when measured at 25° C.

In some embodiments, the crystalline form of Compound 1 freebase is characterized by an XRPD pattern comprising signals at 6.5±0.5, 8.5±0.5, 10.2±0.5, 12.9±0.5, 15.1±0.5, 16.0±0.5, 16.9±0.5, 17.2±0.5, 18.0±0.5, 18.9±0.5, 20.4±0.5, 20.5±0.5, 21.0±0.5, 22.0±0.5, 22.6±0.5, 23.4±0.5, 24.4±0.5, 25.1±0.5, 24.8±0.5, 25.9±0.5, 26.0±0.5, 27.2±0.5, 28.2±0.5, 29.7±0.5, 30.7±0.5, 31.5±0.5, 33.5±0.5, 35.7±0.5, 37.4±0.5, and 39.5±0.5 °2θ (e.g., 6.5±0.2, 8.5±0.2, 10.2±0.2, 12.9±0.2, 15.1±0.2, 16.0±0.2, 16.9±0.2, 17.2±0.2, 18.0±0.2, 18.9±0.2, 20.4±0.2, 20.5±0.2, 21.0±0.2, 22.0±0.2, 22.6±0.2, 23.4±0.2, 24.4±0.2, 25.1±0.2, 24.8±0.2, 25.9±0.2, 26.0±0.2, 27.2±0.2, 28.2±0.2, 29.7±0.2, 30.7±0.2, 31.5±0.2, 33.5±0.2, 35.7±0.2, 37.4±0.2, and 39.5±0.2 °2θ (e.g., 6.5±0.1, 8.5±0.1, 10.2±0.1, 12.9±0.1, 15.1±0.1, 16.0±0.1, 16.9±0.1, 17.2±0.1, 18.0±0.1, 18.9±0.1, 20.4±0.1, 20.5±0.1, 21.0±0.1, 22.0±0.1, 22.6±0.1, 23.4±0.1, 24.4±0.1, 25.1±0.1, 24.8±0.1, 25.9±0.1, 26.0±0.1, 27.2±0.1, 28.2±0.1, 29.7±0.1, 30.7±0.1, 31.5±0.1, 33.5±0.1, 35.7±0.1, 37.4±0.1, and 39.5±0.1 °2θ (e.g., 6.5, 8.5, 10.2, 12.9, 15.1, 16.0, 16.9, 17.2, 18.0, 18.9, 20.4, 20.5, 21.0, 22.0, 22.6, 23.4, 24.4, 25.1, 24.8, 25.9, 26.0, 27.2, 28.2, 29.7, 30.7, 31.5, 33.5, 35.7, 37.4, and 39.5 °2θ))), using Cu K alpha radiation when measured at 25° C.

In some embodiments, the crystalline form of Compound 1 freebase is characterized by an XRPD pattern having at least one signal selected from 6.5±0.5, 8.5±0.5, and 16.0±0.5 °2θ (e.g., 6.5±0.2, 8.5±0.2, and 16.0±0.2 °2θ (e.g., 6.5±0.1, 8.5±0.1, and 16.0±0.1 °2θ (e.g., 6.5, 8.5, and 16.0 °2θ))), using Cu K alpha radiation when measured at 25° C.

In some embodiments, the crystalline form of Compound 1 freebase is characterized by an XRPD pattern having at least one signal selected from 6.5±0.5, 10.2±0.5, and 16.0±0.5 °2θ (e.g., 6.5±0.2, 10.2±0.2, and 16.0±0.2 °2θ (e.g., 6.5±0.1, 10.2±0.1, and 16.0±0.1 °2θ (e.g., 6.5, 10.2, and 16.0 °2θ))), using Cu K alpha radiation when measured at 25° C.

In some embodiments, the crystalline form of Compound 1 freebase is characterized by an XRPD pattern having at least one signal selected from 8.5±0.5, 10.2±0.5, and 16.0±0.5 °2θ (e.g., 8.5±0.2, 10.2±0.2, and 16.0±0.2 °2θ (e.g., 8.5±0.1, 10.2±0.1, and 16.0±0.1 °2θ (e.g., 8.5, 10.2, and 16.0 °2θ))), using Cu K alpha radiation when measured at 25° C.

In some embodiments, the crystalline form of Compound 1 freebase is characterized by an XRPD pattern having at least two signal selected from 6.5±0.5, 8.5±0.5, 10.2±0.5, and 16.0±0.5 °2θ (e.g., 6.5±0.2, 8.5±0.2, 10.2±0.2, and 16.0±0.2 °2θ (e.g., 6.5±0.1, 8.5±0.1, 10.2±0.1, and 16.0±0.1 °2θ (e.g., 6.5, 8.5, 10.2, and 16.0 °2θ))), using Cu K alpha radiation when measured at 25° C.

In some embodiments, the crystalline form of Compound 1 freebase is characterized by an XRPD pattern having at least three signals selected from 6.5±0.5, 8.5±0.5, 10.2±0.5, and 16.0±0.5 °2θ (e.g., 6.5±0.2, 8.5±0.2, 10.2±0.2, and 16.0±0.2 °2θ (e.g., 6.5±0.1, 8.5±0.1, 10.2±0.1, and 16.0±0.1 °2θ (e.g., 6.5, 8.5, 10.2, and 16.0 °2θ))), using Cu K alpha radiation when measured at 25° C.

In some embodiments, the crystalline form of Compound 1 freebase is characterized by an XRPD pattern having at least four signals selected from 6.5±0.5, 8.5±0.5, 10.2±0.5, 16.0±0.5, 18.0±0.5, 20.5±0.5, 21.0±0.5, and 22.0±0.5 °2θ (e.g., 6.5±0.2, 8.5±0.2, 10.2±0.2, 16.0±0.2, 18.0±0.2, 20.5±0.2, 21.0±0.2, and 22.0±0.2 °2θ (e.g., 6.5±0.1, 8.5±0.1, 10.2±0.1, 16.0±0.1, 18.0±0.1, 20.5±0.1, 21.0±0.1, and 22.0±0.1 °2θ (e.g., 6.5, 8.5, 10.2, 16.0, 18.0, 20.5, 21.0, and 22.0 °2θ))), using Cu K alpha radiation when measured at 25° C.

In some embodiments, the crystalline form of Compound 1 freebase is characterized by an XRPD pattern having at least five signals selected from 6.5±0.5, 8.5±0.5, 10.2±0.5, 16.0±0.5, 18.0±0.5, 20.5±0.5, 21.0±0.5, and 22.0±0.5 °2θ (e.g., 6.5±0.2, 8.5±0.2, 10.2±0.2, 16.0±0.2, 18.0±0.2, 20.5±0.2, 21.0±0.2, and 22.0±0.2 °2θ (e.g., 6.5±0.1, 8.5±0.1, 10.2±0.1, 16.0±0.1, 18.0±0.1, 20.5±0.1, 21.0±0.1, and 22.0±0.1 °2θ (e.g., 6.5, 8.5, 10.2, 16.0, 18.0, 20.5, 21.0, and 22.0 °2θ))), using Cu K alpha radiation when measured at 25° C.

In some embodiments, the crystalline form of Compound 1 freebase is characterized by an XRPD pattern having at least five signals selected from 6.5±0.5, 8.5±0.5, 10.2±0.5, 16.0±0.5, 16.9±0.5, 18.0±0.5, 20.4±0.5, 20.5±0.5, 21.0±0.5, 22.0±0.5, 22.6±0.5, 23.4±0.5, 24.4±0.5, 25.1±0.5, 26.0±0.5, and 27.2±0.5 °2θ (e.g., 6.5±0.2, 8.5±0.2, 10.2±0.2, 16.0±0.2, 16.9±0.2, 18.0±0.2, 20.4±0.2, 20.5±0.2, 21.0±0.2, 22.0±0.2, 22.6±0.2, 23.4±0.2, 24.4±0.2, 25.1±0.2, 26.0±0.2, and 27.2±0.2 °2θ (e.g., 6.5±0.1, 8.5±0.1, 10.2±0.1, 16.0±0.1, 16.9±0.1, 18.0±0.1, 20.4±0.1, 20.5±0.1, 21.0±0.1, 22.0±0.1, 22.6±0.1, 23.4±0.1, 24.4±0.1, 25.1±0.1, 26.0±0.1, and 27.2±0.1 °2θ (e.g., 6.5, 8.5, 10.2, 16.0, 16.9, 18.0, 20.4, 20.5, 21.0, 22.0, 22.6, 23.4, 24.4, 25.1, 26.0, and 27.2 °2θ))), using Cu K alpha radiation when measured at 25° C.

In some embodiments, the crystalline form of Compound 1 freebase is characterized by an XRPD pattern having at least five signals selected from 6.5±0.5, 8.5±0.5, 10.2±0.5, 12.9±0.5, 15.1±0.5, 16.0±0.5, 16.9±0.5, 17.2±0.5, 18.0±0.5, 18.9±0.5, 20.4±0.5, 20.5±0.5, 21.0±0.5, 22.0±0.5, 22.6±0.5, 23.4±0.5, 24.4±0.5, 25.1±0.5, 24.8±0.5, 25.9±0.5, 26.0±0.5, 27.2±0.5, 28.2±0.5, 29.7±0.5, 30.7±0.5, 31.5±0.5, 33.5±0.5, 35.7±0.5, 37.4±0.5, and 39.5±0.5 °2θ (e.g., 6.5±0.2, 8.5±0.2, 10.2±0.2, 12.9±0.2, 15.1±0.2, 16.0±0.2, 16.9±0.2, 17.2±0.2, 18.0±0.2, 18.9±0.2, 20.4±0.2, 20.5±0.2, 21.0±0.2, 22.0±0.2, 22.6±0.2, 23.4±0.2, 24.4±0.2, 25.1±0.2, 24.8±0.2, 25.9±0.2, 26.0±0.2, 27.2±0.2, 28.2±0.2, 29.7±0.2, 30.7±0.2, 31.5±0.2, 33.5±0.2, 35.7±0.2, 37.4±0.2, and 39.5±0.2 °2θ (e.g., 6.5±0.1, 8.5±0.1, 10.2±0.1, 12.9±0.1, 15.1±0.1, 16.0±0.1, 16.9±0.1, 17.2±0.1, 18.0±0.1, 18.9±0.1, 20.4±0.1, 20.5±0.1, 21.0±0.1, 22.0±0.1, 22.6±0.1, 23.4±0.1, 24.4±0.1, 25.1±0.1, 24.8±0.1, 25.9±0.1, 26.0±0.1, 27.2±0.1, 28.2±0.1, 29.7±0.1, 30.7±0.1, 31.5±0.1, 33.5±0.1, 35.7±0.1, 37.4±0.1, and 39.5±0.1 °2θ (e.g., 6.5, 8.5, 10.2, 12.9, 15.1, 16.0, 16.9, 17.2, 18.0, 18.9, 20.4, 20.5, 21.0, 22.0, 22.6, 23.4, 24.4, 25.1, 24.8, 25.9, 26.0, 27.2, 28.2, 29.7, 30.7, 31.5, 33.5, 35.7, 37.4, and 39.5 °2θ))), using Cu K alpha radiation when measured at 25° C.

In some embodiments, the crystalline form of Compound 1 freebase is characterized by an XRPD pattern having at least one X-ray powder diffraction signal at 6.5±0.5, 8.5±0.5, 10.2±0.5, 12.9±0.5, 15.1±0.5, 16.0±0.5, 16.9±0.5, 17.2±0.5, 18.0±0.5, 18.9±0.5, 20.4±0.5, 20.5±0.5, 21.0±0.5, 22.0±0.5, 22.6±0.5, 23.4±0.5, 24.4±0.5, 25.1±0.5, 24.8±0.5, 25.9±0.5, 26.0±0.5, 27.2±0.5, 28.2±0.5, 29.7±0.5, 30.7±0.5, 31.5±0.5, 33.5±0.5, 35.7±0.5, 37.4±0.5, and 39.5±0.5 °2θ (e.g., 6.5±0.2, 8.5±0.2, 10.2±0.2, 12.9±0.2, 15.1±0.2, 16.0±0.2, 16.9±0.2, 17.2±0.2, 18.0±0.2, 18.9±0.2, 20.4±0.2, 20.5±0.2, 21.0±0.2, 22.0±0.2, 22.6±0.2, 23.4±0.2, 24.4±0.2, 25.1±0.2, 24.8±0.2, 25.9±0.2, 26.0±0.2, 27.2±0.2, 28.2±0.2, 29.7±0.2, 30.7±0.2, 31.5±0.2, 33.5±0.2, 35.7±0.2, 37.4±0.2, and 39.5±0.2 °2θ (e.g., 6.5±0.1, 8.5±0.1, 10.2±0.1, 12.9±0.1, 15.1±0.1, 16.0±0.1, 16.9±0.1, 17.2±0.1, 18.0±0.1, 18.9±0.1, 20.4±0.1, 20.5±0.1, 21.0±0.1, 22.0±0.1, 22.6±0.1, 23.4±0.1, 24.4±0.1, 25.1±0.1, 24.8±0.1, 25.9±0.1, 26.0±0.1, 27.2±0.1, 28.2±0.1, 29.7±0.1, 30.7±0.1, 31.5±0.1, 33.5±0.1, 35.7±0.1, 37.4±0.1, and 39.5±0.1 °2θ (e.g., 6.5, 8.5, 10.2, 12.9, 15.1, 16.0, 16.9, 17.2, 18.0, 18.9, 20.4, 20.5, 21.0, 22.0, 22.6, 23.4, 24.4, 25.1, 24.8, 25.9, 26.0, 27.2, 28.2, 29.7, 30.7, 31.5, 33.5, 35.7, 37.4, and 39.5 °2θ))), using Cu K alpha radiation when measured at 25° C.

In some embodiments, the crystalline form of Compound 1 freebase is characterized by an XRPD pattern having at least one X-ray powder diffraction signal at 6.5±0.2, 8.5±0.2, 10.2±0.2, 12.9±0.2, 15.1±0.2, 16.0±0.2, 16.9±0.2, 17.2±0.2, 18.0±0.2, 18.9±0.2, 20.4±0.2, 20.5±0.2, 21.0±0.2, 22.0±0.2, 22.6±0.2, 23.4±0.2, 24.4±0.2, 25.1±0.2, 24.8±0.2, 25.9±0.2, 26.0±0.2, 27.2±0.2, 28.2±0.2, 29.7±0.2, 30.7±0.2, 31.5±0.2, 33.5±0.2, 35.7±0.2, 37.4±0.2, and 39.5±0.2 °2θ, using Cu K alpha radiation when measured at 25° C.

In some embodiments, the crystalline form of Compound 1 freebase is characterized by an XRPD pattern comprising one or more signals as described in Table 5 below.

In some embodiments, the crystalline form of Compound 1 freebase is characterized by an XRPD pattern comprising two or more signals as described in Table 5 below.

In some embodiments, the crystalline form of Compound 1 freebase is characterized by an XRPD pattern comprising three or more signals as described in Table 5 below.

In some embodiments, the crystalline form of Compound 1 freebase is characterized by an XRPD pattern comprising four or more signals as described in Table 5 below.

TABLE 5

| Signal No. | Angle (°2θ) | Relative intensity |
|---|---|---|
| 1 | 6.5 | 82 |
| 2 | 8.5 | 58 |
| 3 | 10.2 | 44 |
| 4 | 12.9 | 16 |
| 5 | 15.1 | 18 |
| 6 | 16.0 | 100 |
| 7 | 16.9 | 34 |
| 8 | 17.2 | 17 |
| 9 | 18.0 | 50 |
| 10 | 18.9 | 20 |
| 11 | 20.4 | 33 |
| 12 | 20.5 | 74 |
| 13 | 21.0 | 56 |
| 14 | 22.0 | 54 |
| 15 | 22.6 | 26 |
| 16 | 23.4 | 29 |
| 17 | 24.4 | 44 |
| 18 | 24.8 | 19 |
| 19 | 25.1 | 34 |
| 20 | 25.9 | 19 |
| 21 | 26.0 | 17 |
| 22 | 27.2 | 40 |
| 23 | 28.2 | 12 |
| 24 | 29.7 | 12 |
| 25 | 30.7 | 10 |
| 26 | 31.5 | 8 |
| 27 | 33.5 | 5 |
| 28 | 35.7 | 9 |
| 29 | 37.4 | 5 |
| 30 | 39.5 | 5 |

*The values shown in the above table are approximate value and subject to instrument differentiation and standard error.

Figure 5A:
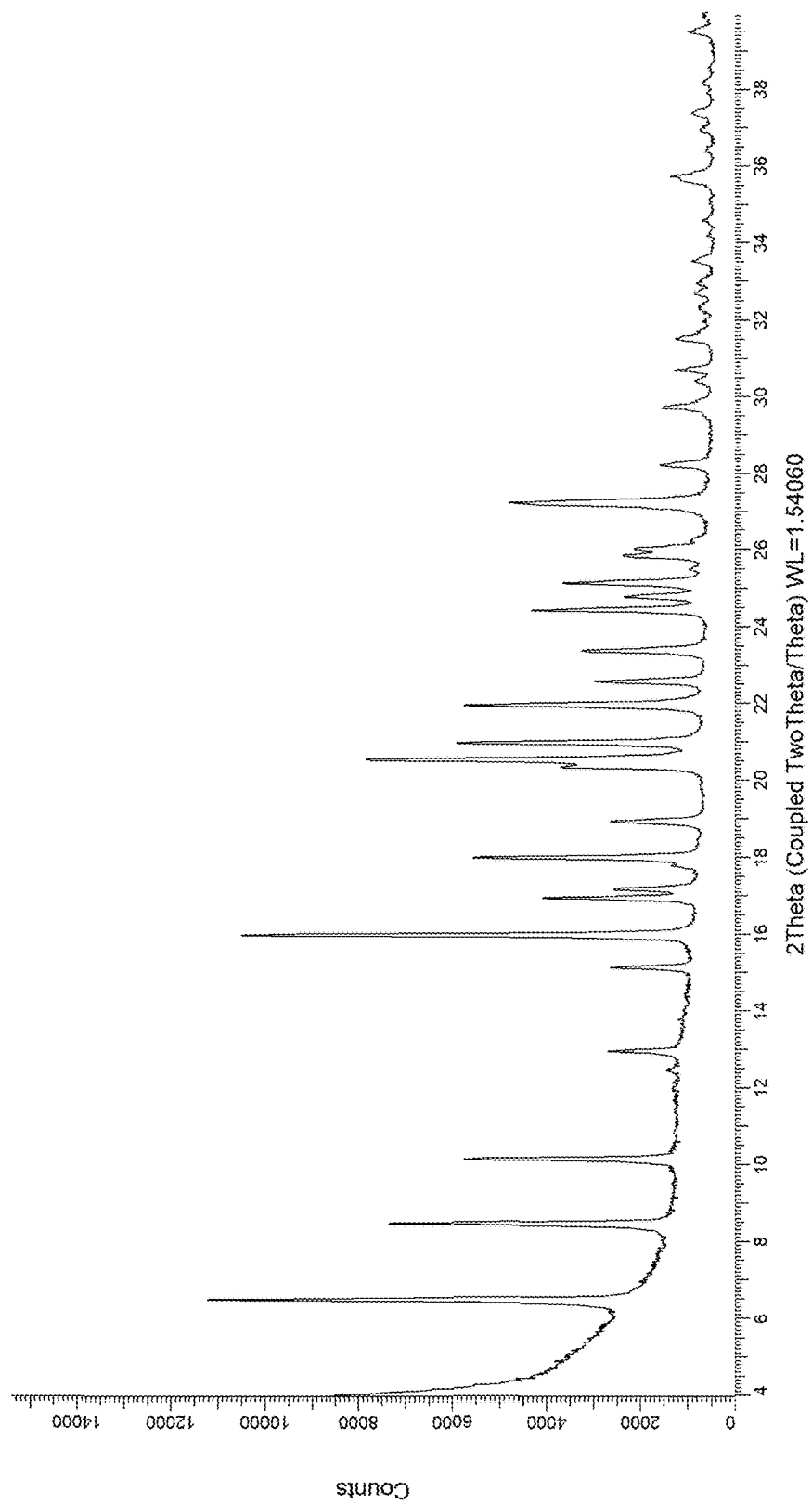
FIG. 5A depicts the XRPD of Form IV Freebase.

In some embodiments, the crystalline form of Compound 1 freebase is characterized by an XRPD pattern substantially similar to that set forth in FIG. 5A and/or Table 5. In some embodiments, the crystalline form of Compound 1 freebase so characterized is crystalline Form IV freebase.

In some embodiments, Form IV freebase is pure-phase Form IV freebase.

(vi) Crystalline Pattern A Freebase

In some embodiments, the crystalline form of Compound 1 freebase is crystalline Pattern A freebase. In some embodiments, crystalline Pattern A freebase is as defined in the present section (a)(vi).

In some embodiments, the crystalline form of Compound 1 freebase is characterized by having an X-ray powder diffraction signal at 11.9±0.5, 21.2±0.5, and 26.8±0.5 °2θ (e.g., 11.9±0.2, 21.2±0.2, and 26.8±0.2 °2θ (e.g., 11.9±0.1, 21.2±0.1, and 26.8±0.1 °2θ (e.g., 11.9, 21.2, and 26.8 °2θ))), using Cu K alpha radiation when measured at 25° C.

In some embodiments, the crystalline form of Compound 1 freebase of Compound 1 is characterized by an XRPD pattern comprising one or more signals as described in Table 6 below.

In some embodiments, the crystalline form of Compound 1 freebase of Compound 1 is characterized by an XRPD pattern comprising two or more signals as described in Table 6 below.

In some embodiments, the crystalline form of Compound 1 freebase of Compound 1 is characterized by an XRPD pattern comprising three or more signals as described in Table 6 below.

In some embodiments, the crystalline form of Compound 1 freebase of Compound 1 is characterized by an XRPD pattern comprising four or more signals as described in Table 6 below.

TABLE 6

| Signal No. | Angle (°2θ) | Relative intensity |
|---|---|---|
| 1 | 5.6 | 14 |
| 2 | 11.3 | 24 |
| 3 | 11.9 | 100 |
| 4 | 13.0 | 27 |
| 5 | 13.9 | 13 |
| 6 | 15.3 | 30 |
| 7 | 16.9 | 15 |
| 8 | 17.9 | 15 |
| 9 | 18.8 | 17 |
| 10 | 19.3 | 14 |
| 11 | 20.3 | 9 |
| 12 | 21.2 | 82 |
| 13 | 22.9 | 36 |
| 14 | 23.1 | 32 |
| 15 | 23.9 | 27 |
| 16 | 25.1 | 20 |
| 17 | 26.8 | 67 |
| 18 | 27.2 | 35 |
| 19 | 28.2 | 11 |
| 20 | 29.1 | 13 |

*The values shown in the above table are approximate value and subject to instrument differentiation and standard error.

Figure 7A:
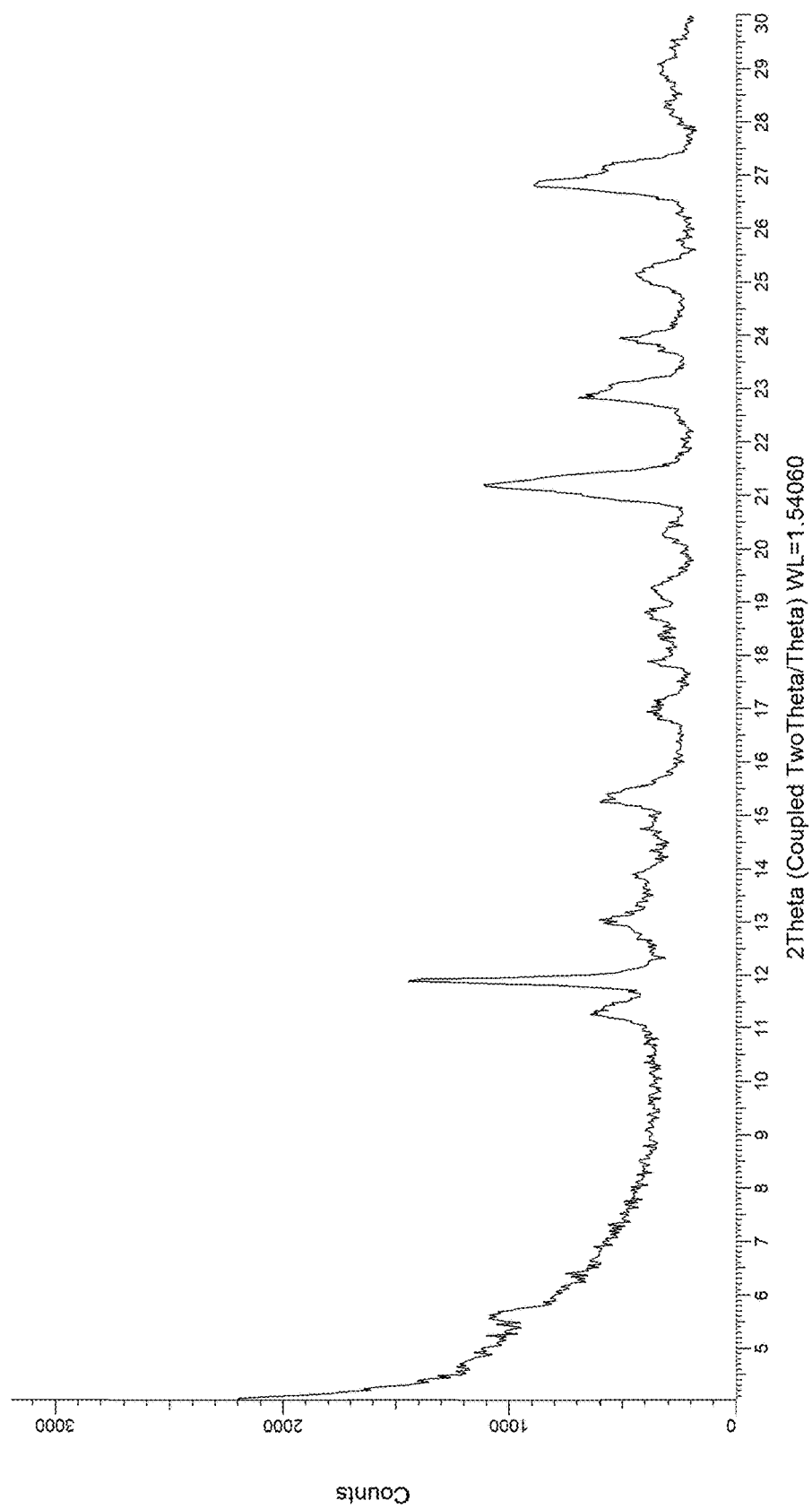
FIG. 7A depicts the XRPD of Pattern A Freebase.

In some embodiments, the crystalline form of Compound 1 freebase is characterized by an XRPD pattern substantially similar to that set forth in FIG. 7A and/or Table 6. In some embodiments, the crystalline form of Compound 1 freebase so characterized is crystalline Pattern A freebase.

(vii) Crystalline Pattern B Freebase

In some embodiments, the crystalline form of Compound 1 freebase is crystalline Pattern B freebase. In some embodiments, crystalline Pattern B freebase is as defined in the present section (a)(vii).

In some embodiments, the crystalline form of Compound 1 freebase is characterized by having an X-ray powder diffraction signal at 5.6±0.5, 16.9±0.5, and 22.6±0.5 °2θ (e.g., 5.6±0.2, 16.9±0.2, and 22.6±0.2 °2θ (e.g., 5.6±0.1, 16.9±0.1, and 22.6±0.1 °2θ (e.g., 5.6, 16.9, and 22.6 °2θ))), using Cu K alpha radiation when measured at 25° C.

In some embodiments, the crystalline form of Compound 1 freebase of Compound 1 is characterized by an XRPD pattern comprising one or more signals as described in Table 7 below.

In some embodiments, the crystalline form of Compound 1 freebase of Compound 1 is characterized by an XRPD pattern comprising two or more signals as described in Table 7 below.

In some embodiments, the crystalline form of Compound 1 freebase of Compound 1 is characterized by an XRPD pattern comprising three or more signals as described in Table 7 below.

In some embodiments, the crystalline form of Compound 1 freebase of Compound 1 is characterized by an XRPD pattern comprising four or more signals as described in Table 7 below.

TABLE 7

| Signal No. | Angle (°2θ) | Relative intensity |
|---|---|---|
| 1 | 5.6 | 100 |
| 2 | 10.5 | 2 |
| 3 | 15.0 | 2 |
| 4 | 16.4 | 1 |
| 5 | 16.9 | 13 |
| 6 | 17.8 | 1 |
| 7 | 18.1 | 1 |
| 8 | 18.4 | 2 |
| 9 | 20.0 | 1 |

TABLE 7-continued

| Signal No. | Angle (°2θ) | Relative intensity |
|---|---|---|
| 10 | 20.4 | 1 |
| 11 | 21.3 | 1 |
| 12 | 21.7 | 1 |
| 13 | 22.1 | 1 |
| 14 | 22.6 | 7 |
| 15 | 24.2 | 1 |
| 16 | 25.0 | 1 |
| 17 | 25.8 | 1 |
| 18 | 26.0 | 1 |

*The values shown in the above table are approximate value and subject to instrument differentiation and standard error.

Figure 7B:
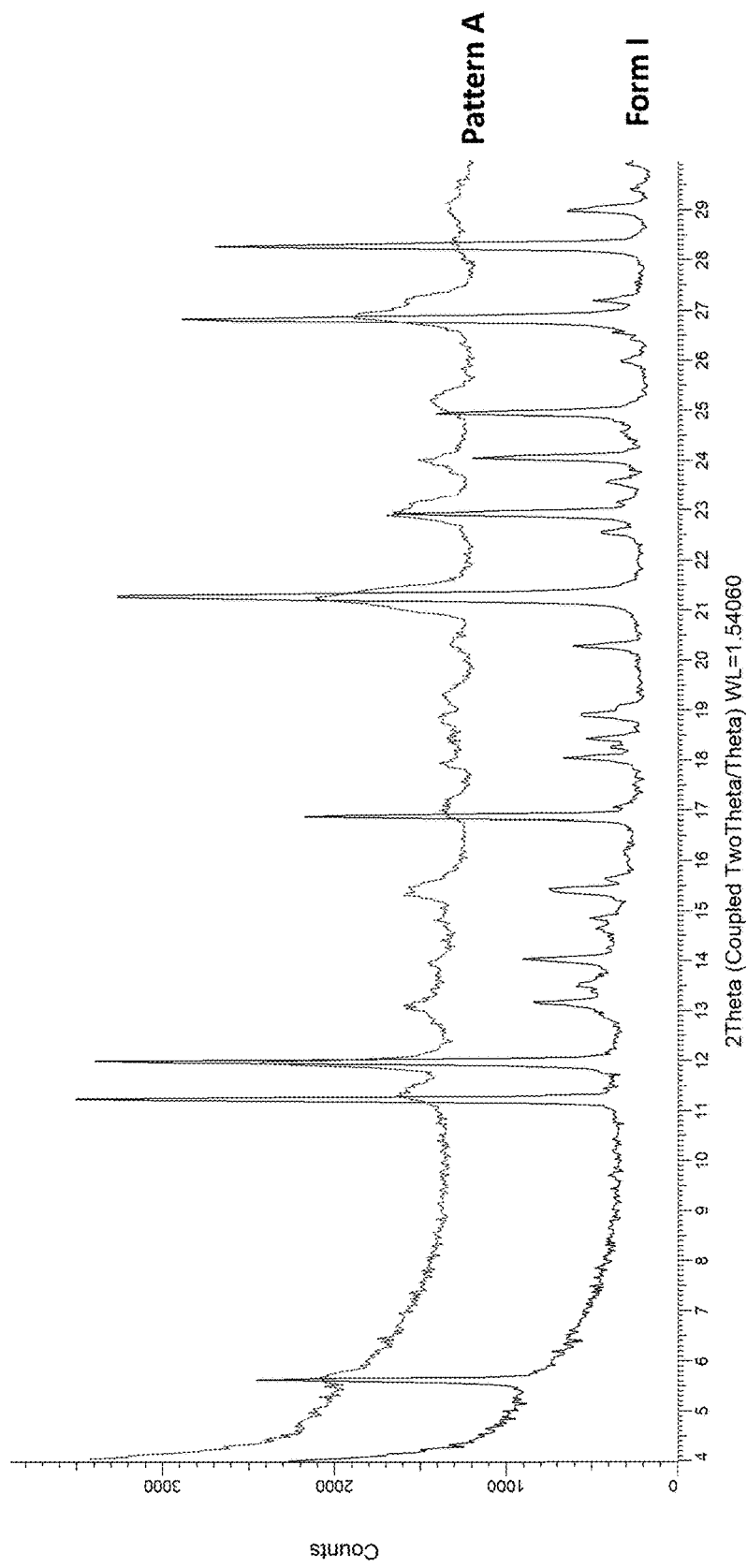
FIG. 7B depicts the XRPD of Pattern A Freebase and Form I Freebase.
Figure 7C:
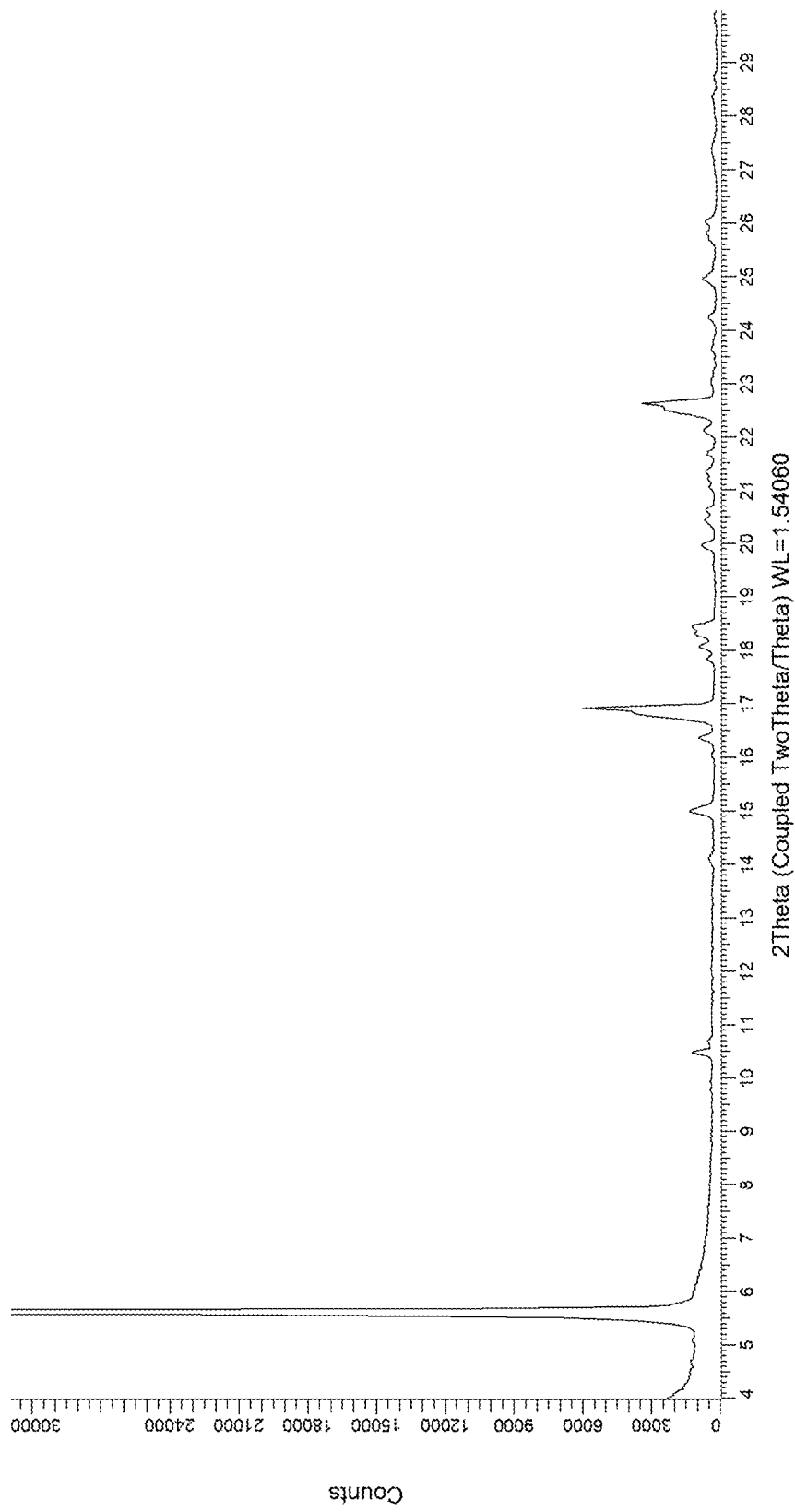
FIG. 7C depicts the XRPD of Pattern B Freebase.

In some embodiments, the crystalline form of Compound 1 freebase is characterized by an XRPD pattern substantially similar to that set forth in FIG. 7C and/or Table 7. In some embodiments, the crystalline form of Compound 1 freebase so characterized is crystalline Pattern B freebase.

(viii) Crystalline Pattern C Freebase

In some embodiments, the crystalline form of Compound 1 freebase is crystalline Pattern C freebase. In some embodiments, crystalline Pattern C freebase is as defined in the present section (a)(viii).

In some embodiments, the crystalline form of Compound 1 freebase is characterized by having an X-ray powder diffraction signals at 4.5±0.5 and 9.0±0.5 °2θ (e.g., 4.5±0.2 and 9.0±0.2 °2θ (e.g., 4.5±0.1 and 9.0±0.1 °2θ (e.g., 4.5 and 9.0 °2θ))), using Cu K alpha radiation when measured at 25° C.

In some embodiments, the crystalline form of Compound 1 freebase is characterized by having an X-ray powder diffraction signal at 4.5±0.5, 9.0±0.5, and 13.4±0.5 °2θ (e.g., 4.5±0.2, 9.0±0.2, and 13.4±0.2 °2θ (e.g., 4.5±0.1, 9.0±0.1, and 13.4±0.1 °2θ (e.g., 4.5, 9.0, and 13.4 °2θ))), using Cu K alpha radiation when measured at 25° C.

In some embodiments, the crystalline form of Compound 1 freebase is characterized by an XRPD pattern comprising one or more signals as described in Table 8 below.

In some embodiments, the crystalline form of Compound 1 freebase is characterized by an XRPD pattern comprising two or more signals as described in Table 8 below.

In some embodiments, the crystalline form of Compound 1 freebase is characterized by an XRPD pattern comprising three or more signals as described in Table 8 below.

In some embodiments, the crystalline form of Compound 1 freebase is characterized by an XRPD pattern comprising four or more signals as described in Table 8 below.

TABLE 8

| Signal No. | Angle (°2θ) | Relative intensity |
|---|---|---|
| 1 | 4.5 | 100 |
| 2 | 9.0 | 41 |
| 3 | 11.3 | 2 |
| 4 | 13.4 | 8 |
| 5 | 17.0 | 1 |
| 6 | 17.9 | 2 |
| 7 | 20.7 | 1 |
| 8 | 22.5 | 1 |
| 9 | 24.8 | 4 |
| 10 | 26.7 | 1 |
| 11 | 27.0 | 3 |
| 12 | 28.5 | 1 |

*The values shown in the above table are approximate value and subject to instrument differentiation and standard error.

Figure 7D:
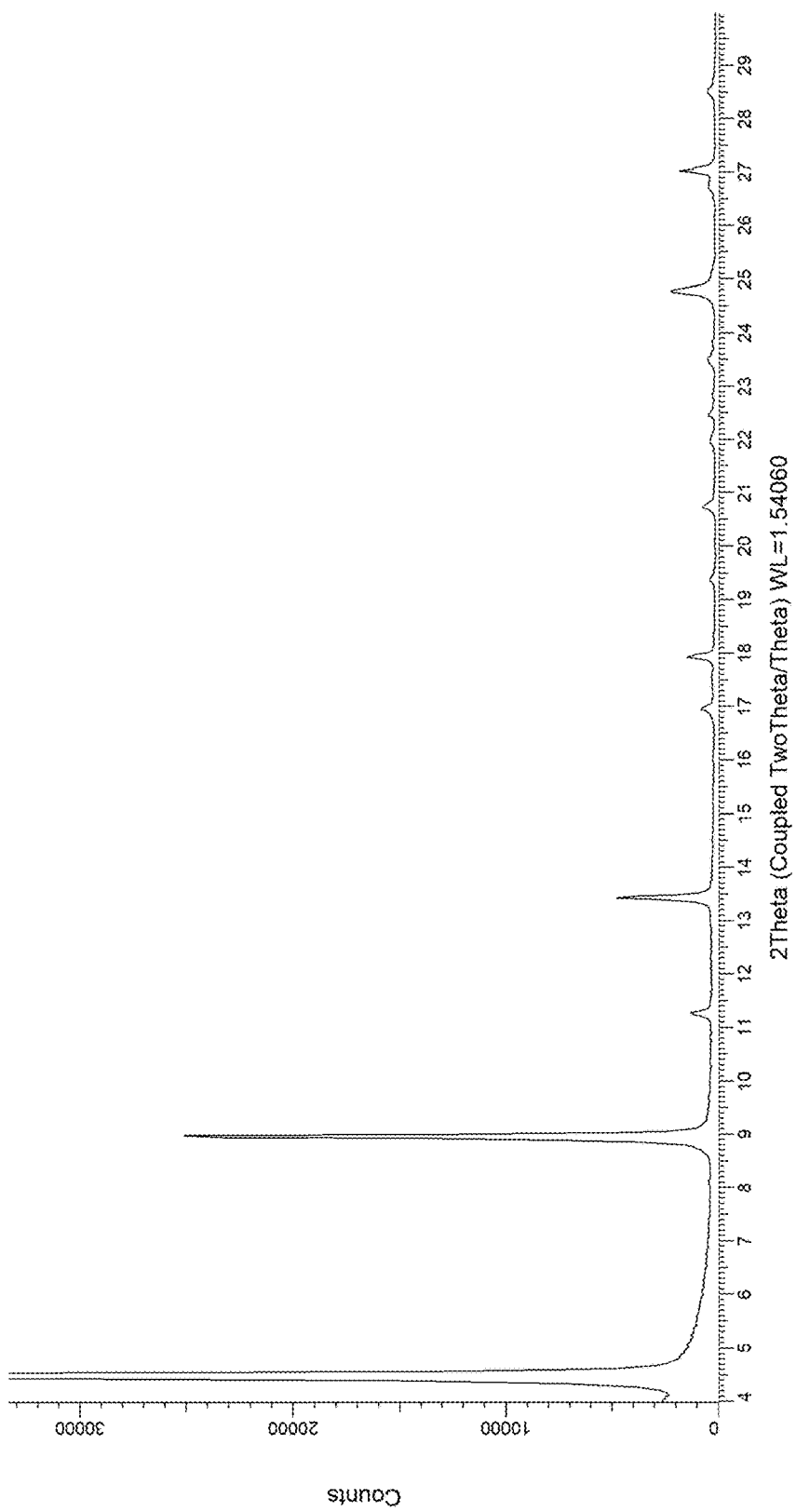
FIG. 7D depicts the XRPD of Pattern C Freebase.

In some embodiments, the crystalline form of Compound 1 freebase is characterized by an XRPD pattern substantially similar to that set forth in FIG. 7D and/or Table 8. In some embodiments, the crystalline form of Compound 1 freebase so characterized is crystalline Pattern C freebase.

(b) Differential Scanning Calorimetry (DSC) Characterizations of Crystalline Forms In some embodiments, the crystalline form of Compound 1 freebase has a Differential Scanning Calorimetry (DSC) thermogram characterized by an endothermic event, an onset temperature and/or a peak temperature as measured by DSC.

In some embodiments, said DSC is performed using a TA Discovery DSC.

In some embodiments, said DSC is performed on a sample of 1-5 mg.

In some embodiments, said DSC is performed according to the ramp method.

In some embodiments, said DSC is performed with a heating rate of 10.0° C./min.

In some embodiments, said DSC is performed with a temperature range from 30 to 300° C.

In some embodiments, said DSC is performed using $N_2$ gas at 50.00 mL/min.

(i) Crystalline Form V Freebase

In some embodiments, the crystalline form of Compound 1 freebase is crystalline Form V freebase. In some embodiments, crystalline Form V freebase has a Differential Scanning Calorimetry (DSC) thermogram characterized by an endothermic event, an onset temperature and/or a peak temperature as defined in the present section (b)(i).

In some embodiments, the crystalline form of Compound 1 freebase is characterized by an endothermic event between about 215° C. to about 230° C., as measured by DSC.

In some embodiments, the crystalline form of Compound 1 freebase is characterized by a single endothermic event between about 215° C. to about 230° C., as measured by DSC.

In some embodiments, the crystalline form of Compound 1 freebase is characterized by an endothermic event at 215±20° C., 215±15° C., 215±10° C., or 215±5° C. (e.g., at about 215° C.), as measured by DSC.

In some embodiments, the crystalline form of Compound 1 freebase is characterized by an endothermic event at 230±20° C., 230±15° C., 230±10° C., or 230±5° C. (e.g., at about 230° C.), as measured by DSC.

In some embodiments, the crystalline form of Compound 1 freebase is characterized by an onset temperature between about 227.5° C. and 227.7° C., as measured by DSC.

In some embodiments, the crystalline form of Compound 1 freebase is characterized by an onset temperature at 227.5±20° C., 227.5±15° C., 227.5±10° C., or 227.5±5° C. (e.g., at about 227.5° C.), as measured by DSC.

In some embodiments, the crystalline form of Compound 1 freebase is characterized by an onset temperature at 227.7±20° C., 227.7±15° C., 227.7±10° C., or 227.7±5° C. (e.g., at about 227.7° C.), as measured by DSC.

In some embodiments, the crystalline form of Compound 1 freebase is characterized by a peak temperature between about 228.8° C. and 229.9° C., as measured by DSC.

In some embodiments, the crystalline form of Compound 1 freebase is characterized by a peak temperature at 228.8±20° C., 228.8±15° C., 228.8±10° C., or 228.8±5° C. (e.g., at about 228.8° C.), as measured by DSC.

In some embodiments, the crystalline form of Compound 1 freebase is characterized by a peak temperature at 229.9±20° C., 229.9±15° C., 229.9±10° C., or 229.9±5° C. (e.g., at about 229.9° C.), as measured by DSC.

Figure 6B:
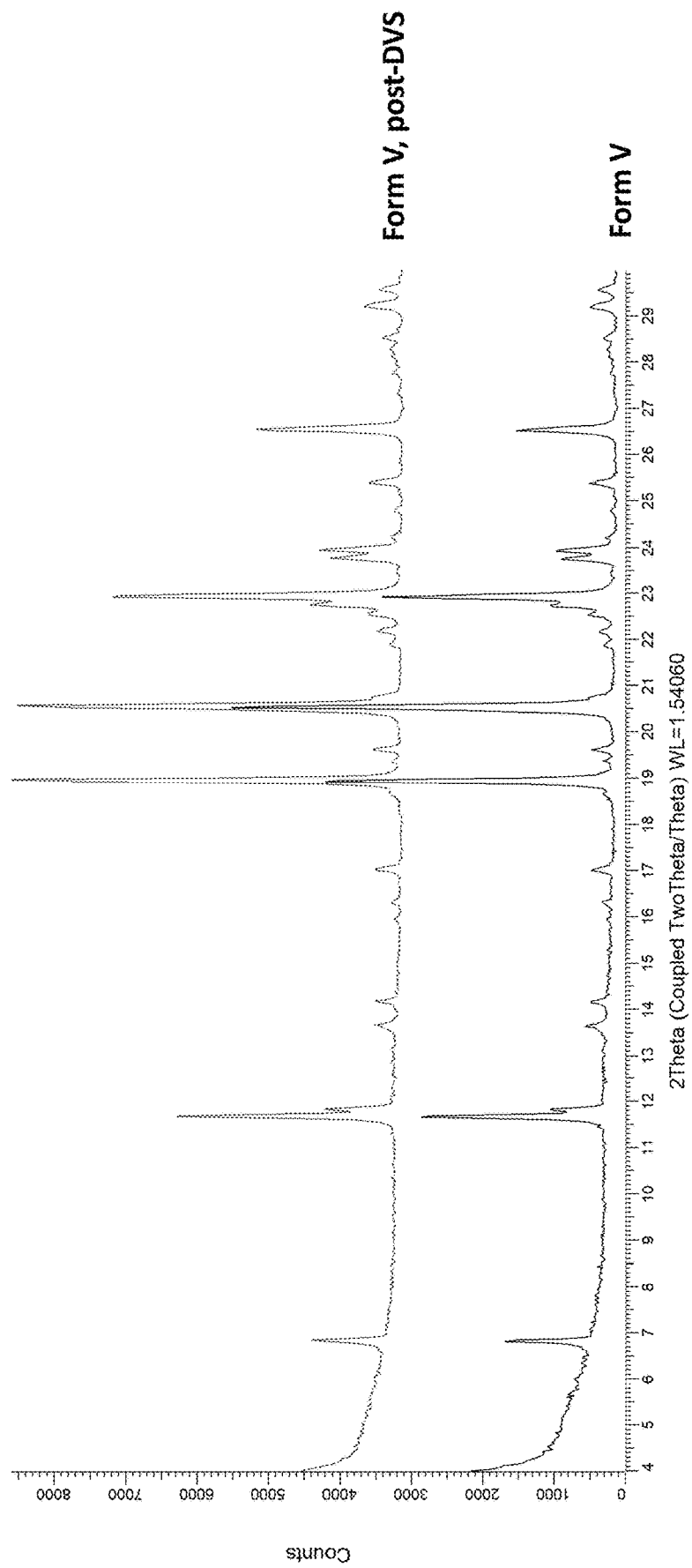
FIG. 6B depicts the XRPD of Form V Freebase, before and after DVS.
Figure 6C:
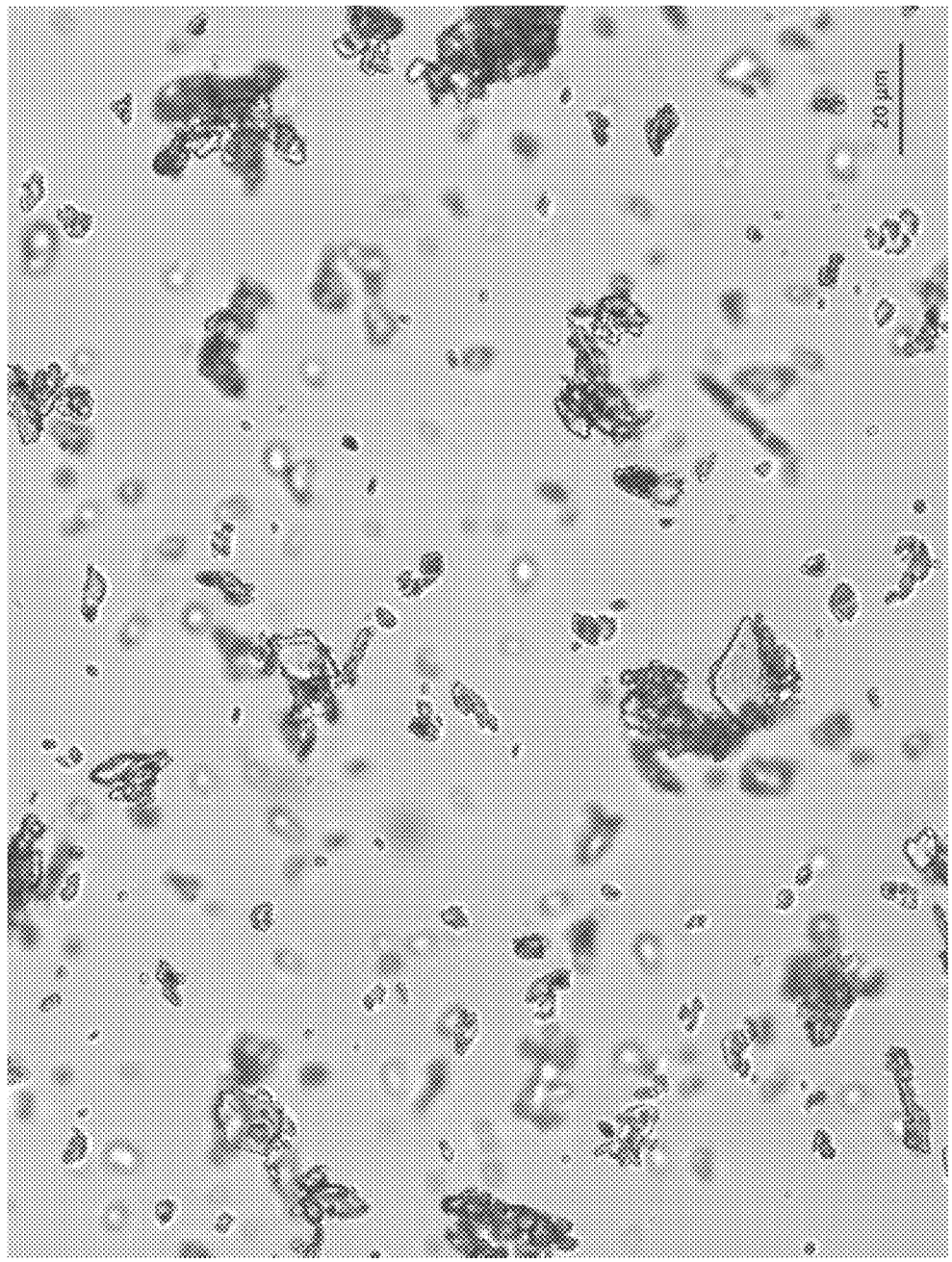
FIG. 6C depicts the Form V Freebase PLM.
Figure 6D:
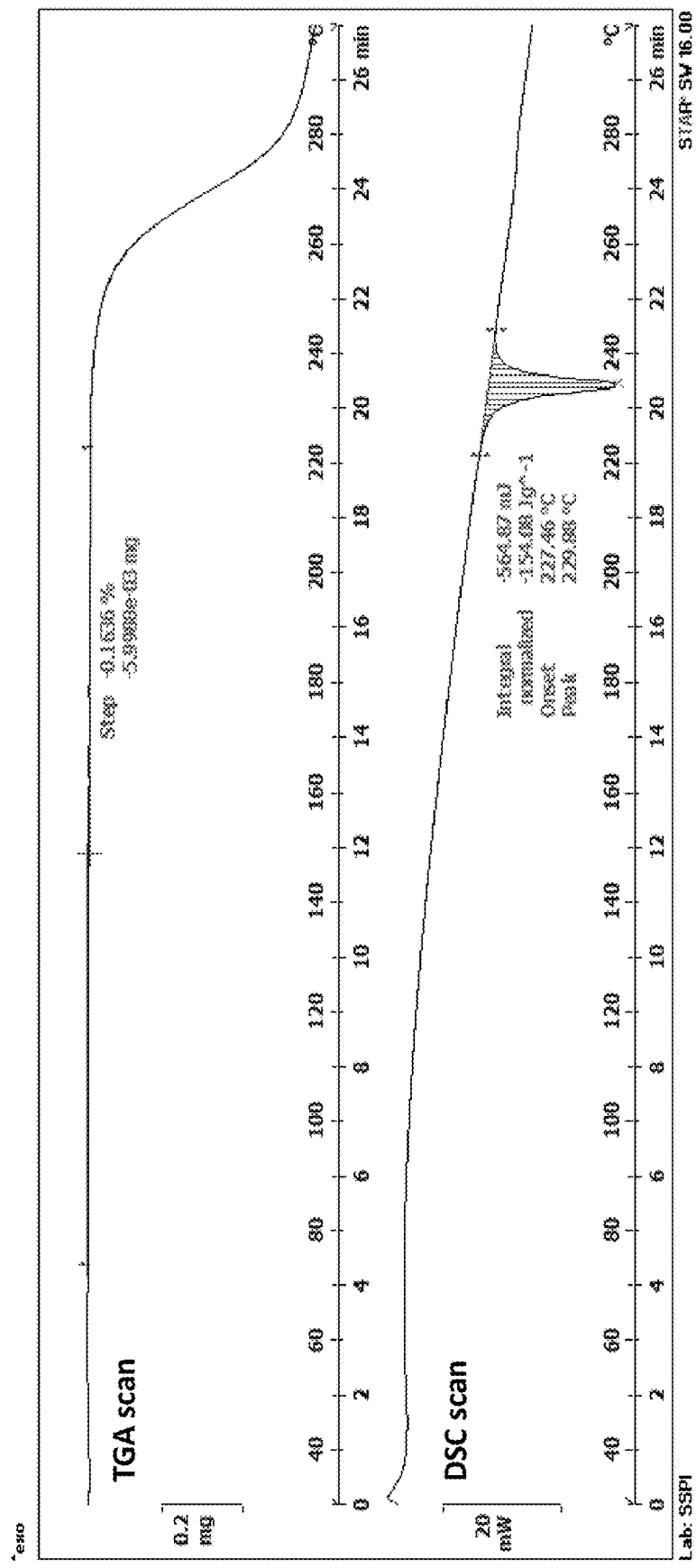
FIG. 6D depicts the S-TGA/DSC of Form V Freebase.
Figure 6E:
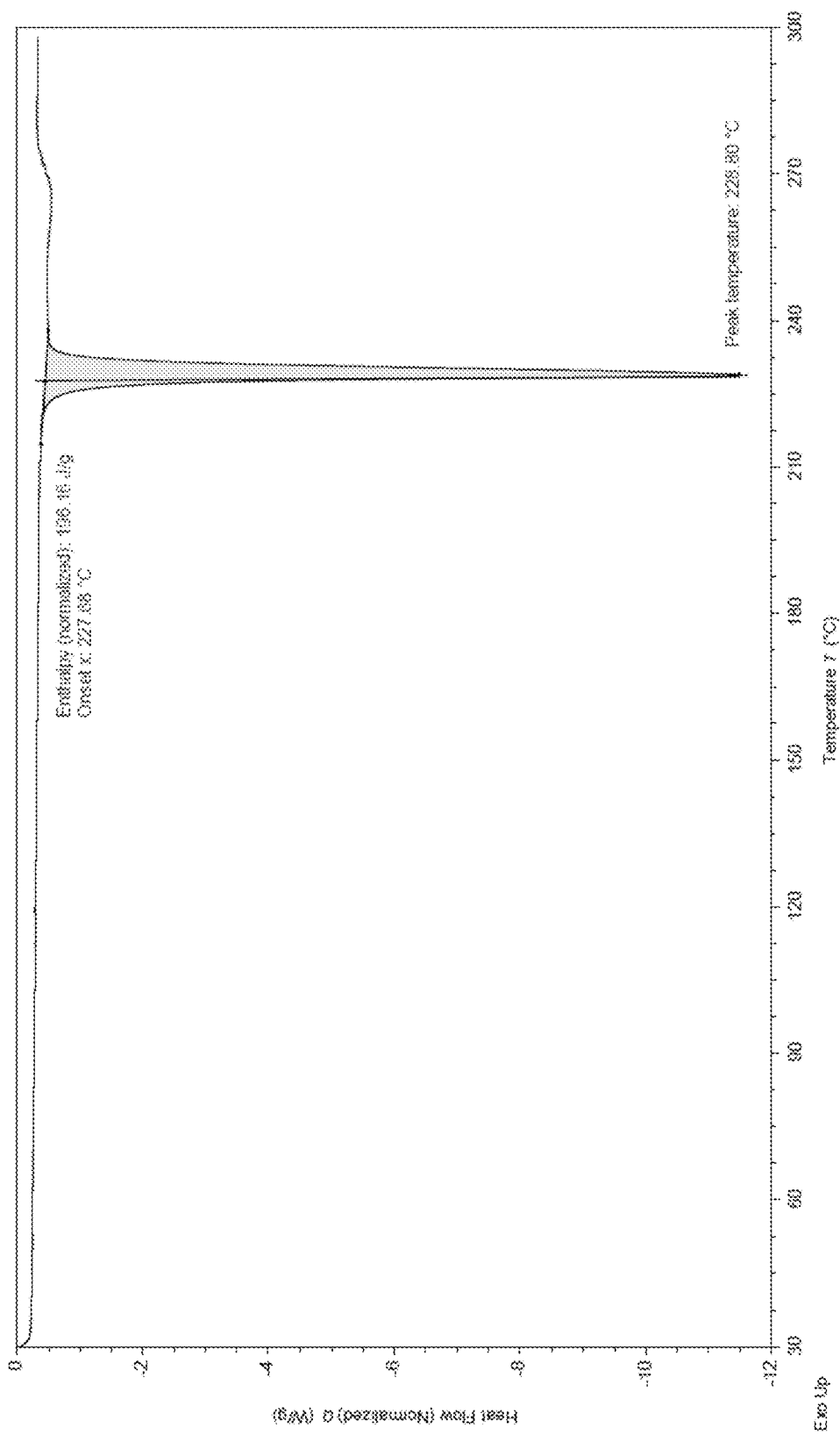
FIG. 6E depicts the DSC of Form V Freebase.

In some embodiments, the crystalline form of Compound 1 freebase is characterized by having a DSC scan substantially similar to that set forth in FIG. 6E. In some embodiments, the crystalline form of Compound 1 freebase so characterized is Form V freebase.

In some embodiments, said DSC measurement is performed with a heating rate of 10.0° C./min, using a TA Discovery DSC and/or on a sample of 1-5 mg.

In some embodiments, the crystalline form of Compound 1 freebase is crystalline form V characterized by an onset temperature between about 227.4° C. and 227.7° C., such as between about 227.5° C. and 227.7° C., as measured by DSC performed with a heating rate of 10.0° C./min, using a TA Discovery DSC and/or on a sample of 1-5 mg.

In some embodiments, the crystalline form of Compound 1 freebase is crystalline form V characterized by a peak temperature between about 228.8° C. and 229.9° C., as measured by DSC performed with a heating rate of 10.0° C./min, using a TA Discovery DSC and/or on a sample of 1-5 mg.

In some embodiments, the crystalline form of Compound 1 freebase is crystalline form V characterized by an onset temperature between about 227.5° C. and 227.7° C., and by a peak temperature between about 228.8° C. and 229.9° C., as measured by DSC performed with a heating rate of 10.0° C./min, using a TA Discovery DSC and/or on a sample of 1-5 mg.

In some embodiments, the crystalline form of Compound 1 freebase is crystalline form V, characterized by an XRPD pattern comprising signals at 6.8±0.2, 18.9±0.2, 20.5±0.2 and 22.9±0.2 °2θ using Cu K alpha radiation when measured at 25° C. and by an onset temperature between about 227.5° C. and 227.7° C., and/or by a peak temperature between about 228.8° C. and 229.9° C., as measured by DSC performed with a heating rate of 10.0° C./min, using a TA Discovery DSC and/or on a sample of 1-5 mg.

In some embodiments, the crystalline form of Compound 1 freebase is crystalline form V, characterized by an XRPD pattern comprising signals at 6.8±0.2, 18.9±0.2, 20.5±0.2, 22.9±0.2, 23.8±0.2, and 26.5±0.2 °2θ using Cu K alpha radiation when measured at 25° C. and by an onset temperature between about 227.5° C. and 227.7° C., and/or by a peak temperature between about 228.8° C. and 229.9° C., as measured by DSC performed with a heating rate of 10.0° C./min, using a TA Discovery DSC and/or on a sample of 1-5 mg.

In some embodiments, the crystalline form of Compound 1 freebase is crystalline form V, characterized by an XRPD pattern comprising signals at 11.7±0.2, 18.9±0.2, 20.5±0.2 and 22.9±0.2, °2θ using Cu K alpha radiation when measured at 25° C. and by an onset temperature between about 227.5° C. and 227.7° C., and/or by a peak temperature between about 228.8° C. and 229.9° C., as measured by DSC performed with a heating rate of 10.0° C./min, using a TA Discovery DSC and/or on a sample of 1-5 mg.

In some embodiments, the crystalline form of Compound 1 freebase is crystalline form V, characterized by an XRPD pattern comprising signals at 11.7±0.2, 18.9±0.2, 20.5±0.2, 22.9±0.2, 23.8±0.2, and 26.5±0.2 °2θ using Cu K alpha radiation when measured at 25° C. and by an onset temperature between about 227.5° C. and 227.7° C., and/or by a peak temperature between about 228.8° C. and 229.9° C., as measured by DSC performed with a heating rate of 10.0° C./min, using a TA Discovery DSC and/or on a sample of 1-5 mg.

In some embodiments, the crystalline form of Compound 1 freebase is crystalline form V, characterized by an XRPD pattern comprising signals at 6.8±0.2, 11.7±0.2, 18.9±0.2, 20.5±0.2 and 22.9±0.2 °2θ using Cu K alpha radiation when measured at 25° C. and by an onset temperature between about 227.5° C. and 227.7° C., and/or by a peak temperature between about 228.8° C. and 229.9° C., as measured by DSC performed with a heating rate of 10.0° C./min, using a TA Discovery DSC and/or on a sample of 1-5 mg.

In some embodiments, the crystalline form of Compound 1 freebase is crystalline form V, characterized by an XRPD pattern comprising signals at 6.8±0.2, 11.7±0.2, 18.9±0.2, 20.5±0.2, 22.9±0.2, 23.8±0.2, and 26.5±0.2 °2θ using Cu K alpha radiation when measured at 25° C. and by an onset temperature between about 227.5° C. and 227.7° C., and/or by a peak temperature between about 228.8° C. and 229.9° C., as measured by DSC performed with a heating rate of 10.0° C./min, using a TA Discovery DSC and/or on a sample of 1-5 mg.

(ii) Crystalline Form I Freebase

In some embodiments, the crystalline form of Compound 1 freebase is crystalline Form I freebase. In some embodiments, crystalline Form I freebase has a Differential Scanning Calorimetry (DSC) thermogram characterized by an endothermic event, an onset temperature and/or a peak temperature as defined in the present section (b)(ii).

In some embodiments, the crystalline form of Compound 1 freebase is characterized by an endothermic between about 210° C. to about 240° C., as measured by DSC.

In some embodiments, the crystalline form of Compound 1 freebase is characterized by an endothermic event at 210±20° C., 210±15° C., 210±10° C., or 210±5° C. (e.g., at about 210° C.), as measured by DSC.

In some embodiments, the crystalline form of Compound 1 freebase is characterized by an endothermic event at 240±20° C., 240±15° C., 240±10° C., or 240±5° C. (e.g., at about 240° C.), as measured by DSC.

In some embodiments, the crystalline form of Compound 1 freebase is characterized by an onset temperature between about 225° C. and 227° C., as measured by DSC.

In some embodiments, the crystalline form of Compound 1 freebase is characterized by an onset temperature at 225±20° C., 225±15° C., 225±10° C., or 225±5° C. (e.g., at about 225° C.), as measured by DSC.

In some embodiments, the crystalline form of Compound 1 freebase is characterized by an onset temperature at 227±20° C., 227±15° C., 227±10° C., or 227±5° C. (e.g., at about 227° C.), as measured by DSC.

In some embodiments, the crystalline form of Compound 1 freebase is characterized by a peak temperature between about 227° C. and 229° C., as measured by DSC.

In some embodiments, the crystalline form of Compound 1 freebase is characterized by a peak temperature at 227±20° C., 227±15° C., 227±10° C., or 227±5° C. (e.g., at about 227° C.), as measured by DSC.

In some embodiments, the crystalline form of Compound 1 freebase is characterized by a peak temperature at 229±20° C., 229±15° C., 229±10° C., or 229±5° C. (e.g., at about 229° C.), as measured by DSC.

Figure 2B:
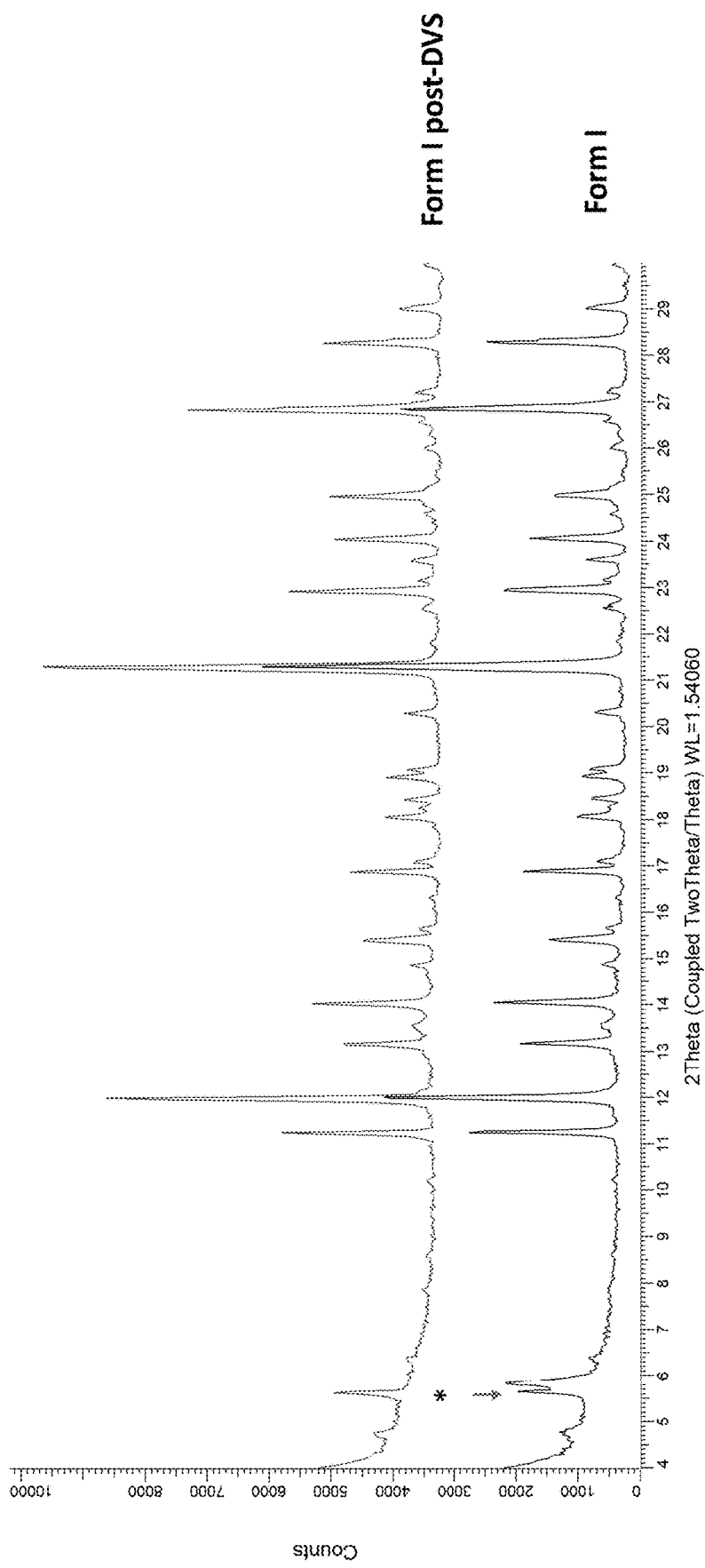
FIG. 2B depicts the XRPD of Form I Freebase, before and after DVS.
Figure 2C:
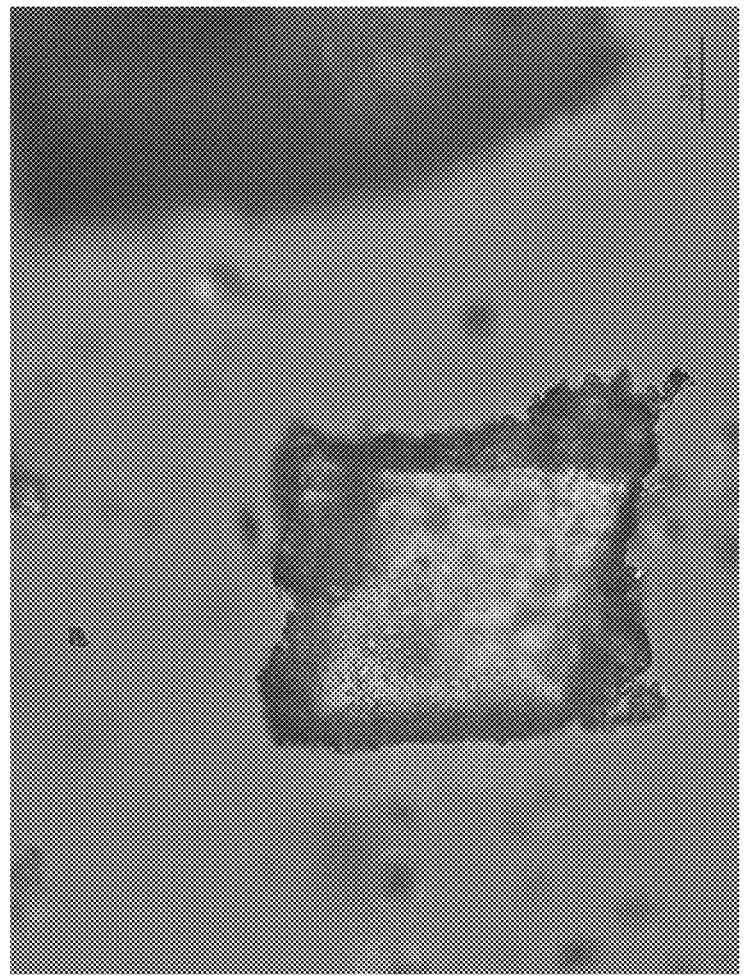
FIG. 2C depicts the Form I Freebase PLM.
Figure 2D:
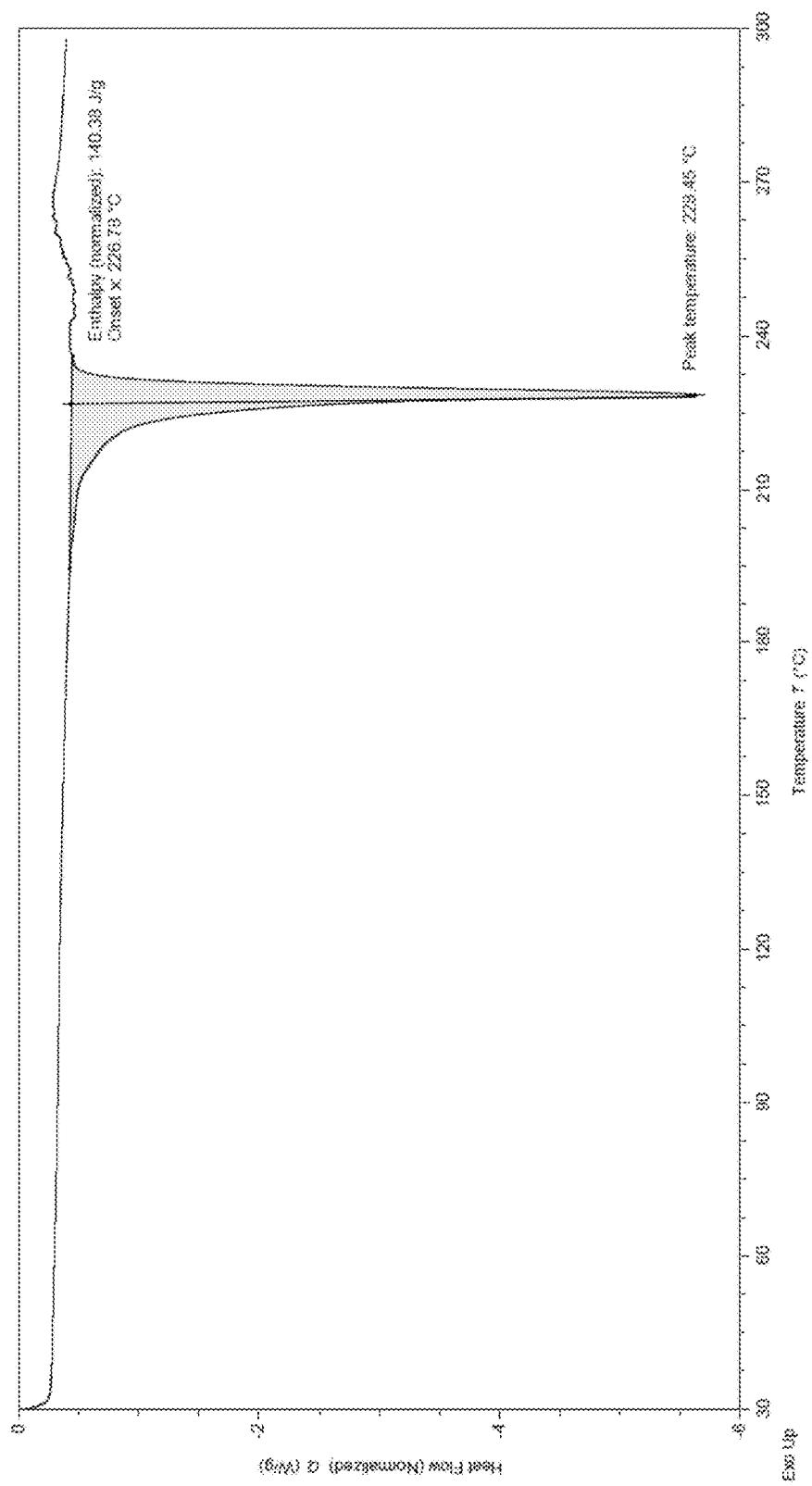
FIG. 2D depicts the DSC of Form I Freebase.

In some embodiments, the crystalline form of Compound 1 freebase is characterized by having a DSC scan substantially similar to that set forth in FIG. 2D. In some embodiments, the crystalline form of Compound 1 freebase so characterized is Form I freebase.

(iii) Crystalline Form II Freebase

In some embodiments, the crystalline form of Compound 1 freebase is crystalline Form II freebase. In some embodiments, crystalline Form II freebase has a Differential Scanning Calorimetry (DSC) thermogram characterized by an endothermic event, an onset temperature and/or a peak temperature as defined in the present section (b)(iii).

In some embodiments, the crystalline form of Compound 1 freebase is characterized by an endothermic between about 221° C. to about 230° C., as measured by DSC.

In some embodiments, the crystalline form of Compound 1 freebase is characterized by an endothermic event at 221±20° C., 221±15° C., 221±10° C., or 221±5° C. (e.g., at about 221° C.), as measured by DSC.

In some embodiments, the crystalline form of Compound 1 freebase is characterized by an endothermic event at 230±20° C., 230±15° C., 230±10° C., or 230±5° C. (e.g., at about 230° C.), as measured by DSC.

In some embodiments, the crystalline form of Compound 1 freebase is characterized by an onset temperature between about 221.5° C. and 221.9° C., as measured by DSC.

In some embodiments, the crystalline form of Compound 1 freebase is characterized by an onset temperature at 221.5±20° C., 221.5±15° C., 221.5±10° C., or 221.5±5° C. (e.g., at about 221.5° C.), as measured by DSC.

In some embodiments, the crystalline form of Compound 1 freebase is characterized by an onset temperature at 221.9±20° C., 221.9±15° C., 221.9±10° C., or 221.9±5° C. (e.g., at about 221.9° C.), as measured by DSC.

In some embodiments, the crystalline form of Compound 1 freebase is characterized by a peak temperature between about 225° C. and 225.8° C., as measured by DSC.

In some embodiments, the crystalline form of Compound 1 freebase is characterized by a peak temperature at 225±20° C., 225±15° C., 225±10° C., or 225±5° C. (e.g., at about 225° C.), as measured by DSC.

In some embodiments, the crystalline form of Compound 1 freebase is characterized by a peak temperature at 225.8±20° C., 225.8±15° C., 225.8±10° C., or 225.8±5° C. (e.g., at about 225.8° C.), as measured by DSC.

In some embodiments, said DSC measurement is performed with a heating rate of 10.0° C./min, using a TA Discovery DSC and/or on a sample of 1-5 mg.

Figure 3B:
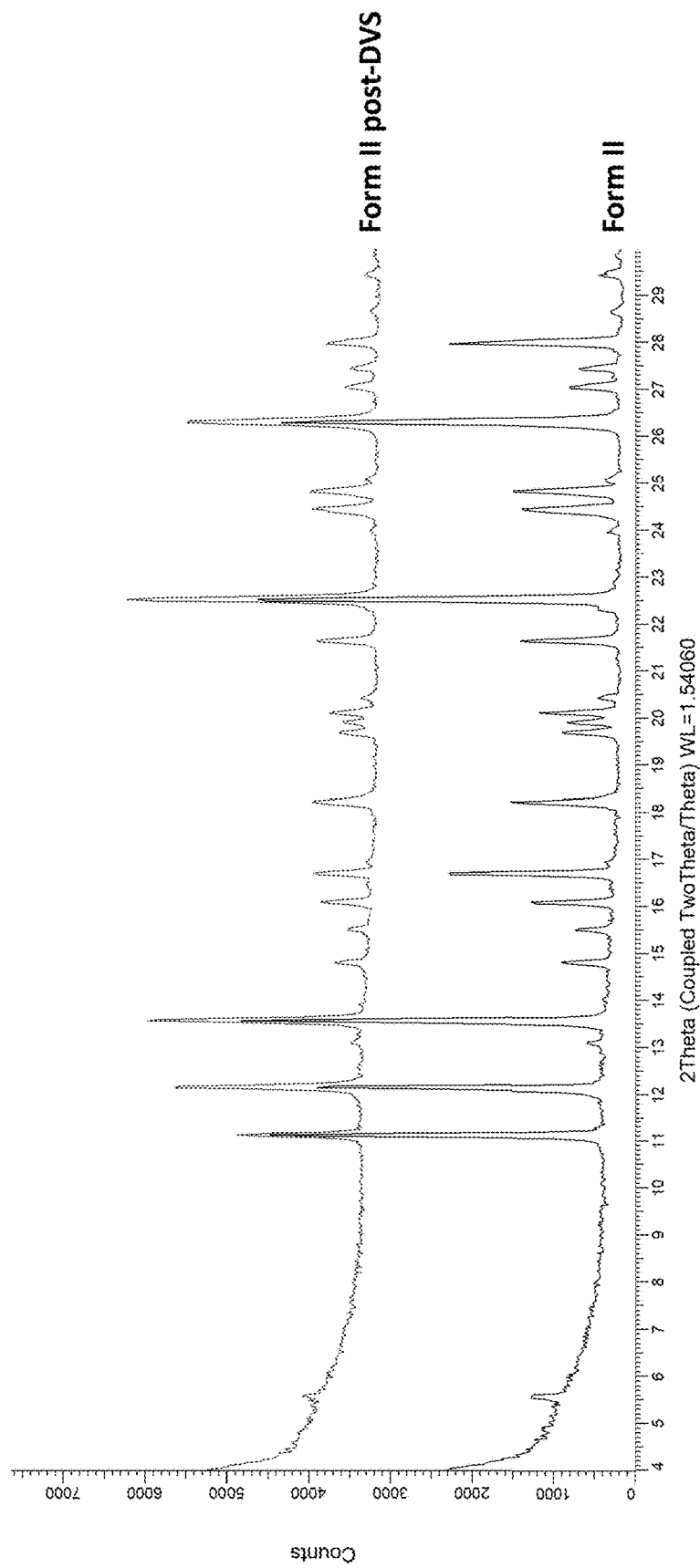
FIG. 3B depicts the XRPD of Form II Freebase, before and after DVS.
Figure 3C:
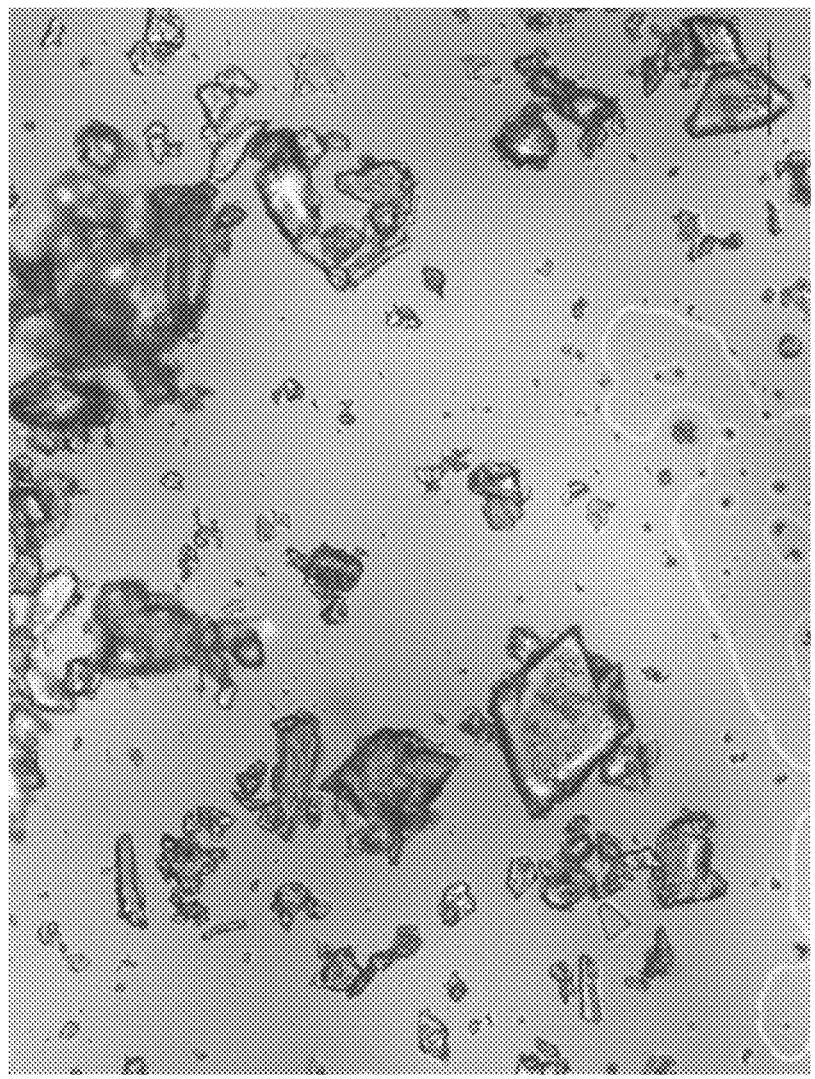
FIG. 3C depicts the Form II Freebase PLM.
Figure 3D:
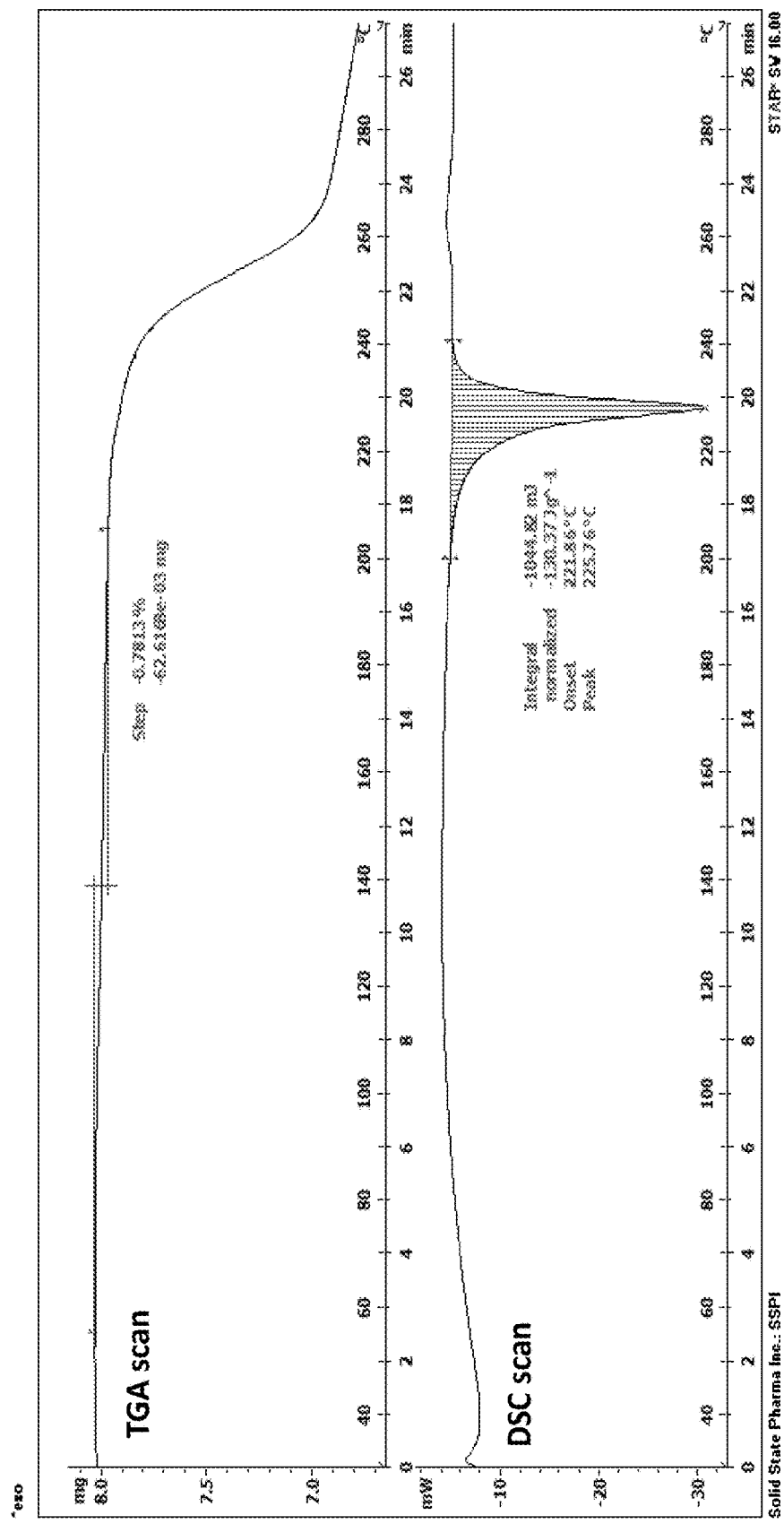
FIG. 3D depicts the S-TGA/DSC of Form II Freebase.
Figure 3E:
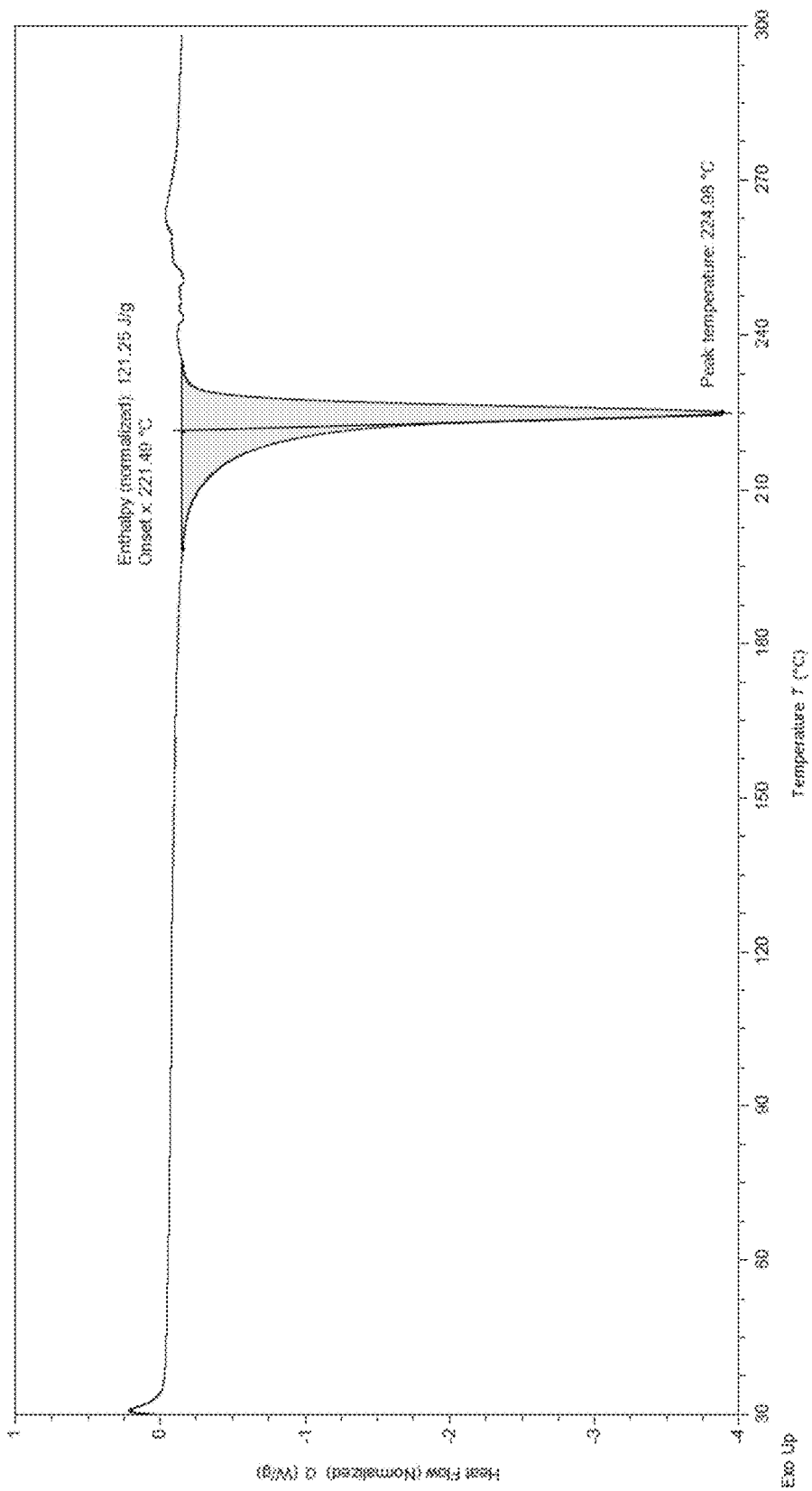
FIG. 3E depicts the DSC of Form II Freebase.

In some embodiments, the crystalline form of Compound 1 freebase is characterized by having a DSC scan substantially similar to that set forth in FIG. 3E. In some embodiments, the crystalline form of Compound 1 freebase so characterized is Form II freebase.

(iv) Crystalline Form III Freebase

In some embodiments, the crystalline form of Compound 1 freebase is crystalline Form III freebase. In some embodiments, crystalline Form III freebase has a Differential Scanning Calorimetry (DSC) thermogram characterized by an endothermic event, an onset temperature and/or a peak temperature as defined in the present section (b)(iv).

In some embodiments, the crystalline form of Compound 1 freebase is characterized by an endothermic between about 220° C. to about 245° C., as measured by DSC.

In some embodiments, the crystalline form of Compound 1 freebase is characterized by an endothermic event at 220±20° C., 220±15° C., 220±10° C., or 220±5° C. (e.g., at about 220° C.), as measured by DSC.

In some embodiments, the crystalline form of Compound 1 freebase is characterized by an endothermic event at 245±20° C., 245±15° C., 245±10° C., or 245±5° C. (e.g., at about 245° C.), as measured by DSC.

In some embodiments, the crystalline form of Compound 1 freebase is characterized by an onset temperature between about 221.5° C. and 229.4° C., as measured by DSC.

In some embodiments, the crystalline form of Compound 1 freebase is characterized by an onset temperature at 221.5±20° C., 221.5±15° C., 221.5±10° C., or 221.5±5° C. (e.g., at about 221.5° C.), as measured by DSC.

In some embodiments, the crystalline form of Compound 1 freebase is characterized by an onset temperature at 229.4±20° C., 229.4±15° C., 229.4±10° C., or 229.4±5° C. (e.g., at about 229.4° C.), as measured by DSC.

In some embodiments, the crystalline form of Compound 1 freebase is characterized by a peak temperature between about 230° C. and 231.5° C., as measured by DSC.

In some embodiments, the crystalline form of Compound 1 freebase is characterized by a peak temperature at 230±20° C., 230±15° C., 230±10° C., or 230±5° C. (e.g., at about 230° C.), as measured by DSC.

In some embodiments, the crystalline form of Compound 1 freebase is characterized by a peak temperature at 231.5±20° C., 231.5±15° C., 231.5±10° C., or 231.5±5° C. (e.g., at about 231.5° C.), as measured by DSC.

Figure 4B:
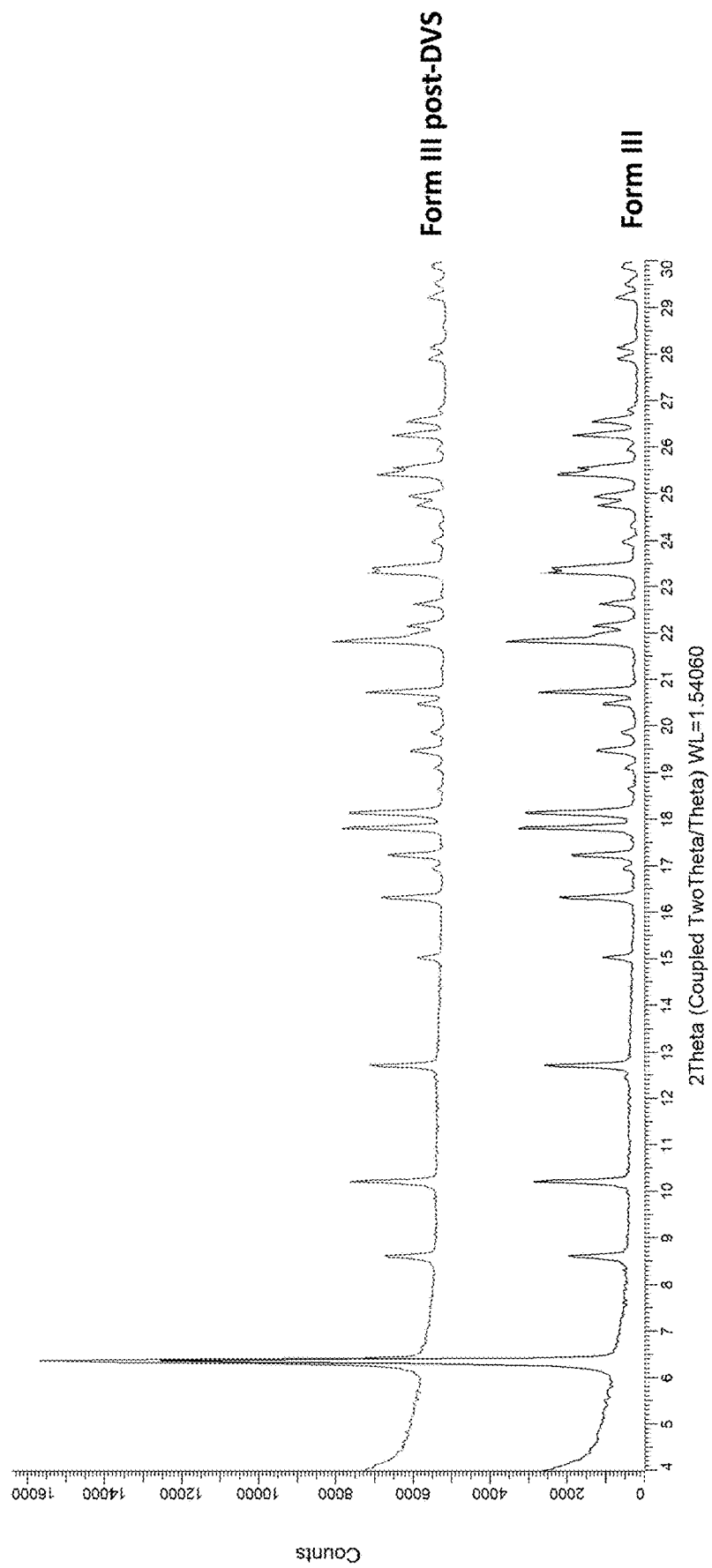
FIG. 4B depicts the XRPD of Form III Freebase, before and after DVS.
Figure 4C:
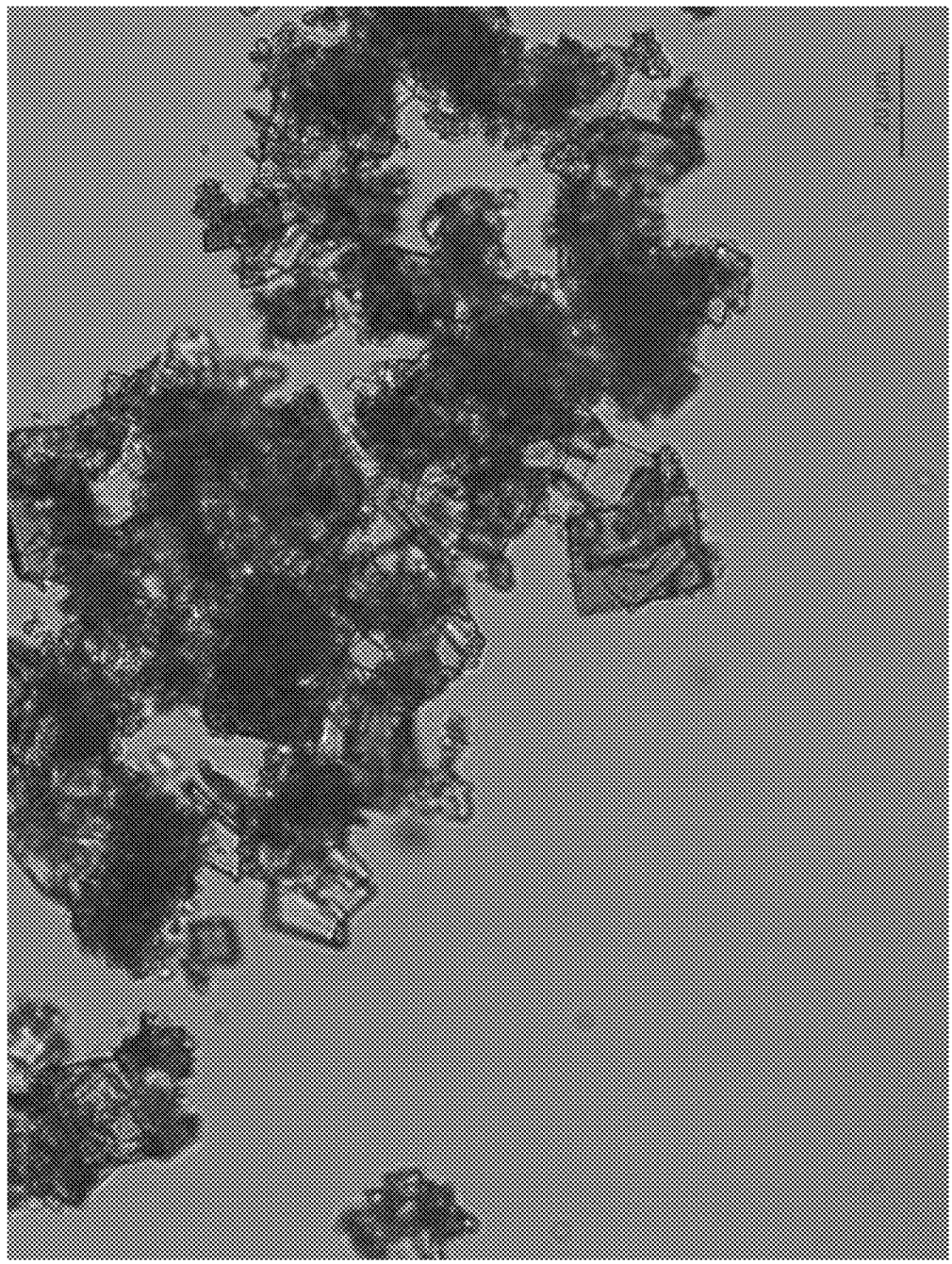
FIG. 4C depicts the Form III Freebase PLM.
Figure 4D:
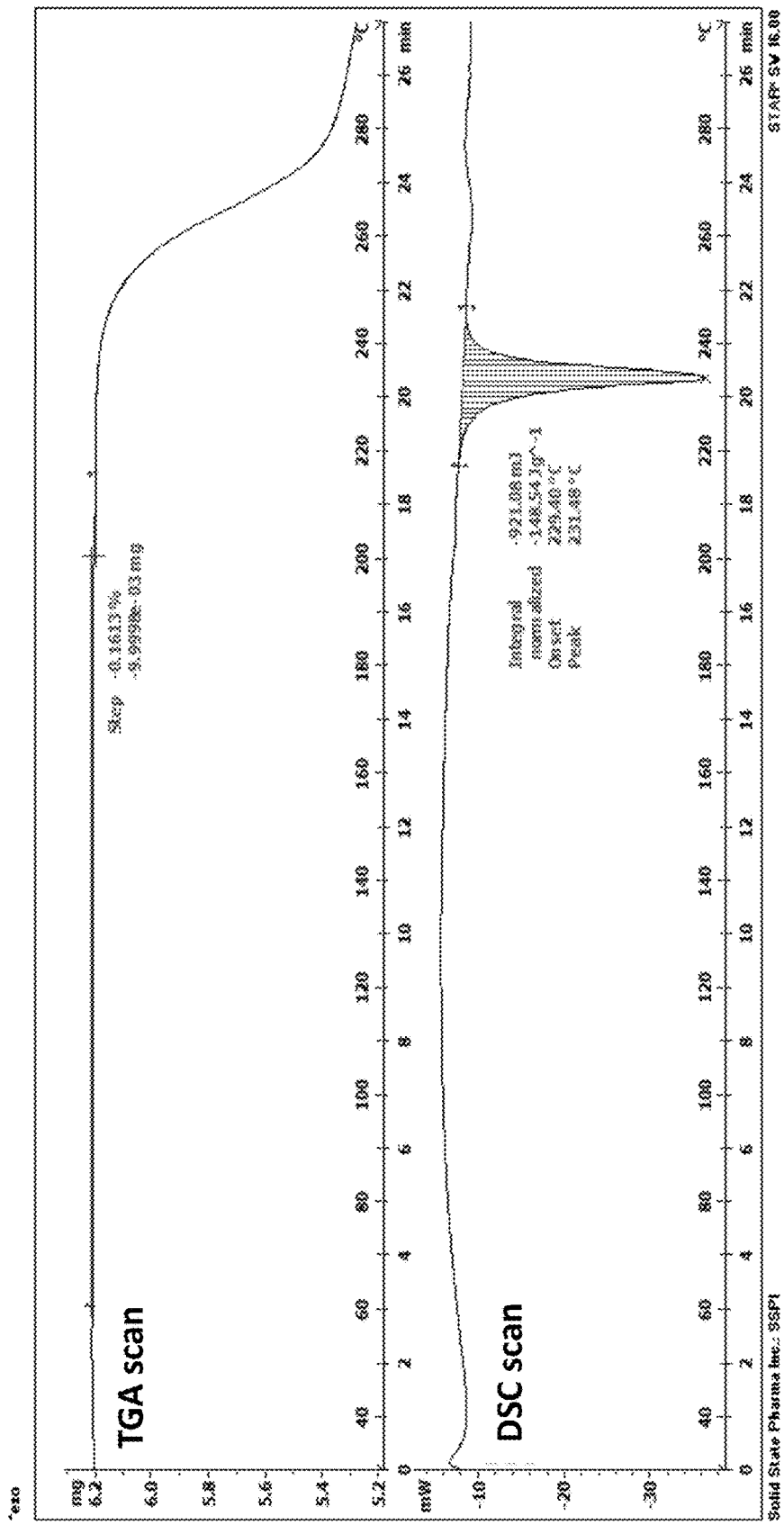
FIG. 4D depicts the S-TGA/DSC of Form III Freebase.
Figure 4E:
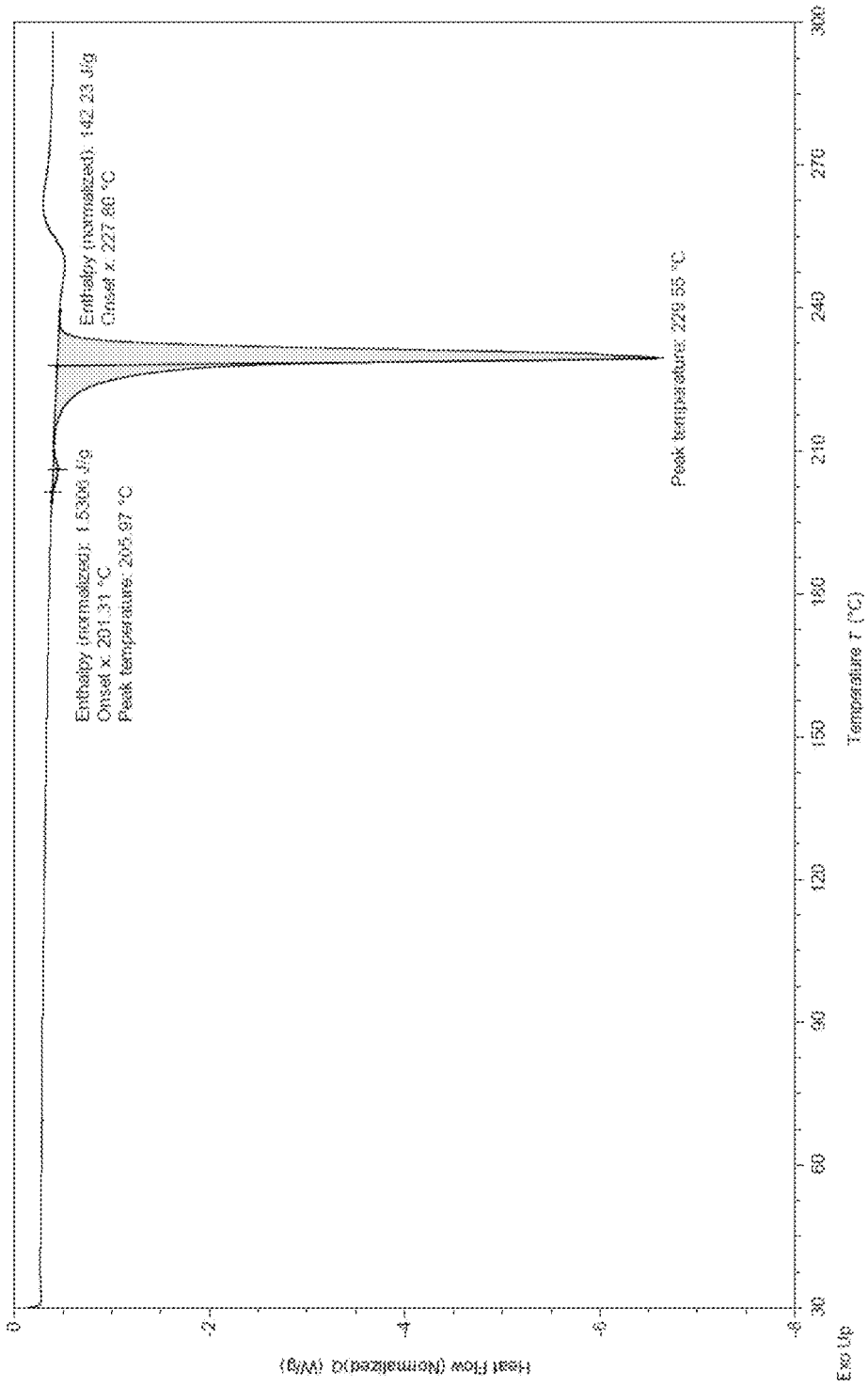
FIG. 4E depicts the DSC of Form III Freebase.

In some embodiments, the crystalline form of Compound 1 freebase is characterized by having a DSC scan substantially similar to that set forth in FIG. 4E. In some embodiments, the crystalline form of Compound 1 freebase so characterized is Form III freebase.

(v) Crystallin Form IV Freebase

In some embodiments, the crystalline form of Compound 1 freebase is crystalline Form IV freebase. In some embodiments, crystalline Form IV freebase has a Differential Scanning Calorimetry (DSC) thermogram characterized by an endothermic event, an onset temperature and/or a peak temperature as defined in the present section (b)(v).

In some embodiments, the crystalline form of Compound 1 freebase is characterized by an exothermic event between about 185° C. to 205° C. and an endothermic event between about 215° C. to about 240° C., as measured by DSC.

In some embodiments, the crystalline form of Compound 1 freebase is characterized by an exothermic event between about 185° C. to 205° C., as measured by DSC.

In some embodiments, the crystalline form of Compound 1 freebase is characterized by an exothermic event at 185±20° C., 185±15° C., 185±10° C., or 185±5° C. (e.g., at about 185° C.), as measured by DSC.

In some embodiments, the crystalline form of Compound 1 freebase is characterized by an exothermic event at 205±20° C., 205±15° C., 205±10° C., or 205±5° C. (e.g., at about 205° C.), as measured by DSC.

In some embodiments, the crystalline form of Compound 1 freebase is characterized by an endothermic between about 215° C. to about 240° C., as measured by DSC.

In some embodiments, the crystalline form of Compound 1 freebase is characterized by an endothermic event at 215±20° C., 215±15° C., 215±10° C., or 215±5° C. (e.g., at about 215° C.), as measured by DSC.

In some embodiments, the crystalline form of Compound 1 freebase is characterized by an endothermic event at 240±20° C., 240±15° C., 240±10° C., or 240±5° C. (e.g., at about 240° C.), as measured by DSC.

In some embodiments, the crystalline form of Compound 1 freebase is characterized by an onset temperature of the exothermic event between about 192.2° C. and 195.1° C., as measured by DSC.

In some embodiments, the crystalline form of Compound 1 freebase is characterized by an onset temperature of the exothermic event at 192.2±20° C., 192.2±15° C., 192.2±10° C., or 192.2±5° C. (e.g., at about 192.2° C.), as measured by DSC.

In some embodiments, the crystalline form of Compound 1 freebase is characterized by an onset temperature of the exothermic event at 195.1±20° C., 195.1±15° C., 195.1±10° C., or 195.1±5° C. (e.g., at about 195.1° C.), as measured by DSC.

In some embodiments, the crystalline form of Compound 1 freebase is characterized by an onset temperature of the endothermic event between about 226.7° C. and 227.6° C., as measured by DSC.

In some embodiments, the crystalline form of Compound 1 freebase is characterized by an onset temperature of the endothermic event at 226.7±20° C., 226.7±15° C., 226.7±10° C., or 226.7±5° C. (e.g., at about 226.7° C.), as measured by DSC.

In some embodiments, the crystalline form of Compound 1 freebase is characterized by an onset temperature of the endothermic event at 227.6±20° C., 227.6±15° C., 227.6±10° C., or 227.6±5° C. (e.g., at about 227.6° C.), as measured by DSC.

In some embodiments, the crystalline form of Compound 1 freebase is characterized by a peak temperature between about 229.6° C. and 229.8° C., as measured by DSC.

In some embodiments, the crystalline form of Compound 1 freebase is characterized by a peak temperature at 229.6±20° C., 229.6±15° C., 229.6±10° C., or 229.6±5° C. (e.g., at about 229.6° C.), as measured by DSC.

In some embodiments, the crystalline form of Compound 1 freebase is characterized by a peak temperature at 229.8±20° C., 229.8±15° C., 229.8±10° C., or 229.8±5° C. (e.g., at about 229.8° C.), as measured by DSC.

Figure 5B:
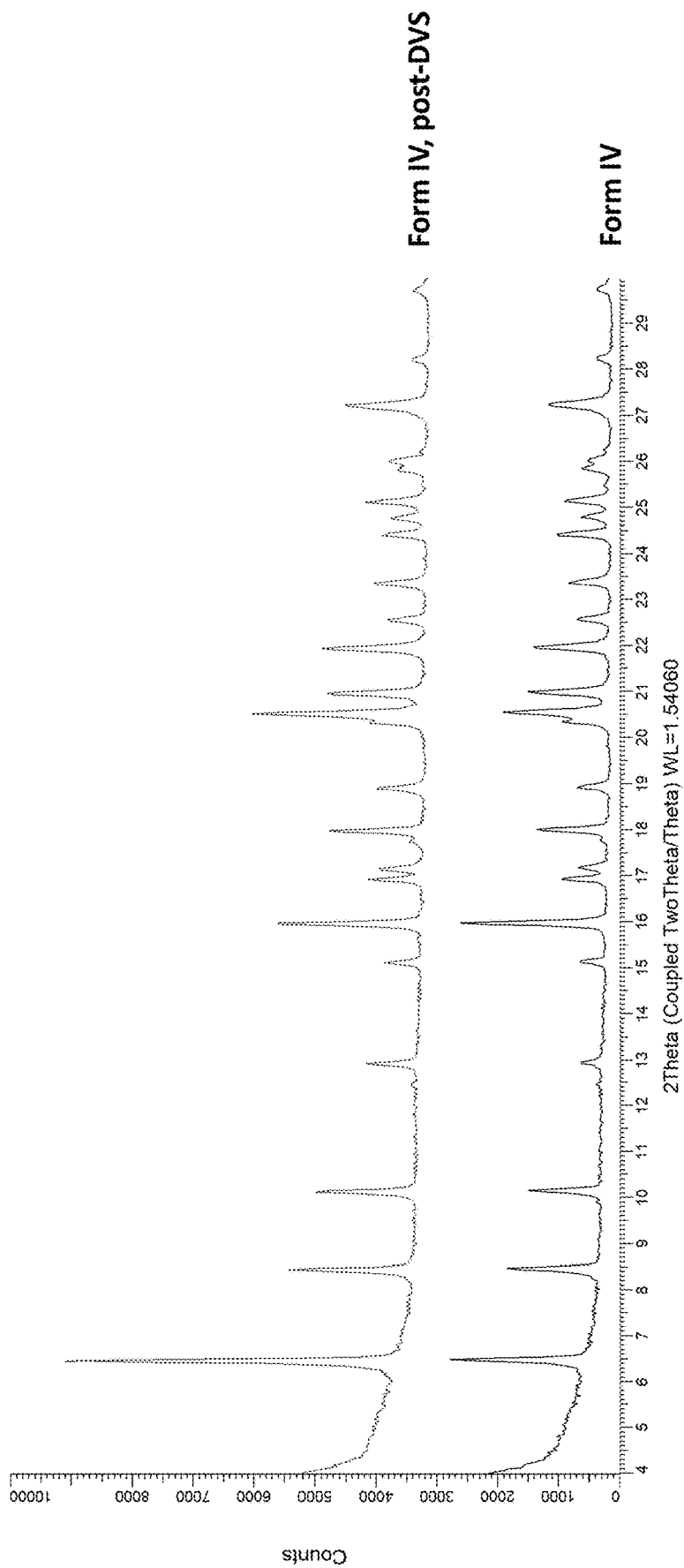
FIG. 5B depicts the XRPD of Form IV Freebase, before and after DVS.
Figure 5C:
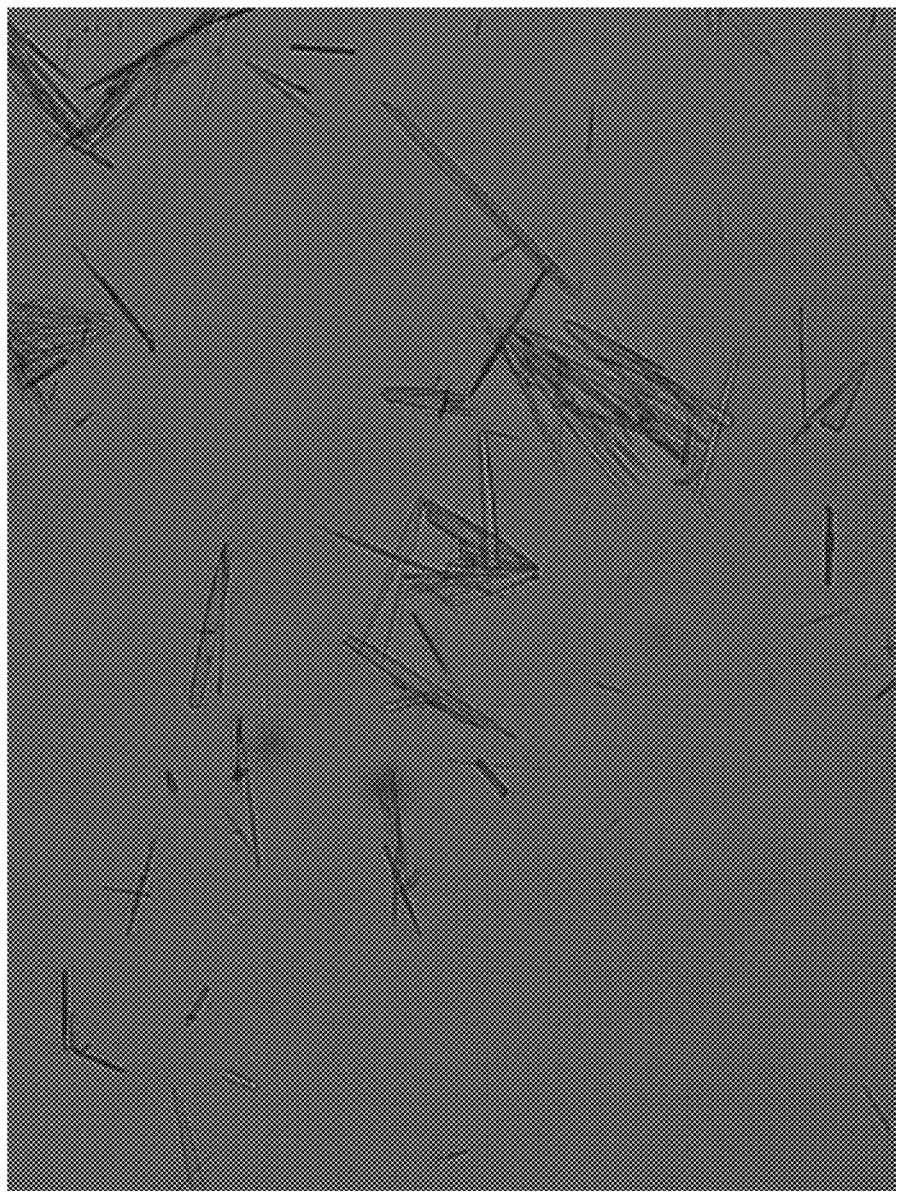
FIG. 5C depicts the Form IV Freebase PLM.
Figure 5D:
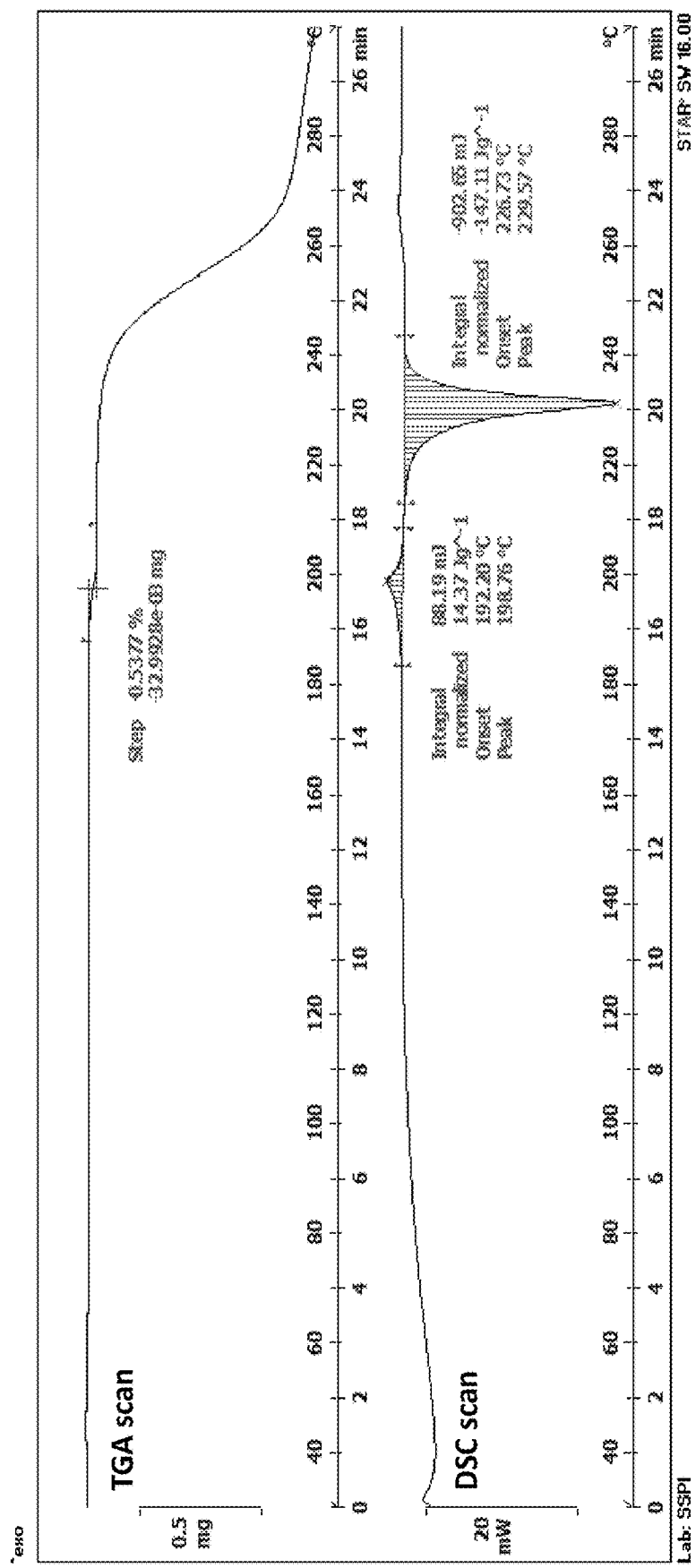
FIG. 5D depicts the S-TGA/DSC of Form IV Freebase.
Figure 5E:
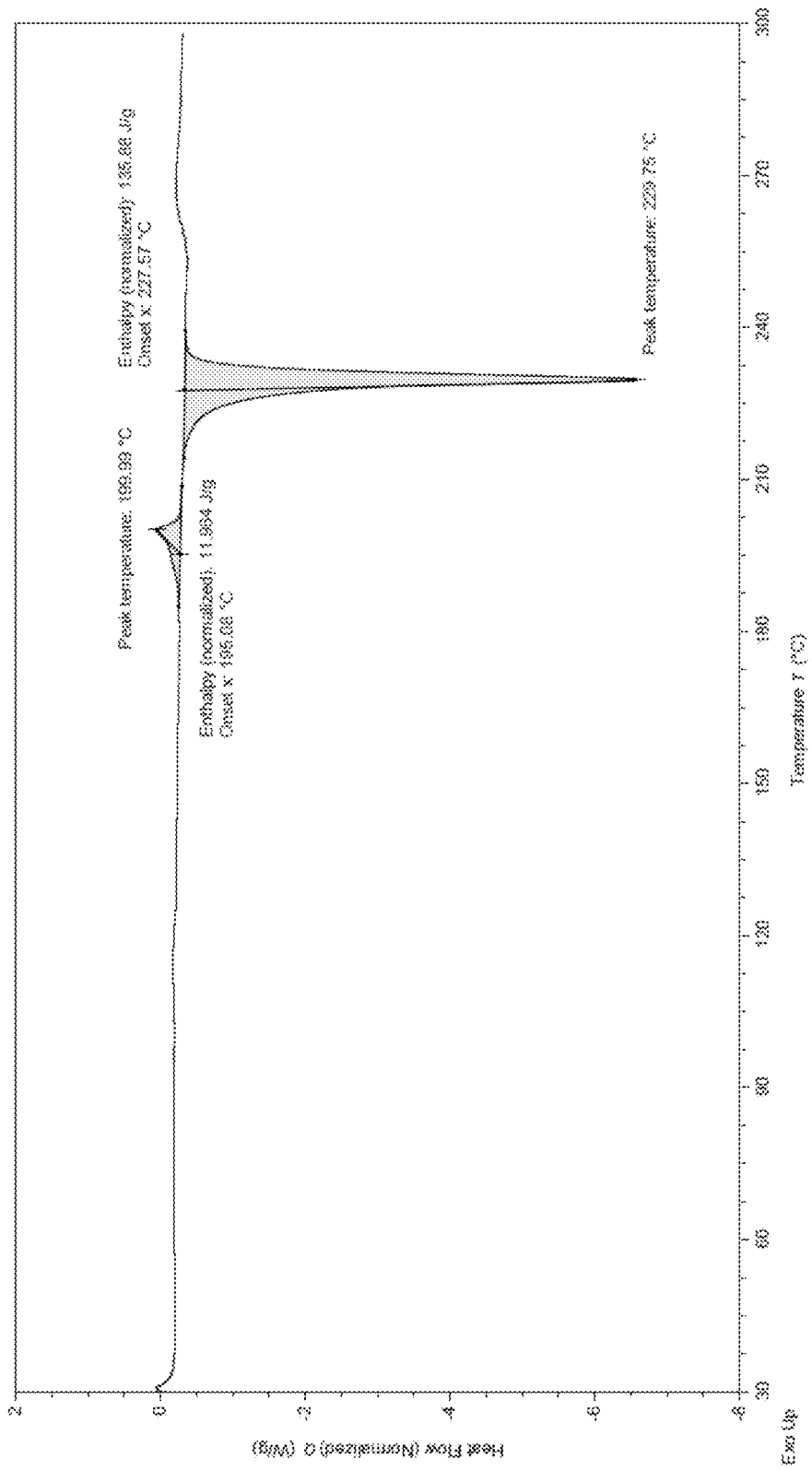
FIG. 5E depicts the DSC of Form IV Freebase.

In some embodiments, the crystalline form of Compound 1 freebase is characterized by having a DSC scan substantially similar to that set forth in FIG. 5E. In some embodiments, the crystalline form of Compound 1 freebase so characterized is Form IV freebase.

(c) Thermal Gravimetric Analysis (TGA) Characterization of Crystalline Forms

In some embodiments, the crystalline form of Compound 1 freebase is characterized by a mass loss of about 0.1%-0.5% (e.g., 0.2%), as measured by TGA. In some embodiments, the crystalline form of Compound 1 freebase is characterized by having a TGA scan substantially similar to that set forth in FIG. 6D. In some embodiments, the crystalline form of Compound 1 freebase so characterized is Form V freebase.

In some embodiments, the crystalline form of Compound 1 freebase is characterized by a mass loss of about 0.5-1% (e.g., 0.8%), as measured by TGA. In some embodiments, the crystalline form of Compound 1 freebase is characterized by having a TGA scan substantially similar to that set forth in FIG. 3D. In some embodiments, the crystalline form of Compound 1 freebase so characterized is Form II freebase.

In some embodiments, the crystalline form of Compound 1 freebase is characterized by a mass loss of about 0.1%-0.5% (e.g., 0.2%), as measured by TGA. In some embodiments, the crystalline form of Compound 1 freebase is characterized by having a TGA scan substantially similar to that set forth in FIG. 4D. In some embodiments, the crystalline form of Compound 1 freebase so characterized is Form III freebase.

In some embodiments, the crystalline form of Compound 1 freebase is characterized by a mass loss of about 0.3%-0.8% (e.g., 0.5%), as measured by TGA. In some embodiments, the crystalline form of Compound 1 freebase is characterized by having a TGA scan substantially similar to that set forth in FIG. 5D. In some embodiments, the crystalline form of Compound 1 freebase so characterized is Form IV freebase.

(d) Other Characterizations of Crystalline Forms

In some embodiments, the crystalline form of Compound 1 freebase is an anhydrous crystalline form.

In some embodiments, the crystalline form of Compound 1 freebase is not a solvate.

In some embodiments, the crystalline form of Compound 1 freebase has a morphology which comprises rhombohedral plates.

In some embodiments, the crystalline form of Compound 1 freebase has a morphology which comprises rectangular plates.

In some embodiments, the crystalline form of Compound 1 freebase has a morphology which comprises needles.

In some embodiments, the crystalline form of Compound 1 freebase had water uptake of about 0.20% weight gain between 5-95% relative humidity (RH) as measured by Dynamic Vapor Sorption (DVS).

In some embodiments, the crystalline form of Compound 1 freebase is crystalline Form V freebase, which is an anhydrous crystalline form.

In some embodiments, the crystalline form of Compound 1 freebase is crystalline Form V freebase, characterized by an XRPD pattern comprising signals at 6.8±0.2, 18.9±0.2, 20.5±0.2 and 22.9±0.2 °2θ using Cu K alpha radiation when measured at 25° C. and characterized by being an anhydrous crystalline form.

In some embodiments, the crystalline form of Compound 1 freebase is crystalline Form V freebase, characterized by an XRPD pattern comprising signals at 6.8±0.2, 18.9±0.2, 20.5±0.2, 22.9±0.2, 23.8±0.2, and 26.5±0.2 °2θ using Cu K alpha radiation when measured at 25° C. and characterized by being an anhydrous crystalline form.

In some embodiments, the crystalline form of Compound 1 freebase is crystalline Form V freebase, characterized by an XRPD pattern comprising signals at 11.7±0.2, 18.9±0.2, 20.5±0.2 and 22.9±0.2, °2θ using Cu K alpha radiation when measured at 25° C. and characterized by being an anhydrous crystalline form.

In some embodiments, the crystalline form of Compound 1 freebase is crystalline Form V freebase, characterized by an XRPD pattern comprising signals at 11.7±0.2, 18.9±0.2, 20.5±0.2, 22.9±0.2, 23.8±0.2, and 26.5±0.2 °2θ using Cu K alpha radiation when measured at 25° C. and characterized by being an anhydrous crystalline form.

In some embodiments, the crystalline form of Compound 1 freebase is crystalline Form V freebase, characterized by an XRPD pattern comprising signals at 6.8±0.2, 11.7±0.2, 18.9±0.2, 20.5±0.2 and 22.9±0.2 °2θ using Cu K alpha radiation when measured at 25° C. and characterized by being an anhydrous crystalline form.

In some embodiments, the crystalline form of Compound 1 freebase is crystalline Form V freebase, characterized by an XRPD pattern comprising signals at 6.8±0.2, 11.7±0.2, 18.9±0.2, 20.5±0.2, 22.9±0.2, 23.8±0.2, and 26.5±0.2 °2θ using Cu K alpha radiation when measured at 25° C. and characterized by being an anhydrous crystalline form.

In some embodiments, the crystalline form of Compound 1 freebase is crystalline Form V freebase, which is not a solvate.

In some embodiments, the crystalline form of Compound 1 freebase is crystalline Form V freebase, characterized by an XRPD pattern comprising signals at 6.8±0.2, 18.9±0.2, 20.5±0.2 and 22.9±0.2 °2θ using Cu K alpha radiation when measured at 25° C. and by not being a solvate.

In some embodiments, the crystalline form of Compound 1 freebase is crystalline Form V freebase, characterized by an XRPD pattern comprising signals at 6.8±0.2, 18.9±0.2, 20.5±0.2, 22.9±0.2, 23.8±0.2, and 26.5±0.2 °2θ using Cu K alpha radiation when measured at 25° C. and by not being a solvate.

In some embodiments, the crystalline form of Compound 1 freebase is crystalline Form V freebase, characterized by an XRPD pattern comprising signals at 11.7±0.2, 18.9±0.2, 20.5±0.2 and 22.9±0.2, °2θ using Cu K alpha radiation when measured at 25° C. and by not being a solvate.

In some embodiments, the crystalline form of Compound 1 freebase is crystalline Form V freebase, characterized by an XRPD pattern comprising signals at 11.7±0.2, 18.9±0.2, 20.5±0.2, 22.9±0.2, 23.8±0.2, and 26.5±0.2 °2θ using Cu K alpha radiation when measured at 25° C. and by not being a solvate.

In some embodiments, the crystalline form of Compound 1 freebase is crystalline Form V freebase, characterized by an XRPD pattern comprising signals at 6.8±0.2, 11.7±0.2, 18.9±0.2, 20.5±0.2 and 22.9±0.2 °2θ using Cu K alpha radiation when measured at 25° C. and by not being a solvate.

In some embodiments, the crystalline form of Compound 1 freebase is crystalline Form V freebase, characterized by an XRPD pattern comprising signals at 6.8±0.2, 11.7±0.2, 18.9±0.2, 20.5±0.2, 22.9±0.2, 23.8±0.2, and 26.5±0.2 °2θ using Cu K alpha radiation when measured at 25° C. and by not being a solvate.

In some embodiments, the crystalline form of Compound 1 freebase is crystalline Form V freebase having a morphology comprising rhombohedral plates, such as rhombohedral plates of about 5 microns to about 20 microns in diameter as measured by polarized light microscopy (PLM).

In some embodiments, the crystalline form of Compound 1 freebase is crystalline Form V freebase, characterized by an XRPD pattern comprising signals at 6.8±0.2, 18.9±0.2, 20.5±0.2 and 22.9±0.2 °2θ using Cu K alpha radiation when measured at 25° C. freebase and by a morphology comprising rhombohedral plates, such as rhombohedral plates of about 5 microns to about 20 microns in diameter.

In some embodiments, the crystalline form of Compound 1 freebase is crystalline Form V freebase, characterized by an XRPD pattern comprising signals at 6.8±0.2, 18.9±0.2, 20.5±0.2, 22.9±0.2, 23.8±0.2, and 26.5±0.2 °2θ using Cu K alpha radiation when measured at 25° C. and by a morphology comprising rhombohedral plates, such as rhombohedral plates of about 5 microns to about 20 microns in diameter.

In some embodiments, the crystalline form of Compound 1 freebase is crystalline Form V freebase, characterized by an XRPD pattern comprising signals at 11.7±0.2, 18.9±0.2, 20.5±0.2 and 22.9±0.2, °2θ using Cu K alpha radiation when measured at 25° C. and by a morphology comprising rhombohedral plates, such as rhombohedral plates of about 5 microns to about 20 microns in diameter.

In some embodiments, the crystalline form of Compound 1 freebase is crystalline Form V freebase, characterized by an XRPD pattern comprising signals at 11.7±0.2, 18.9±0.2, 20.5±0.2, 22.9±0.2, 23.8±0.2, and 26.5±0.2 °2θ using Cu K alpha radiation when measured at 25° C. and by a morphology comprising rhombohedral plates, such as rhombohedral plates of about 5 microns to about 20 microns in diameter.

In some embodiments, the crystalline form of Compound 1 freebase is crystalline Form V freebase, characterized by an XRPD pattern comprising signals at 6.8±0.2, 11.7±0.2, 18.9±0.2, 20.5±0.2 and 22.9±0.2 °2θ using Cu K alpha radiation when measured at 25° C. and by a morphology comprising rhombohedral plates, such as rhombohedral plates of about 5 microns to about 20 microns in diameter.

In some embodiments, the crystalline form of Compound 1 freebase is crystalline Form V freebase, characterized by an XRPD pattern comprising signals at 6.8±0.2, 11.7±0.2, 18.9±0.2, 20.5±0.2, 22.9±0.2, 23.8±0.2, and 26.5±0.2 °2θ using Cu K alpha radiation when measured at 25° C. and by a morphology comprising rhombohedral plates, such as rhombohedral plates of about 5 microns to about 20 microns in diameter.

In some embodiments, the crystalline form of Compound 1 freebase is crystalline Form V freebase, which is characterized by water uptake of about 0.20% weight gain between 5-95% relative humidity (RH) as measured by Dynamic Vapor Sorption (DVS).

In some embodiments, the crystalline form of Compound 1 freebase is crystalline Form V freebase, characterized by an XRPD pattern comprising signals at 6.8±0.2, 18.9±0.2, 20.5±0.2 and 22.9±0.2 °2θ using Cu K alpha radiation when measured at 25° C. and characterized by water uptake of about 0.20% weight gain between 5-95% RH as measured by DVS.

In some embodiments, the crystalline form of Compound 1 freebase is crystalline Form V freebase, characterized by an XRPD pattern comprising signals at 6.8±0.2, 18.9±0.2, 20.5±0.2, 22.9±0.2, 23.8±0.2, and 26.5±0.2 °2θ using Cu K alpha radiation when measured at 25° C. and characterized by water uptake of about 0.20% weight gain between 5-95% RH as measured by DVS.

In some embodiments, the crystalline form of Compound 1 freebase is crystalline Form V freebase, characterized by an XRPD pattern comprising signals at 11.7±0.2, 18.9±0.2, 20.5±0.2 and 22.9±0.2, °2θ using Cu K alpha radiation when measured at 25° C. and characterized by water uptake of about 0.20% weight gain between 5-95% RH as measured by DVS.

In some embodiments, the crystalline form of Compound 1 freebase is crystalline Form V freebase, characterized by an XRPD pattern comprising signals at 11.7±0.2, 18.9±0.2, 20.5±0.2, 22.9±0.2, 23.8±0.2, and 26.5±0.2 °2θ using Cu K alpha radiation when measured at 25° C. and characterized by water uptake of about 0.20% weight gain between 5-95% RH as measured by DVS.

In some embodiments, the crystalline form of Compound 1 freebase is crystalline Form V freebase, characterized by an XRPD pattern comprising signals at 6.8±0.2, 11.7±0.2, 18.9±0.2, 20.5±0.2 and 22.9±0.2 °2θ using Cu K alpha radiation when measured at 25° C. and characterized by water uptake of about 0.20% weight gain between 5-95% RH as measured by DVS.

In some embodiments, the crystalline form of Compound 1 freebase is crystalline Form V freebase, characterized by an XRPD pattern comprising signals at 6.8±0.2, 11.7±0.2, 18.9±0.2, 20.5±0.2, 22.9±0.2, 23.8±0.2, and 26.5±0.2 °2θ using Cu K alpha radiation when measured at 25° C. and characterized by water uptake of about 0.20% weight gain between 5-95% RH as measured by DVS.

(e) Amorphous Form

In some embodiments, Compound 1 freebase is amorphous Compound 1 freebase.

In some embodiments, amorphous Compound 1 freebase is characterized by an XRPD pattern comprising a signal broad halo signal between about 10 to about 32 °2θ, using Cu K alpha radiation when measured at 25° C.

In some embodiments, amorphous Compound 1 freebase is characterized by an XRPD pattern comprising a signal broad halo signal between 10±0.5 to 32±0.5 °2θ (e.g., 10±0.2 to 32±0.2 °2θ (e.g., 10±0.1 to 32±0.1 °2θ (e.g., 10 to 32 °2θ))), using Cu K alpha radiation when measured at 25° C.

In some embodiments, amorphous Compound 1 freebase is characterized by an XRPD pattern substantially similar to that set forth in FIG. 1A.

In some embodiments, amorphous Compound 1 freebase is characterized by a peak temperature at about 198° C., as measured by DSC.

In some embodiments, amorphous Compound 1 freebase is characterized by a peak temperature at 198±20° C., 198±15° C., 198±10° C., or 198±5° C. (e.g., at about 198° C.), as measured by DSC.

Figure 1B:
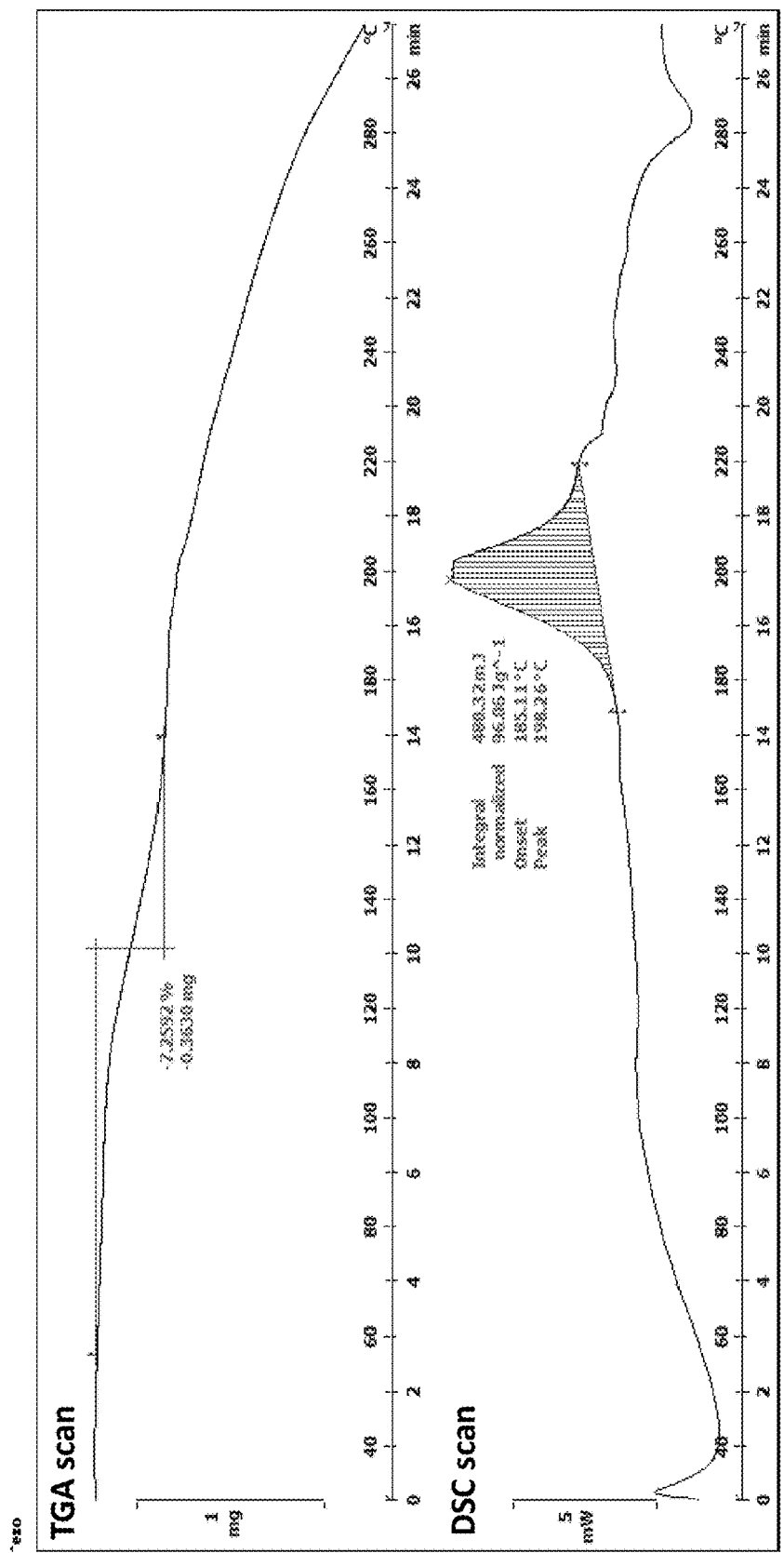
FIG. 1B depicts the S-TGA/DSC of amorphous Compound 1 Freebase.

In some embodiments, amorphous Compound 1 freebase is characterized by having a DSC scan substantially similar to that set forth in FIG. 1B.

In some embodiments, amorphous Compound 1 freebase is characterized by a mass loss of about 5-10% (e.g., 7-8%), as measured by TGA.

In some embodiments, amorphous Compound 1 freebase is characterized by having a TGA scan substantially similar to that set forth in FIG. 1B.

In some embodiments, amorphous Compound 1 freebase converts to Form II freebase of Compound 1.

(ii) Compositions

Compositions, including pharmaceutical compositions, comprising crystalline and/or amorphous Compound 1 freebase are further contemplated herein.

In some embodiments, provided is a composition comprising a mixture of solid state forms of Compound 1 freebase, wherein 75% (w/w %) of the mixture is crystalline Form I, Form II, Form III, Form IV, or Form V freebases.

In some embodiments, provided is a composition comprising a mixture of solid state forms of Compound 1 freebase, wherein 75% (w/w %) of the mixture is crystalline Form I freebase.

In some embodiments, provided is a composition comprising a mixture of solid state forms of Compound 1 freebase, wherein 75% (w/w %) of the mixture is crystalline Form II freebase.

In some embodiments, provided is a composition comprising a mixture of solid state forms of Compound 1 freebase, wherein 75% (w/w %) of the mixture is crystalline Form III freebase.

In some embodiments, provided is a composition comprising a mixture of solid state forms of Compound 1 freebase, wherein 75% (w/w %) of the mixture is crystalline Form IV freebase.

In some embodiments, provided is a composition comprising a mixture of solid state forms of Compound 1 freebase, wherein 75% (w/w %) of the mixture is crystalline Form V freebase.

In some embodiments, the composition is a pharmaceutical composition comprising one or more pharmaceutically acceptable carriers.

In some embodiments, provided is a pharmaceutical composition comprising a mixture of Compound 1 freebase forms, wherein 75% (w/w %) of the mixture is crystalline Form I freebase.

In some embodiments, provided is a pharmaceutical composition comprising a mixture of Compound 1 freebase forms, wherein 75% (w/w %) of the mixture is crystalline Form II freebase. In some embodiments, provided is a pharmaceutical composition comprising a mixture of Compound 1 freebase forms, wherein at least 75% (w/w %) of the mixture is crystalline Form II freebase. In some embodiments, provided is a pharmaceutical composition comprising a mixture of Compound 1 freebase forms, wherein at least 80% (w/w %), at least 90% (w/w %), at least 95% (w/w %), at least 98% (w/w %) or at least 99% (w/w %) of the mixture is crystalline Form II freebase.

In some embodiments, provided is a pharmaceutical composition comprising a mixture of Compound 1 freebase forms, wherein 75% (w/w %) of the mixture is crystalline Form III freebase.

In some embodiments, provided is a pharmaceutical composition comprising a mixture of Compound 1 freebase forms, wherein 75% (w/w %) of the mixture is crystalline Form IV freebase.

In some embodiments, provided is a pharmaceutical composition comprising a mixture of Compound 1 freebase forms, wherein 75% (w/w %) of the mixture is crystalline Form V freebase. In some embodiments, provided is a pharmaceutical composition comprising a mixture of Compound 1 freebase forms, wherein at least 75% (w/w %) of the mixture is crystalline Form V freebase. In some embodiments, provided is a pharmaceutical composition comprising a mixture of Compound 1 freebase forms, wherein at least 80% (w/w %), at least 90% (w/w %), at least 95% (w/w %), at least 98% (w/w %) or at least 99% (w/w %) of the mixture is crystalline Form V freebase.

In some embodiments, the mixture of Compound 1 is about 75% Form I freebase of Compound 1.

In some embodiments, the mixture of Compound 1 is about 80% Form I freebase of Compound 1.

In some embodiments, the mixture of Compound 1 is about 85% Form I freebase of Compound 1.

In some embodiments, the mixture of Compound 1 is about 90% Form I freebase of Compound 1.

In some embodiments, the mixture of Compound 1 is about 91% Form I freebase of Compound 1.

In some embodiments, the mixture of Compound 1 is about 92% Form I freebase of Compound 1.

In some embodiments, the mixture of Compound 1 is about 93% Form I freebase of Compound 1.

In some embodiments, the mixture of Compound 1 is about 94% Form I freebase of Compound 1.

In some embodiments, the mixture of Compound 1 is about 95% Form I freebase of Compound 1.

In some embodiments, the mixture of Compound 1 is about 96% Form I freebase of Compound 1.

In some embodiments, the mixture of Compound 1 is about 97% Form I freebase of Compound 1.

In some embodiments, the mixture of Compound 1 is about 98% Form I freebase of Compound 1.

In some embodiments, the mixture of Compound 1 is about 99% Form I freebase of Compound 1.

In some embodiments, the mixture of Compound 1 is about 75% Form II freebase of Compound 1.

In some embodiments, the mixture of Compound 1 is about 80% Form II freebase of Compound 1.

In some embodiments, the mixture of Compound 1 is about 85% Form II freebase of Compound 1.

In some embodiments, the mixture of Compound 1 is about 90% Form II freebase of Compound 1.

In some embodiments, the mixture of Compound 1 is about 91% Form II freebase of Compound 1.

In some embodiments, the mixture of Compound 1 is about 92% Form II freebase of Compound 1.

In some embodiments, the mixture of Compound 1 is about 93% Form II freebase of Compound 1.

In some embodiments, the mixture of Compound 1 is about 94% Form II freebase of Compound 1.

In some embodiments, the mixture of Compound 1 is about 95% Form II freebase of Compound 1.

In some embodiments, the mixture of Compound 1 is about 96% Form II freebase of Compound 1.

In some embodiments, the mixture of Compound 1 is about 97% Form II freebase of Compound 1.

In some embodiments, the mixture of Compound 1 is about 98% Form II freebase of Compound 1.

In some embodiments, the mixture of Compound 1 is about 99% Form II freebase of Compound 1.

In some embodiments, the mixture of Compound 1 is about 75% Form III freebase of Compound 1.

In some embodiments, the mixture of Compound 1 is about 80% Form III freebase of Compound 1.

In some embodiments, the mixture of Compound 1 is about 85% Form III freebase of Compound 1.

In some embodiments, the mixture of Compound 1 is about 90% Form III freebase of Compound 1.

In some embodiments, the mixture of Compound 1 is about 91% Form III freebase of Compound 1.

In some embodiments, the mixture of Compound 1 is about 92% Form III freebase of Compound 1.

In some embodiments, the mixture of Compound 1 is about 93% Form III freebase of Compound 1.

In some embodiments, the mixture of Compound 1 is about 94% Form III freebase of Compound 1.

In some embodiments, the mixture of Compound 1 is about 95% Form III freebase of Compound 1.

In some embodiments, the mixture of Compound 1 is about 96% Form III freebase of Compound 1.

In some embodiments, the mixture of Compound 1 is about 97% Form III freebase of Compound 1.

In some embodiments, the mixture of Compound 1 is about 98% Form III freebase of Compound 1.

In some embodiments, the mixture of Compound 1 is about 99% Form III freebase of Compound 1.

In some embodiments, the mixture of Compound 1 is about 75% Form IV freebase of Compound 1.

In some embodiments, the mixture of Compound 1 is about 80% Form IV freebase of Compound 1.

In some embodiments, the mixture of Compound 1 is about 85% Form IV freebase of Compound 1.

In some embodiments, the mixture of Compound 1 is about 90% Form IV freebase of Compound 1.

In some embodiments, the mixture of Compound 1 is about 91% Form IV freebase of Compound 1.

In some embodiments, the mixture of Compound 1 is about 92% Form IV freebase of Compound 1.

In some embodiments, the mixture of Compound 1 is about 93% Form IV freebase of Compound 1.

In some embodiments, the mixture of Compound 1 is about 94% Form IV freebase of Compound 1.

In some embodiments, the mixture of Compound 1 is about 95% Form IV freebase of Compound 1.

In some embodiments, the mixture of Compound 1 is about 96% Form IV freebase of Compound 1.

In some embodiments, the mixture of Compound 1 is about 97% Form IV freebase of Compound 1.

In some embodiments, the mixture of Compound 1 is about 98% Form IV freebase of Compound 1.

In some embodiments, the mixture of Compound 1 is about 99% Form IV freebase of Compound 1.

In some embodiments, the mixture of Compound 1 is about 75% Form V freebase of Compound 1.

In some embodiments, the mixture of Compound 1 is about 80% Form V freebase of Compound 1.

In some embodiments, the mixture of Compound 1 is about 85% Form V freebase of Compound 1.

In some embodiments, the mixture of Compound 1 is about 90% Form V freebase of Compound 1.

In some embodiments, the mixture of Compound 1 is about 91% Form V freebase of Compound 1.

In some embodiments, the mixture of Compound 1 is about 92% Form V freebase of Compound 1.

In some embodiments, the mixture of Compound 1 is about 93% Form V freebase of Compound 1.

In some embodiments, the mixture of Compound 1 is about 94% Form V freebase of Compound 1.

In some embodiments, the mixture of Compound 1 is about 95% Form V freebase of Compound 1.

In some embodiments, the mixture of Compound 1 is about 96% Form V freebase of Compound 1.

In some embodiments, the mixture of Compound 1 is about 97% Form V freebase of Compound 1.

In some embodiments, the mixture of Compound 1 is about 98% Form V freebase of Compound 1.

In some embodiments, the mixture of Compound 1 is about 99% Form V freebase of Compound 1.

In some embodiments, provided is a composition comprising Compound 1 freebase, wherein 100% (w/w %) of Compound 1 freebase is crystalline pure-phase Form I, Form II, Form III, Form IV, or Form V, i.e., 100% of Form I, Form II, Form III, Form IV, or Form V. In some embodiments, the composition is a pharmaceutical composition comprising one or more pharmaceutically acceptable carriers.

Exemplary pharmaceutical acceptable carriers may include diluents, e.g., purified water, triglyceride oils, such as hydrogenated or partially hydrogenated vegetable oil, or mixtures thereof, corn oil, olive oil, sunflower oil, safflower oil, fish oils, such as EPA or DHA, or their esters or triglycerides or mixtures thereof, omega-3 fatty acids or derivatives thereof, lactose, dextrose, sucrose, mannitol, sorbitol, cellulose, sodium, saccharin, glucose and/or glycine.

The pharmaceutical compositions containing crystalline and/or amorphous Compound 1 freebase may be manufactured in a manner that is generally known, e.g., by means of conventional mixing, dissolving, granulating, dragee-making, levigating, emulsifying, encapsulating, entrapping, or lyophilising processes. Pharmaceutical compositions may be formulated in a conventional manner using one or more pharmaceutically acceptable carrier comprising excipients and/or auxiliaries that facilitate processing of a solid state form of Compound 1 freebase into preparations that can be used pharmaceutically. The appropriate formulation is dependent upon the route of administration chosen.

Administration of the composition to the subject can be accomplished via any mode of administration, for example, by oral administration, topical administration, or by injection. Depending on the intended mode of administration, the pharmaceutical composition comprising a solid state form of Compound 1 freebase can be in solid, semi-solid or liquid dosage formulation.

A solid state form of Compound 1 freebase may be administered alone in the pharmaceutical composition as the sole therapeutic agent, or may be administered in combination with another therapeutic agent. Combination treatment may be achieved by way of co-administration (e.g., the two agents being administered at the same time) or sequential administration (e.g., one agent being administered first, then the other). In the case of co-administration, the solid state form of Compound 1 freebase may be administered in the same pharmaceutical composition as the other therapeutic agent, or may be administered in a separate pharmaceutical composition. The choice of the other therapeutic agent will depend upon the diagnosis of the attending physicians and their judgment of the condition of the subject and the appropriate treatment protocol.

(iii) Methods of Treatment

Solid state forms of Compound 1 freebase have been found useful as an inhibitor of NLRP3 activity.

In some aspects, provided is a method of treating or preventing a disease or disorder in a subject in need thereof, comprising administering to the subject an effective amount of a solid state form of Compound 1 freebase, or a pharmaceutical composition thereof. In some aspects, provided is a method of treating or preventing a disease or disorder in a subject in need thereof, comprising administering to the subject a solid state form of Compound 1 freebase, or a pharmaceutical composition thereof.

In some aspects, provided is a method of treating a disease or disorder in a subject in need thereof, comprising administering to the subject an effective amount of a solid state form of Compound 1 freebase, or a pharmaceutical composition thereof. In some aspects, provided is a method of treating a disease or disorder in a subject in need thereof, comprising administering to the subject a solid state form of Compound 1 freebase, or a pharmaceutical composition thereof.

In some aspects, provided is a solid state form of Compound 1 freebase, or a pharmaceutical composition thereof, for use in treating or preventing a disease or disorder.

In some aspects, provided is a solid state form of Compound 1 freebase, or a pharmaceutical composition thereof, for use in treating a disease or disorder.

In some aspects, provided is the use of a solid state form of Compound 1 freebase, in the manufacture of a medicament, for the treatment or prevention of a disease or disorder.

In some aspects, provided is the use a solid state form of Compound 1 freebase, in the manufacture of a medicament, for the treatment of a disease or disorder.

In some aspects, provided is the use of a solid state form of Compound 1 freebase for the treatment or prevention of a disease or disorder.

In some aspects, provided is the use of a solid state form of Compound 1 freebase for the treatment of a disease or disorder.

In some embodiments, the disease or disorder is associated with aberrant NLRP3 activity, and the method comprises inhibiting the aberrant NLRP3 activity such that the subject is treated.

In some embodiments, the disease or disorder is a disease or disorder of the central nervous system (CNS), a disease or disorder of the peripheral nervous system (PNS), a primary neurological disease of the muscles, an inflammatory disorder, an autoimmune disorder, cancer, an infection, a metabolic disease, a cardiovascular disease, a respiratory disease, a kidney disease, a liver disease, an ocular disease, a skin disease, a lymphatic disease, a rheumatic disease, a psychological disease, graft versus host disease, pain (including disorders related to pain management), or an NLRP3-related disease in a subject that has been determined to carry a germline or somatic non-silent mutation in NLRP3.

In some embodiments, the disease or disorder is a disease or disorder of central nervous system and/or peripheral nervous system ("PNS"), such as dementia, Alzheimer's disease ("AD") epilepsy, traumatic brain injury ("TBI"), multiple sclerosis ("MS"), a developmental disturbance, acute disseminated encephalopathy, transverse myelitis, Parkinson's disease ("PD"), amyotrophic lateral sclerosis ("ALS"), Huntington's disease ("HD"), or spinal cord injury.

In some embodiments, the disease or disorder is a primary neurological disease of the muscle, such as a dystrophy or spinal muscular atrophy.

In some embodiments, the disease or disorder is an inflammatory disorder, such as gout or anemia of inflammation.

In some embodiments, the disease or disorder is an autoimmune disease, such as ulcerative colitis.

In some embodiments, the disease or disorder is cancer, such as skin cancer or colon cancer.

In some embodiments, the disease or disorder is an infection, such as a neuro-infection.

In some embodiments, the disease or disorder is a metabolic disease, such as diabetes, e.g., type 2 diabetes.

In some embodiments, the disease or disorder is a cardiovascular disease, such as stroke.

In some embodiments, the disease or disorder is a respiratory disease, such as asthma (e.g., steroid-resistant asthma, severe steroid-resistant asthma) or chronic obstructive pulmonary disease ("COPD").

In some embodiments, the disease or disorder is a kidney disease, such as acute kidney disease, a chronic kidney disease, or a rare kidney disease.

In some embodiments, the disease or disorder is a liver disease, such as nonalcoholic fatty liver disease (NAFLD) or non-alcoholic steatohepatitis (NASH).

In some embodiments, the disease or disorder is an ocular disease, such as optic neuritis or macular degeneration.

In some embodiments, the disease or disorder is a skin disease, such as psoriasis, hidradenitis suppurativa (HS), or atopic dermatitis.

In some embodiments, the disease or disorder is a lymphatic disease.

In some embodiments, the disease or disorder is a rheumatic disease, such as osteoarthritis, dermatomyositis, Still's disease, or juvenile idiopathic arthritis.

In some embodiments, the disease or disorder is a psychological disease, such as a neuropsychiatric condition, including depression, major depressive disorder, or refractory depression.

In some embodiments, the disease or disorder is a graft versus host disease.

In some embodiments, the disease or disorder is pain (including disorders related to pain management), such as pain management addiction, osteoarthritis pain, or allodynia.

In some embodiments, the NLRP3-related disease in a subject that has been determined to carry a germline or somatic non-silent mutation in NLRP3 is cryopyrin-associated autoinflammatory syndrome.

In some embodiments, the cryopyrin-associated autoinflammatory syndrome is familial cold autoinflammatory syndrome, Muckle-Wells syndrome, or neonatal onset multisystem inflammatory disease (NOMID).

In some embodiments, the disease or disorder is dementia, Alzheimer's disease ("AD"), epilepsy, traumatic brain injury ("TBI"), multiple sclerosis ("MS"), developmental disturbances, acute disseminated encephalopathy, transverse myelitis, Parkinson's disease ("PD"), amyotrophic lateral sclerosis ("ALS"), spinal muscular atrophy, Huntington's disease ("HD"), spinal cord injury, dystrophies, neuro-infections, pain management addiction, neuropsychiatric conditions (e.g. depression, major depressive disorder, refractory depression), neonatal onset multisystem inflammatory disease ("NOMID"), asthma, osteoarthritis, ulcerative colitis, gout, anemia of inflammation, Still's disease, chronic obstructive pulmonary disease ("COPD"), osteoarthritis pain, or hidradenitis suppurativa.

(iv) Methods of Preparation

The solid state forms of Compound 1 freebase may be prepared by any suitable technique known in the art. In some aspects, the present disclosure provides crystalline or amorphous Compound 1 freebase obtainable by, or obtained by, or directly obtained by a method for preparing as described in the Examples. In some aspects, the present disclosure provides a method of preparing a crystalline freebase form of Compound 1 as described in the Examples.

In some embodiments, the prepared crystalline Compound 1 freebase is substantially free of amorphous Compound 1 freebase characterized as set forth in the X-ray powder diffraction pattern of FIG. 1A.

In some embodiments, the prepared crystalline Compound 1 freebase is substantially free of crystalline Compound 1 freebase characterized as set forth in the X-ray powder diffraction pattern of FIG. 7A. In some embodiments, the crystalline Compound 1 freebase is substantially free of Pattern A.

In some embodiments, the prepared crystalline Compound 1 freebase is substantially free of crystalline Compound 1 freebase characterized as set forth in the X-ray powder diffraction pattern of FIG. 7C. In some embodiments, the crystalline Compound 1 freebase is substantially free of Pattern B.

In some embodiments, the prepared crystalline Compound 1 freebase is substantially free of crystalline isopropanol solvate of Compound 1 freebase form, characterized by having an X-ray powder diffraction signal at 4.5±0.2 °2θ and 9.0±0.2 °2θ, using Cu K alpha radiation when measured at 25° C.

In some embodiments, the crystalline Compound 1 freebase is substantially free of crystalline Compound 1 freebase characterized as set forth in the X-ray powder diffraction pattern of FIG. 7D. In some embodiments, the crystalline Compound 1 freebase is substantially free of Pattern C.

EXEMPLIFICATION

In order that this disclosure may be more fully understood, the following Examples are set forth. It should be understood that these examples are for illustrative purposes only and are not to be construed as limiting this disclosure in any manner.

Commonly used abbreviations

| Name | Abbreviation |
|---|---|
| Units | |
| Ampere | A |
| Angstrom | Å |
| Celsius | C. |
| Degree | ° |
| Equivalent(s) | eq. |
| Gram | g |
| Hour | h |
| Hertz ($s^{-1}$) | Hz |
| Joule | J |
| Kelvin | K |
| Kilovolt | kV |
| Liter | L |
| Megaohm | MΩ |
| Milligram | mg |
| Milliliter | mL |
| Minute | min |
| Second | s |
| Volume | vol. |
| Watt | W |
| Weight | wt. |

-continued

Commonly used abbreviations

| Name | Abbreviation |
|---|---|
| Others | |
| Relative humidity | RH |
| Room temperature (20-24° C.; 293-297 K) | RT |

Analytical Methods

X-Ray Powder Diffraction (XRPD)

XRPD was performed using a Bruker D8 Advance equipped with LYNXEYE detector in reflection mode (Bragg-Brentano geometry). Samples were prepared on Si zero-return wafers. All XRPD experiments were run at room temperature (RT). The parameters for XRPD methods used are provided in Table A.

TABLE A

| XRPD Parameters | | |
|---|---|---|
| Parameter | Regular scan | High resolution scan |
| X-ray wavelength | Cu Kα1, 1.540598 Å | Cu Kα1, 1.540598 Å |
| X-ray tube setting | 40 kV, 40 mA | 40 kV, 40 mA |
| Slit condition | 0.6 mm div. + 2.5° soller | 0.6 mm div. + 2.5° soller |
| Scan mode | Step | Step |
| Scan range (°2θ) | 4-30 | 4-40 |
| Step size (°2θ) | 0.03 | 0.02 |
| Dwell time (s/step) | 0.23 | 0.9 |
| Spin | Yes (0.5 Hz) | Yes (0.5 Hz) |

Polarized Light Microscopy (PLM)

Optical microscopy was performed using a Zeiss AxioScope A1 digital imaging microscope equipped with 2.5×, 10×, 20×, and 40× objectives and polarizer. Images were captured through a built-in Axiocam 105 digital camera and processed using ZEN 2 (blue edition) software provided by Zeiss.

Simultaneous Thermogravimetric Analysis and Differential Scanning Calorimetry (S-TGA/DSC)

TGA and DSC were performed on the same sample simultaneously using a Mettler Toledo TGA/DSC$^{3+}$. Protective and purge gas was nitrogen at a flowrate of 20-30 m/min and 50-100 m/min, respectively. The desired amount of sample (5-10 mg) was weighed directly in a hermetic aluminum pan with pinhole and analyzed according to the parameters provided in Table B.

TABLE B

| TGA/DSC parameters | |
|---|---|
| Method | Ramp |
| Sample size | 5-10 mg |
| Heating rate | 10.0° C./min |
| Temperature range | 30 to 300° C. |

Differential Scanning Calorimetry (Stand-Alone DSC)

DSC was performed using a TA Discovery DSC. The sample (1-5 mg) was weighed directly in a 40 μL hermetic aluminum pan with a pinhole and analyzed according to the following parameters: Method=ramp; sample size=1-5 mg; heating rate=10.0° C./min; Temperature range=30 to 300° C.; method gas=$N_2$ at 50.00 mL/min.

Dynamic Vapor Sorption (DVS)

DVS was performed using TA Instruments Q5000SA. The sample (5-15 mg) was loaded into a metallic quartz sample pan, suspended from a microbalance, and exposed to a humidified stream of nitrogen gas. Weight changes were relative to a matching empty reference pan opposite the sample, suspended from the microbalance. The sample was held for a minimum of 10 min at each level and only progressed to the next humidity level if there was <0.002% change in weight between measurements (interval: 5 s) or 45 min had elapsed (for 5-65% RH) or 2 h had elapsed (for 80 and 95% RH). The program used is provided in Table C. Mass change by DVS is related to hygroscopicity.

TABLE C

DVS program

| Level | Parameters |
|---|---|
| 1 | Equilibration at 50% RH |
| 2 | 50% to 5%. (50%, 35%, 20%, and 5%) |
| 3 | 5% to 95% (5%, 20%, 35%, 50%, 65%, 80%, and 95%) |
| 4 | 95% to 5% (95%, 80%, 65%, 50%, 35%, 20%, and 5%) |
| 5 | 5% to 50% (5%, 20%, 35%, and 50%) |

Proton Nuclear Magnetic Resonance ($^1$H NMR) Spectroscopy $^1$H NMR was performed on a Bruker Avance 300 MHz spectrometer. Solids were dissolved in 0.75 mL deuterated solvent in a 4 mL vial, transferred to an NMR tube (Wilmad 5 mm thin wall 8" 200 MHz, 506-PP-8) and analyzed according to the parameters provided in Table D.

TABLE D

Proton NMR parameters

| Instrument | Bruker Avance 300 MHz spectrometer |
|---|---|
| Temperature | 300 K |
| Probe | 5 mm PABBO BB-1H/DZ-GRD Z104275/0170 |
| Number of scans | 16 |
| Relaxation delay | 1.000 s |
| Pulse width | 14.2500 μs |
| Acquisition time | 2.9999 s |
| Spectrometer frequency | 300.15 MHz |
| Nucleus | $^1$H |

High Performance Liquid Chromatography (HPLC)

HPLC was conducted using an Agilent 1220 Infinity LC. How rate range of the instrument is 0.2-5.0 m/min, operating pressure range is 0-600 bar, temperature range is 5° C. above ambient to 60° C., and wavelength range is 190-600 nm.

The HPLC conditions used are as follows: Mobile phase A=5 mM ammonium bicarbonate in water; Mobile phase B=acetonitrile; Diluent=acetonitrile:water (1:1 vol); Injection volume=5 μL; Monitoring wavelength=254 nm; Column=Zorbax Eclipse XDB-C18 Rapid Resolution, 4.6× 100 mm, 3.5 μm; Column temperature=40° C. Table E provides the gradient method.

TABLE E

HPLC Gradient Method

| Time (min) | % A | Flow rate (mL/min) |
|---|---|---|
| 0 | 95 | 1.0 |
| 1 | 95 | 1.0 |
| 16 | 15 | 1.0 |
| 19.5 | 15 | 1.0 |
| 19.6 | 95 | 1.0 |
| 23 | 95 | 1.0 |

Karl Fischer (KF) Titration

KF titration for water determination was performed using a Mettler Toledo C20S Coulometric KF Titrator equipped with a current generator cell with a diaphragm, and a double-platinum-pin electrode. The range of detection of the instrument is 1 ppm to 5% water. Aquastar™ CombiCoulomat fritless reagent was used in both the anode and cathode compartments. Samples of approximately 0.03-0.10 g were dissolved in the anode compartment and titrated until the solution potential dropped below 100 mV. Hydranal 1 wt. % water standard was used for validation prior to sample analysis. Detection limit is <0.04 wt. %. BDL=below detection limit.

A KF of 0.50% wt. % implies approximately 0.10 molar equivalents of water. Based on the molecular weight of Compound 1 (344.8 g/mol), (i) a hemihydrate (0.5 molar eq. water) would have KF of about 2.55 wt. %; (ii) a monohydrate (1.0 molar eq. water) would have KF of about 4.97 wt. %; and (iii) a dihydrate (2.0 molar eq. water) would have KF of about 9.46 wt. %.

Synthetic Methods

Example 1. Amorphous Freebase

Approximately 250 mg of Compound 1 freebase was weighed into a 20 mL scintillation vial, followed by the addition of 12 mL of tert-butyl alcohol:water (8:2 vol.) to dissolve the solid. The resulting solution was filtered through a 0.45 m syringe filter to remove the small quantity of undissolved solids. The vial was then frozen for approximately 5 min in liquid nitrogen and then lyophilized overnight. XRPD analysis of the solids generated by lyophilization confirmed generation of the Amorphous freebase form. See FIG. 1A, with the broad halo signal.

The Amorphous freebase form was dried in vacuo at 50° C. overnight prior to S-TGA/DSC analysis, which showed a 7.26 wt. % mass loss up to approximately 170° C., followed by a broad exotherm with an onset at 185.1° C., peak at 198.3° C., followed by decomposition. See FIG. 1B. The mass loss may be due to loss of adsorbed water and/or remaining solvent from the lyophilization process.

Thermal treatment of the Amorphous freebase was carried out. 10 mg of amorphous Compound 1 freebase was weighed into a 100 μL DSC pan. The pan was heated at a rate of 10° C./min to 200° C., held at 200° C. for 10 min, then cooled at a rate of 20° C./min to 25° C. Data not shown. The resulting solids were brittle and dark-orange. The solids sampled for XRPD, NMR, and HPLC purity analysis indicated decomposition of Compound 1 freebase rather than maintaining the amorphous state or conversion to a crystalline form.

Rapid conversion of the Amorphous freebase to Form I freebase (Example 2) was observed upon the addition of 5 vol. acetone. In another analogous experiment, rapid conversion of the Amorphous freebase to Form II freebase (Example 3) was observed upon the addition of toluene. Data not shown.

Example 2. Form I Freebase

Evaporative crystallization experiments were performed, wherein solutions of Compound 1 freebase were prepared at room temperature (RT) or at 50° C. All solutions were evaporated to dryness at atmosphere overnight in an open vessel and then placed at 50° C. under vacuum (−29 inHg) for 3 h. If sufficient solids were available after evaporation and drying, they were analyzed by XRPD. The results are summarized in Table 2A. Dashed lines (--) indicate no data available.

In cases where sufficient solids were available, most samples provided Form I freebase. In the case of the isopropanol (IPA):water (9:1 vol.) sample at room temperature, extra peaks observed were able to later be assigned as Pattern C (Example 7). Form II freebase (Example 3) was identified from tetrahydrofuran (THF), and Pattern A (Example 7) was identified from trifluoroethanol (TFE).

TABLE 2A

Evaporative crystallization of Compound 1 freebase

| | RT | | 50° C. | |
|---|---|---|---|---|
| | [C] (mg/mL) | XRPD | [C] (mg/mL) | XRPD |
| Methanol (MeOH) | 21 | Form I | 34 | Form I |
| Ethanol (EtOH) | 19 | Form I | 22 | Form I |
| Methyl acetate (MeOAc) | 3 | — | 5 | — |
| Isopropyl acetate (IPAc) | ≤2 | — | ≤2 | — |
| acetonitrile | ≤2 | — | 3 | — |
| Dioxane | 4 | Form I + Form II (trace) | 10 | Form I + Form II(trace) |
| Toluene | ≤2 | — | ≤2 | — |
| Acetone | 4 | Form I | 9 | Form I |
| Methyl isobutyl ketone (MIBK) | ≤2 | — | 3 | — |
| isopropanol:water (9:1 vol.) | 22 | Form I + Pattern C | 35 | Form I |
| acetonitrile:water (1:1 vol.) | 3 | Form I | 4 | — |
| Tetrahydrofuran (THF) | 12 | Form II + Form I (trace) | 24 | Form II |
| trifluoroethanol (TFE) | 38 | Pattern A | 38 | Pattern A |

Cooling crystallization was conducted in a range of solvent systems, and, similar to the evaporative crystallization experiments, most samples gave Form I freebase. Two cooling regimes were employed: slow cooling from 60° C. to 5° C. at 10° C. per hour, and fast cooling from 60° C. to 0° C. For all experiments, 20-30 mg of Compound 1 freebase was weighed into a 4 mL vial. Solvent was then added incrementally at 60° C. until dissolution. In all experiments, solids were completely dissolved before cooling.

For slow-cooling experiments, the solutions were cooled to 5° C. at 10° C. per hour while mixing.

For fast cooling, the solutions were transferred to an ice-water bath near 0° C. without mixing. After 15 min in the ice-water bath, mixing was resumed. If precipitation was observed, the slurries were filtered immediately.

If solids did not precipitate from solution at either 5° C. overnight or 0° C. for 1 h, the solutions were further cooled to −20° C. by placing in a freezer without mixing.

The results from fast and slow cooling crystallizations are summarized in Table 2B. Dashed lines (--) indicate no data available.

The "Vol." or "Volume" refers to the equivalent volume relative to the mass. The actual volume (in microliters) can be calculated by multiplying the given equivalent volume by the mass of the sample (mg). For example, the actual volume of a 23.6 mg test sample with an equivalent reported Vol. of 27 is 637 mL.

For fast-cooling crystallization, Form I freebase was obtained from methanol (MeOH), MeOH:water (9:1 vol.), ethanol (EtOH):water (9:1 vol.), ethyl acetate (EtOAc):N, N-dimethylformamide (DMF) (9:1 vol.), and EtOH:tetrahydrofuran (THF) (3:7 vol.). Form II freebase (Example 3) was obtained from THF, and from acetonitrile:dimethylformamide (DMF) (9:1 vol.) as a mixture with Form I freebase. Pattern C (Example 7) was obtained from isopropanol (IPA):water (9:1 vol.) at −20° C. Pattern C converted to Pattern A after drying overnight at 50° C.

For slow-cooling crystallization, Form I freebase was obtained from MeOH, IPA:water (9:1 vol.), EtOH:water (9:1 vol.), EtOAc:DMF (9:1 vol.), and acetonitrile:DMF (9:1 vol.). Form II freebase (Example 3) was obtained from MeOH:water (9:1 vol.) and toluene:DMF (9:1 vol.) as a mixture with Form I freebase. Form II freebase was also obtained from THF and EtOH:THF (3:7 vol.). Form III freebase (Example 4) was obtained from acetone:water (7:3 vol.).

TABLE 2B

Fast and slow-cooling crystallization of Compound 1 freebase

| Mass (mg) | Solvent | Vol. | XRPD Fast cooling | XRPD Slow cooling |
|---|---|---|---|---|
| 23.6 | Methanol (MeOH) | 27 | Form I | Form I |
| 25.1 | Isopropanol (IPA):water (9:1 vol.) | 30 | Pattern C | Form I |
| 20.1 | Methanol (MeOH):water (9:1 vol.) | 36 | Form I | Form I + Form II |
| 27.3 | Ethanol (EtOH):water (9:1 vol.) | 30 | Form I | Form I |
| 23.8 | Acetone:water (7:3 vol.) | 56 | — | Form III |

TABLE 2B-continued

Fast and slow-cooling crystallization of Compound 1 freebase

| Mass (mg) | Solvent | Vol. | XRPD Fast cooling | XRPD Slow cooling |
|---|---|---|---|---|
| 21.9 | Ethyl acetate (EtOAc):dimethylformamide (DMF) (9:1 vol.) | 77 | Form I | Form I |
| 23.5 | Tetrahydrofuran (THF) | 51 | Form II | Form II |
| 23.8 | acetonitrile:dimethylformamide (DMF) (9:1 vol.) | 98 | Form I + Form II | Form I |
| 22.6 | Ethanol (EtOH):tetrahydrofuran (THF) (3:7 vol.) | 24 | Form I | Form II |
| 27.8 | Toluene:dimethylformamide (DMF) (9:1 vol.) | 72 | — | Form I + Form II |

Antisolvent crystallization was also completed in various solvent systems, and, similar to the above-described crystallization experiments of Tables 2A-2B, Form I freebase was formed in the majority of systems studied.

First, 20-25 mg of Compound 1 freebase was dissolved in solvent. Antisolvent crystallization was then carried out using either the direct or reverse addition method.

For direct antisolvent addition, twice the volume of solvent was used as antisolvent and was added dropwise in four equal portions over 1 h. For example, if solids were dissolved in 0.5 mL solvent, then 1.0 mL antisolvent was added over 1 h. Solutions/slurries were mixed during antisolvent addition.

For reverse antisolvent addition, the solution was transferred all at once to twice the solvent volume of antisolvent with rapid stirring. For example, if solids dissolved in 0.5 mL solvent, then the solution was added all at once to 1.0 mL antisolvent while stirring. Once solids were formed, the slurries were filtered, and the solids were recovered for XRPD analysis.

The results of all antisolvent crystallizations are given in Table 2C. Dashed lines (--) indicates no data was collected. Asterix (*) indicates antisolvent addition was carried out at 50° C. All other experiments were conducted at room temperature (20-24° C.).

Pattern B (Example 7) was obtained from dimethylacetamide (DMAc)/methyl isobutyl ketone (MIBK) after standing overnight at −20° C. Drying Pattern B overnight at 50° C. led to conversion to Form I freebase, a few additional peaks were also present at 8.1 °2θ, 16.2 °2θ and 24.4 °2θ. A mixture of Form III freebase (Example 4) (major) and Form I freebase (minor) was obtained from the direct addition of water into dimethylsulfoxide (DMSO). The ratio of the two patterns was unchanged after drying in vacuo at 50° C. for 4 h. Reverse addition (DMSO/water) gave Form III freebase (Example 4) alone, with no evidence of Form I freebase. Reverse antisolvent addition (dimethylacetamide (DMAc)/water or N-methylpyrrolidone (NMP)/water) gave Form IV freebase (Example 5).

For the antisolvent crystallization experiments carried out at 50° C., the solvent system used was a water/alcohol mixtures, and—except when water was used as the antisolvent—precipitation was not observed at 50° C. These samples were cooled to 10° C., and, after prolonged stirring, the generation of thin slurries was observed in most cases. With the exception of water addition into ethanol (EtOH):water (9:1 vol.), which gave Form III freebase (Example 4), the rest of the solids retrieved were Form I freebase by XRPD.

TABLE 2C

Antisolvent crystallization of Compound 1 freebase

| Mass of solid (mg) | Antisolvent addition | Solvent (Vol.) | Antisolvent | XRPD |
|---|---|---|---|---|
| 25.1 | Direct | DMSO (2) | Ethyl acetate (EtOAc) | — |
| 24.0 | | | methyl isobutyl ketone (MIBK) | — |
| 22.4 | | DMSO (5) | Water | Form III + Form I |
| 21.4 | | | Toluene | — |
| 23.9 | | | Isopropyl acetate (IPAc) | — |
| 24.0 | | DMAc (3) | Ethyl acetate (EtOAc) | Form I |
| 23.6 | | | methyl isobutyl ketone (MIBK) | Pattern B |
| 20.2 | | DMAc (5) | Water | Form I |
| 22.9 | | | Toluene | — |
| 18.9 | | | Isopropyl acetate (IPAc) | Form I + Form II (trace) |
| 21.7 | | NMP (3) | Ethyl acetate (EtOAc) | — |
| 23.1 | | | methyl isobutyl ketone (MIBK) | — |
| 22.0 | | NMP (5) | Water | Form I |
| 22.3 | | | Toluene | — |
| 19.1 | | | Isopropyl acetate (IPAc) | Form II + Form I |
| 25.0 | | EtOH:water (9:1 vol.) (30)* | Water* | Form III (+trace Form II and Form I) |
| 22.4 | | | Ethyl acetate (EtOAc)* | Form I |

TABLE 2C-continued

Antisolvent crystallization of Compound 1 freebase

| Mass of solid (mg) | Antisolvent addition | Solvent (Vol.) | Antisolvent | XRPD |
|---|---|---|---|---|
| 25.2 | | MeOH (30)* | tert-Butyl methyl ether (MtBE)* | Form I |
| 22.3 | | | Water* | Form I |
| 21.4 | | | Ethyl acetate (EtOAc)* | Form I |
| 20.5 | Reverse | DMSO (5) | Ethyl acetate (EtOAc) | — |
| 19.9 | | | methyl isobutyl ketone (MIBK) | — |
| 26.3 | | | Water | Form III |
| 20.6 | | DMAc (5) | Ethyl acetate (EtOAc) | — |
| 23.0 | | | methyl isobutyl ketone (MIBK) | — |
| 22.3 | | | Water | Form IV |
| 21.7 | | NMP (5) | Ethyl acetate (EtOAc)c | — |
| 21.7 | | | methyl isobutyl ketone (MIBK) | — |
| 24.2 | | | Water | Form IV |
| 22.4 | | EtOH:water (9:1 vol.) (30)* | Water* | Form I |
| 20.1 | | | Ethyl acetate (EtOAc)* | Form I |
| 25.5 | | MeOH (30)* | tert-Butyl methyl ether (MtBE)* | Form I |
| 23.4 | | | Water* | Form I |
| 23.5 | | | Ethyl acetate (EtOAc)* | Form I |

Pure-phase Form I freebase was obtained through direct antisolvent crystallization, for example, in a solution of dimethylacetamide (DMAc) or N-Methylpyrrolidone (NMP) (as the solvent) and water (as the antisolvent). In one representative experiment, 22.9 mg of Compound 1 freebase was dissolved in 0.5 mL of dimethylacetamide (DMAc), and 1 mL of water was added dropwise over an hour at room temperature, to provide a clear orange solution. An off-white solid developed upon standing overnight at −20° C. and stirring at room temperature for 2 days. XRPD of Form I freebase is provided in FIG. 2A, and a DSC thermogram is given in FIG. 2B. A signal list for Form I freebase is provided in Table 2D.

TABLE 2D

XRPD - Form I Freebase

| Signal No. | Angle (°2θ) | Relative intensity |
|---|---|---|
| 1 | 5.6 | 45 |
| 2 | 11.2 | 81 |
| 3 | 12.0 | 100 |
| 4 | 13.1 | 17 |
| 5 | 14.0 | 25 |
| 6 | 14.8 | 5 |
| 7 | 15.4 | 18 |
| 8 | 16.9 | 49 |
| 9 | 17.1 | 6 |
| 10 | 18.0 | 8 |
| 11 | 18.4 | 7 |
| 12 | 20.3 | 8 |
| 13 | 21.3 | 70 |
| 14 | 22.5 | 7 |
| 15 | 22.9 | 32 |
| 16 | 23.0 | 6 |
| 17 | 23.6 | 8 |
| 18 | 24.0 | 26 |
| 19 | 24.9 | 37 |
| 20 | 26.6 | 5 |
| 21 | 26.8 | 64 |
| 22 | 27.2 | 8 |
| 23 | 28.3 | 65 |
| 24 | 29.0 | 12 |
| 25 | 31.0 | 5 |

Form I freebase, obtained from lyophilization of a solution of Compound 1 freebase in 50% acetonitrile in water, and containing a trace amount of an unknown metastable form (UnID. *) as identified by XRPD, was also tested. See FIG. 2B. Dynamic Vapor Sorption (DVS) indicated Form I freebase had water uptake of 0.5% weight gain between 5-95% relative humidity (RH), with 0.0.04% weight gain between 35-65% RH, but that all the adsorbed water was lost during the drying cycle, indicating Form I freebase is reversibly, but slightly, hygroscopic. XRPD of the material post-DVS analysis showed the absence of the signal at 5.9 °2θ attributed to the unknown metastable form (UnID. *), while signals corresponding to Form I freebase remain unchanged, supporting the position that Form I is a stable crystalline form.

A polarized light microscopy (PLM) image of Form I freebase crystals, which present as rhombohedral plates between about 20 microns to about 100 microns in diameter, is provided in FIG. 2C.

Form I freebase exhibited a single endotherm with an onset of about 226.8° C., and with a peak of about 228.5° C., as observed by the stand-alone DSC experiments. See FIG. 2B. The DSC of Form I freebase shows no endothermic events observed between 30-170° C., suggesting that Form I is anhydrous, and not hydrated or solvated.

KF analysis confirmed about 0.50 wt. % water in the solid, further suggesting the form is anhydrous (not hydrated). Data not shown.

$^1$H NMR analysis confirmed the residual solvent in the Form I freebase was below the detection limit of the NMR instrument. Data not shown. Taken together with the above KF and S-TGA/DSC and stand-alone DSC analysis of Form I freebase, the results suggest the form is anhydrous, and that no solvent or water is trapped in the crystalline lattice.

Dry and solvent-drop milling on pure-phase Form I freebase was performed using a ball mill with ¼ inch stainless steel ball as milling media. Approximately 30-35 mg of Form I freebase was weighed into a milling capsule and 1 vol. of solvent (solvent drop) was added. The milling was carried out for 16 s at 3500 rpm. The results are summarized in Table 2E. Overall, no new patterns were identified from dry and solvent-drop milling experiments. In most cases, except for some loss in crystallinity, the XRPD of Form I freebase remained largely unchanged. Loss of crystallinity was most evident in the dry-milled sample, though Form I freebase pattern was still readily distinguished.

TABLE 2E

Dry and solvent drop milling of Form I freebase

| Mass of solid (mg) | Solvent (1 Vol.) | XRPD |
|---|---|---|
| 35.1 | Methanol (MeOH) | Form I |
| 36.2 | Acetone | Form I |
| 34.6 | Tetrahydrofuran (THF) | Form I |
| 32.4 | Isopropanol:water (9:1 vol.) | Form I |
| 32.4 | acetonitrile:dimethylformamide (8:2 vol.) | Form I |
| 30.2 | None (dry) | Form I |

A summary of the results for Form I freebase is provided in Table 2F.

TABLE 2F

Additional characterization of Form I freebase

| Description | Results |
|---|---|
| DSC onset (° C.) | 226.8 |
| DSC peak (° C.) | 228.5 |
| Karl Fischer water content (wt. %) | 0.5 |
| NMR residual solvent (wt. %) | none detected |
| HPLC chemical purity (area %) | 96.08 |
| DVS mass change 5-95% RH (wt. %) | 0.5 |
| Morphology | Rhombohedral plates |

Example 3. Form II Freebase

As noted in Example 2, pure-phase Form 11 may be prepared by evaporation from tetrahydrofuran (THF). See Table 2A and Table 2B. In a representative experiment, 208.5 mg Compound 1 freebase was weighed into a 20 mL vial. THF (9 mL) was added to the vial and the sample was stirred at 50° C. until a thin slurry was generated. The thin slurry was syringe-filtered through a 0.45 m syringe filter and then evaporated in atmosphere, without stirring, at 50° C. The solids were then dried in vacuo (−29.5 inHg) at 50° C. for 3 hours to provide Form 11 freebase. XRPD of Form 11 freebase is provided in FIG. 3A, and the corresponding signal list is provided in Table 3A.

TABLE 3A

| Signal No. | Angle (°2θ) | Relative intensity |
|---|---|---|
| 1 | 5.6 | 7 |
| 2 | 11.1 | 79 |
| 3 | 12.1 | 63 |
| 4 | 13.1 | 5 |
| 5 | 13.6 | 86 |
| 6 | 14.8 | 11 |
| 7 | 15.5 | 8 |
| 8 | 16.1 | 23 |
| 9 | 16.7 | 41 |
| 10 | 18.2 | 23 |
| 11 | 19.7 | 14 |
| 12 | 19.9 | 14 |
| 13 | 20.1 | 18 |
| 14 | 20.4 | 6 |
| 15 | 21.6 | 27 |
| 16 | 22.5 | 100 |
| 17 | 24.4 | 23 |
| 18 | 24.8 | 29 |
| 19 | 26.2 | 92 |
| 20 | 27.0 | 16 |
| 21 | 27.4 | 13 |
| 22 | 28.0 | 50 |
| 23 | 29.4 | 7 |
| 24 | 32.5 | 6 |
| 25 | 33.6 | 6 |
| 26 | 34.7 | 5 |
| 27 | 38.0 | 5 |
| 28 | 39.6 | 5 |

Dynamic Vapor Sorption (DVS) indicated Form II freebase had water uptake of about 1.03% weight gain between 5-95% relative humidity (RH), but that all the adsorbed water was lost during the drying cycle, indicating Form II is reversibly, but slightly, hygroscopic, and more hygroscopic than Form I freebase. Comparison of the XRPD pre- and post DVS is provided in FIG. 3B, demonstrating Form II freebase remained unchanged pre- and post-DVS, supporting the position that Form II freebase is a stable crystalline form.

A polarized light microscopy (PLM) image of Form II freebase crystals, which present as rhombohedral plates between about 5 microns and about 40 microns in diameter, is provided in FIG. 3C.

Form II freebase exhibited a single endotherm with an onset between about 221.5° C. (FIG. 3E) and about 221.9° C. (FIG. 3D), and with a peak between about 225.0° C. (FIG. 3E) and about 225.8° C. (FIG. 3D), as observed by S-TGA/DSC and the stand-alone DSC experiments. The mass loss up to the endotherm as observed in the TGA scan was about 0.78 wt. %. See FIG. 3D. No significant weight loss was observed between 20-150° C. via TGA, suggesting Form II freebase is anhydrous, and not solvated or hydrated. The DSC of Form II freebase shows no endothermic events observed between 30-170° C., further suggesting Form II is anhydrous, and not solvated or hydrated.

KF analysis confirmed no water in the solid (below detection limit, BDL), indicating the form is anhydrous (not hydrated). Data not shown.

$^1$H NMR analysis confirmed that Form II freebase contained approximately 0.65 wt. % of tetrahydrofuran (THF). Data not shown. Taken together with the above S-TGA/DSC, stand-alone DSC, and KF analysis of Form II freebase, the results suggest the THF is residual solvent, that Form II freebase is anhydrous, with no residual solvent or water trapped in the crystalline lattice.

A summary of the results for Form II freebase is provided in Table 3B.

TABLE 3B

Additional characterization of Form II freebase

| Description | Results |
|---|---|
| DSC onset (° C.) | 221.5-221.9 |
| DSC peak (° C.) | 225.0-225.8 |
| TGA mass loss (wt. %) | 0.78 |
| Karl Fischer water content (wt. %) | BDL (<0.04 wt. %) |
| NMR residual solvent (wt. %) | 0.65 (THF) |
| HPLC chemical purity (area %) | 98.12 |
| DVS mass change 5-95% RH (wt. %) | 1.03 |
| Morphology | Rhombohedral plates |

Example 4. Form III Freebase

As noted in Example 2, a mixture of Form III freebase (major) and Form I freebase (minor) was obtained from the direct addition of water (antisolvent) into a solution of 22.4 mg of Compound 1 freebase in dimethyl sulfoxide (DMSO) (5V). See Table 2B of Example 2. The ratio of the two patterns was essentially unchanged after drying in vacuo at 50° C. for 4 h. Reverse addition (DMSO/water) gave Form III alone, with no evidence of Form L. See Table 2B of Example 2.

Pure-phase Form III freebase was also prepared by seeding an antisolvent crystallization from ethanol (EtOH)/water. In a representative experiment, 205.0 mg Compound 1 Freebase was weighed into a 20 mL vial. EtOH:water (9:1 vol.; 30 vol.; 6.15 mL) was added to the vial, which was stirred at 50° C. until dissolution. Water was added dropwise in two 15 vol. portions, with a 15-20 mmi interval between additions. The solution was then seeded with approximately 1 mg Form III freebase, giving a slurry of pale-beige solids. The slurry was stirred for 1 h, after which another 15 V water was added. Stirring was continued at 50° C. for 1 h. The slurry was then cooled at a rate of 10° C./h to 10° C. and held at 10° C. overnight. The solids were isolated by vacuum filtration and dried in vacuo at 50° C. for 3 h.

An XRPD of Form III freebase is provided in FIG. 4A, and the corresponding signal list is provided in Table 4A.

TABLE 4A

XRPD - Form III Freebase

| Signal No. | Angle (°2θ) | Relative intensity |
|---|---|---|
| 1 | 6.4 | 100 |
| 2 | 8.6 | 14 |
| 3 | 10.2 | 22 |
| 4 | 12.7 | 20 |
| 5 | 15.0 | 7 |
| 6 | 16.3 | 19 |
| 7 | 17.2 | 17 |
| 8 | 17.8 | 33 |
| 9 | 18.1 | 29 |
| 10 | 19.5 | 11 |
| 11 | 20.5 | 9 |
| 12 | 20.7 | 27 |
| 13 | 21.8 | 35 |
| 14 | 22.2 | 11 |
| 15 | 22.6 | 10 |
| 16 | 23.4 | 21 |
| 17 | 24.7 | 10 |
| 18 | 24.9 | 12 |
| 19 | 25.4 | 23 |
| 20 | 25.5 | 16 |
| 21 | 26.3 | 18 |
| 22 | 26.6 | 12 |
| 23 | 28.1 | 6 |
| 24 | 29.2 | 7 |
| 25 | 32.4 | 5 |
| 26 | 33.5 | 8 |
| 27 | 37.9 | 6 |

Dynamic Vapor Sorption (DVS) indicated Form III freebase had water uptake of about 0.24% weight gain between 5-95% relative humidity (RH), but that all the adsorbed water was lost during the drying cycle, indicating Form III is reversibly, but slightly, hygroscopic, but less hygroscopic than either Form I or Form II freebases. Comparison of the XRPD pre- and post DVS is provided in FIG. 4B, demonstrating Form III freebase remained unchanged pre- and post-DVS, supporting the position that Form III freebase is a stable crystalline form.

A polarized light microscopy (PLM) image of Form III freebase crystals, which present as rectangular plates between about 5 microns to about 20 microns in diameter, is provided in FIG. 4C.

Form III freebase exhibited an endotherm with an onset between about 227.8° C. (FIG. 4D) and about 229.4° C. (FIG. 4E), with a peak between about 230.0° C. (FIG. 4D) and about 231.5° C. (FIG. 4E), as observed by S-TGA/DSC and the stand-alone DSC experiments. The mass loss up to the endotherm as observed in the TGA scan was about 0.16 wt. %. See FIG. 4D. No significant weight loss was observed between 20-150° C. via TGA, suggesting Form III freebase is anhydrous and not solvated. The DSC of Form III freebase shows no endothermic events observed between 30-170° C., further suggesting Form III freebase is anhydrous, and not hydrated or solvated.

KF analysis confirmed no water in the solid (below detection limit, BDL), indicating the form is anhydrous (not hydrated). Data not shown.

$^1$H NMR analysis confirmed residual solvent in the Form III freebase was below the detection limit of the NMR instrument. Data not shown. Taken together with the above KF, stand-alone DSC, and S-TGA/DSC analysis of Form III freebase, the results suggest the form is anhydrous, and that no solvent or water is trapped in the crystalline lattice.

Thermal treatment of Form III freebase to 210° C. was carried out. Approximately 5 mg of Form III freebase was weighed into a DSC pan. The sample was heated from 30° C. to 210° C. at a rate of 10° C./min, held at 210° C. for 10 min, then cooled from 210° C. to 30° C. at a rate of 20° C./min. The retrieved solids were yellow in color and were analyzed by XRPD, which indicated conversion to Form I freebase (Example 2) with minor extra peaks at 14.7 °2θ, 16.2 °2θ, 20.1 °2θ, and 22.4 °2θ. Data not shown. The peaks at 16.2 °2θ and 20.1 °2θ may have been due to trace amounts of Form II freebase (Example 3).

A summary of the results for Form III freebase is provided in Table 4B.

TABLE 4B

Additional characterization of Form III freebase

| Description | Results |
|---|---|
| DSC onset (° C.) | 227.8-229.4 |
| DSC peak (° C.) | 230.0-231.5 |
| TGA mass loss (wt. %) | 0.16 |
| Karl Fischer water content (wt. %) | BDL (<0.04 wt. %) |
| NMR residual solvent (wt. %) | none detected |
| HPLC chemical purity (area %) | 99.54 |
| DVS mass change 5-95% RH (wt. %) | 0.24 |
| Morphology | Rectangular plates |

Example 5. Form IV Freebase

As described in Example 2, reverse antisolvent addition with dimethylacetamide (DMAc)/water or N-methylpyrrolidone (NMP)/water gave pure-phase Form IV freebase. See Table 2B of Example 2. In a representative experiment, 64.6 mg Compound 1 Freebase was weighed into a 2 mL vial. dimethylacetamide (DMAc) (5 vol.) was added to the vial, which was stirred at RT until dissolution. Water (10 vol.) was added to a 4 mL vial containing a 10 mm stir bar and stirred at RT. While the vial of water was stirring, the entire solution of DMAc was added. A beige/yellow slurry precipitated instantly. After 30 min, an immobile slurry of white solids was observed. Another 5 V water was added to the slurry, which was then stirred overnight at RT. The slurry was filtered and washed with 2×2 vol. water, then dried in vacuo at 50° C. for 3 h, to provide Form IV freebase. The XRPD of Form IV freebase is provided in FIG. 5A, and the corresponding signal list is provided in Table 5A.

TABLE 5A

XRPD - Form IV Freebase

| Signal No. | Angle (°2θ) | Relative intensity |
| --- | --- | --- |
| 1 | 6.5 | 82 |
| 2 | 8.5 | 58 |
| 3 | 10.2 | 44 |
| 4 | 12.9 | 16 |
| 5 | 15.1 | 18 |
| 6 | 16.0 | 100 |
| 7 | 16.9 | 34 |
| 8 | 17.2 | 17 |
| 9 | 18.0 | 50 |
| 10 | 18.9 | 20 |
| 11 | 20.4 | 33 |
| 12 | 20.5 | 74 |
| 13 | 21.0 | 56 |
| 14 | 22.0 | 54 |
| 15 | 22.6 | 26 |
| 16 | 23.4 | 29 |
| 17 | 24.4 | 44 |
| 18 | 24.8 | 19 |
| 19 | 25.1 | 34 |
| 20 | 25.9 | 19 |
| 21 | 26.0 | 17 |
| 22 | 27.2 | 40 |
| 23 | 28.2 | 12 |
| 24 | 29.7 | 12 |
| 25 | 30.7 | 10 |
| 26 | 31.5 | 8 |
| 27 | 33.5 | 5 |
| 28 | 35.7 | 9 |
| 29 | 37.4 | 5 |
| 30 | 39.5 | 5 |

Dynamic Vapor Sorption (DVS) indicated Form IV freebase had water uptake of about 1.59% weight gain between 5-95% relative humidity (RH), but that all the adsorbed water was lost during the drying cycle, indicating Form IV is reversibly, but slightly, hygroscopic, but more hygroscopic than any of Forms I-III freebases. Comparison of the XRPD pre- and post DVS is provided in FIG. 5B, demonstrating Form IV freebase remained unchanged pre- and post-DVS, supporting the position that Form IV freebase is a stable crystalline form.

A polarized light microscopy (PLM) image of Form IV freebase crystals, which present as needles about 5 microns to about 50 microns in length, is provided in FIG. 5C.

Form IV freebase exhibited an exotherm between about 192.2° C. (FIG. 5D) and about 195.1° C. (FIG. 5E), with an onset between about 226.7° C. (FIG. 5D) and about 227.6° C. (FIG. 5E), with a peak between about 229.6° C. (FIG. 5D) and about 229.8° C. (FIG. 5E), as observed by S-TGA/DSC and the stand-alone DSC experiments. The mass loss up to the endotherm as observed in the TGA scan was about 0.54 wt. %. See FIG. 5D. Although the sample tested was high in residual solvent, it was not at a level which would suggest Form IV freebase is a solvate. Furthermore, no significant weight loss was observed between 20-150° C. via TGA, suggesting Form IV freebase is anhydrous, and not solvated or hydrated. The DSC of Form IV shows no endothermic events observed between 30-170° C., further suggesting Form IV is anhydrous, and not solvated or hydrated.

KF analysis confirmed about 0.29 wt. % water in the solid, further suggesting the form is anhydrous (not hydrated).

¹H NMR analysis confirmed that Form IV freebase contained approximately 0.74 wt. % dimethylacetamide (DMAc). Data not shown. Taken together with the above KF, stand-alone DSC, and S-TGA/DSC analysis of Form IV freebase, the results suggest the DMAc is residual solvent, and that Form IV freebase is anhydrous, with no solvent or water trapped in the crystalline lattice.

Thermal treatment of Form IV freebase to 210° C. was carried out. Approximately 5 mg of Form IV freebase was weighed into a DSC pan. The sample was heated from 30° C. to 210° C. at a rate of 10° C./min, held at 210° C. for 10 min, then cooled from 210° C. to 30° C. at a rate of 20° C./min. The retrieved solids were orange in color and were analyzed by XRPD, which indicated conversion to Form I freebase (with two minor peaks at 14.7 °2θ and 16.2 °2θ).

A summary of the results for Form IV freebase is provided in Table 5C.

TABLE 5B

Additional characterization of Form IV freebase

| Description | Results |
| --- | --- |
| DSC onset (° C.) | 192.2-195.1 (exotherm) |
| | 226.7-227.6 |
| DSC peak (° C.) | 229.6-229.8 |
| TGA mass loss (wt. %) | 0.54 |
| Karl Fischer water content (wt. %) | 0.29 |
| NMR residual solvent (wt. %) | 0.74 (DMAc) |
| HPLC chemical purity (area %) | 98.48 |
| DVS mass change 5-95% RH (wt. %) | 1.59 |
| Morphology | Needles |

Example 6. Competitive Slurry Experiments and Discovery of Form V Freebase

Competitive slurry experiments were carried out with Form I-IV freebases at two temperatures, room temperature (RT) and 50° C., in five solvents/solvent systems. First, saturated solutions of Form I freebase (Example 2) were prepared at each temperature in each solvent system. To make the saturated solutions, Form I freebase was added to 2 mL of solvent already stirring at the desired temperature, either room temperature (RT) or at 50° C. Once a thin slurry was observed, the samples were left to equilibrate overnight. After stirring overnight, the stir bars were removed to allow the solids to settle, and the supernatant was pipetted into clean 4 mL vials containing a 10 mm stir bar.

The supernatant was then left to stir for an additional 15 min prior to adding seeds (approximately 5 mg per form, pre-weighed) of the following patterns: Form I freebase (Example 2), Form II freebase (Example 3), Form III freebase (Example 4) and Form IV freebase (Example 5). Samples of the slurries were plated for XRPD analysis immediately after seeding. The slurries were then sampled again after 2 days and 7 days at the respective temperatures.

A summary of the competitive slurries is given in Table 6A. In all experiments, no evidence of Form III freebase or Form IV freebase was observed after 2 days at either RT or 50° C. In methanol (MeOH), Form II freebase was favored, with only trace amounts of Form I freebase present at RT, and none at 50° C. after 2 days. Form II freebase was also favored in tetrahydrofuran (THF) after 2 days at 50° C. In the remaining experiments, little change in the proportions of Form I freebase and Form II freebase were observed after 2 days at RT or 50° C.

After 7 days, Form II freebase was favored in most solvent systems.

In the case of isopropanol (IPA):water (9:1 vol.) at 50° C., significant conversion to a new pattern, Form V freebase, was observed after 7 days. No evidence of Form V freebase was seen in any other solvent system.

These initial competitive slurry experiments demonstrated the relative stability of Forms I-IV freebases. Form III and IV freebase converted rapidly, while Form I and II freebase were more stable. Form II freebase was favored over Form I freebase in all solvent systems except acetone:water (7:3 vol.), where neither form was clearly dominant over the other.

TABLE 6A

First Set of Competitive Slurry Experiments

| # | Temp | Solvent | Input seeds | XRPD post seeding | 2-day XRPD | 7-day XRPD |
|---|---|---|---|---|---|---|
| 1 | RT | Methanol (MeOH) | Forms I, II, III, IV | Forms I + II | Form II (+trace I) | Form II |
| 2 | RT | isopropanol:water (9:1 Vol.) | | Forms I + II + III | Forms I + II | Forms I + II (more Form II) |
| 3 | RT | Tetrahydrofuran (THF) | | Forms I + II + III | Forms I + II | I + II |
| 4 | RT | acetonitrile | | Forms I + II + III + IV | Forms I + II | Forms I + II (more II) |
| 5 | RT | Acetone:water (7:3 vol.) | | Forms I + II + III | Forms I + II | Forms I + II (more Form II) |
| 6 | 50° C. | Methanol (MeOH) | Forms I, II, III, IV | Forms I + II | Form II | Form II |
| 7 | 50° C. | isopropanol:water (9:1 Vol.) | | Forms I + II + III + IV | Forms I + II | Forms II + V |
| 8 | 50° C. | Tetrahydrofuran (THF) | | Forms I + II | Form II (+trace Form I) | Form II |
| 9 | 50° C. | acetonitrile | | Forms I + II + III + IV | Forms I + II | Form II |
| 10 | 50° C. | Acetone:water (7:3 Vol.) | | Forms I + II + III | Forms I + II | Forms I + II (more Form II) |

A second set of competitive slurry experiments was set up in three solvent systems and two temperatures to assess the relative stability of Form V freebase with respect to Form I freebase and Form II freebase. As Form II freebase was favored in most solvent systems, seeding with Form I freebase was only carried out in acetone:water (7:3 vol.) systems. A summary of the second set of competitive slurries is given in Table 6B. In all samples, the input seed patterns were observed less than 1 min after addition. After 3 days at the corresponding temperature, Form V freebase was the sole form observed in all experiments, except in acetonitrile at RT, where significant Form II freebase still remained. After 7 days, the quantity of Form II freebase remaining in the RT acetonitrile sample was greatly diminished, though Form II freebase was still present in trace quantities.

The second set of slurry experiments demonstrated that Form V freebase was favored over both Form I and II freebase in various solvent systems, including methanol (MeOH) and acetone:water (7:3 vol.).

TABLE 6B

Second Set of Competitive Slurry Experiments

| # | Temp | Solvent | Input seeds | XRPD post seeding | 3-day XRPD | 7-day XRPD |
|---|---|---|---|---|---|---|
| 1 | RT | acetonitrile | Forms II + V | Forms II + V | Forms II + V | Form V (+trace Form II) |
| 2 | RT | Methanol (MeOH) | | Forms II + V | Forms V | Form V |
| 3 | RT | Acetone:water (7:3 Vol.) | Forms I + II + V | Forms I + II + V | Form V | Form V |
| 4 | 50° C. | acetonitrile | Forms II + V | Forms II + V | Form V | Form V |
| 5 | 50° C. | Methanol (MeOH) | | Forms II + V | Form V | Form V |
| 6 | 50° C. | Acetone:water (7:3 Vol.) | Forms I + II + V | Forms I + II + V | Form V | Form V |

Solid form stability studies were performed on Form I-V freebase forms by weighing approximately 10-15 mg of the crystalline material into 4 mL vials and covering with a lab grade task wipe (Kimwipe). These vials were placed inside a stability chamber set at 75%±5% relative humidity (RH) at 40° C.±2° C., where they were left for one week (7 full days). The retrieved material was then analyzed by XRPD and HPLC. The results are summarized in Table 6C. In each case, the initial material and tested material were identical by XRPD, with the exception of Form I freebase, where an extra peak at 5.8 °2θ in the initial material was absent after the stability test. HPLC purities of the tested material were essentially unchanged from those of the initial material.

TABLE 6C

Stability studies at 75% ± 5% relative humidity (RH) at 40° C. ± 2° C. for 1 week

| XRPD (initial material) | XRPD (tested material) | Purity % a/a (input material) | Purity % a/a (tested material) |
|---|---|---|---|
| Form I | Form I | 98.06 | 97.94 |
| Form II | Form II | 98.12 | 98.12 |
| Form III | Form III | 99.54 | 99.60 |
| Form IV | Form IV | 99.48 | 98.53 |
| Form V | Form V | 99.46 | 99.60 |

Additional preparation of pure-phase Form V freebase was carried out by (i) slurrying 96.0 mg Compound 1 freebase in 20 vol. isopropanol:water (9:1 vol.) at 50° C. and (ii) seeding with a mixture of Form II freebase and Form V freebase obtained from the competitive slurry experiment. After stirring for approximately 24 h at 50° C., complete conversion to Form V freebase was observed. The slurry was cooled to RT, filtered, and washed with 2×1 vol. isopropanol:water (9:1 vol). The resulting solids were dried in vacuo at 50° C. for 3 h. The XRPD of Form V freebase is provided in FIG. 6A, and the corresponding signal list is provided in Table 6D.

TABLE 6D

XRPD - Form V Freebase

| Signal No. | Angle (°2θ) | Relative intensity |
|---|---|---|
| 1 | 6.8 | 18 |
| 2 | 11.7 | 46 |
| 3 | 11.8 | 18 |
| 4 | 13.7 | 5 |
| 5 | 17.0 | 5 |
| 6 | 18.9 | 77 |
| 7 | 19.6 | 6 |
| 8 | 20.5 | 100 |
| 9 | 22.2 | 5 |
| 10 | 22.5 | 6 |
| 11 | 22.9 | 61 |
| 12 | 23.8 | 14 |
| 13 | 23.9 | 17 |
| 14 | 25.4 | 7 |
| 15 | 26.5 | 26 |
| 16 | 29.2 | 7 |
| 17 | 29.6 | 5 |

Dynamic Vapor Sorption (DVS) indicated Form V freebase had water uptake of about 0.20% weight gain between 5-95% relative humidity (RH), but that all the adsorbed water was lost during the drying cycle, indicating Form V is reversibly, but slightly, hygroscopic, and less hygroscopic than any of Forms I-IV freebases. Comparison of the XRPD pre- and post DVS is provided in FIG. 6B, demonstrating Form V freebase remained unchanged pre- and post-DVS, supporting the position that Form V freebase is a stable crystalline form.

A polarized light microscopy (PLM) image of Form V freebase crystals, which present as rhombohedral plates about 5 microns to about 20 microns in diameter, is provided in FIG. 6C.

Form V freebase exhibited a single endotherm with an onset between 227.5° C. (FIG. 6D) and 227.7° C. (FIG. 6E), with a peak between 228.8° C. (FIG. 6E) and 229.9° C. (FIG. 6D), as observed by S-TGA/DSC and the stand-alone DSC experiments. The mass loss up to the endotherm as observed in the TGA scan was 0.16 wt. %. See FIG. 6D. No significant weight loss was observed between 20-150° C. via TGA, suggesting Form V freebase is anhydrous and not solvated. DSC of Form V shows no endothermic events observed between 30-170° C., further suggesting Form V is anhydrous and not solvated.

KF analysis confirmed no water in the solid (below detection limit, BDL), indicating the form is anhydrous (not hydrated). Data not shown.

$^1$H NMR analysis confirmed the residual solvent in the Form V freebase was below the detection limit of the NMR instrument. Data not shown. Taken together with the above KF, stand-alone DSC, and S-TGA/DSC analysis of Form V freebase, the results suggest the form is anhydrous, and that no solvent or water is trapped in the crystalline lattice.

A summary of the results for Form V freebase is provided in Table 6E.

TABLE 6E

Additional characterization of Form V freebase

| Description | Results |
|---|---|
| DSC onset (° C.) | 227.5-227.7 |
| DSC peak (° C.) | 228.8-229.9 |
| TGA mass loss (wt. %) | 0.16 |
| Karl Fischer water content (wt. %) | BDL (<0.04 wt. %) |
| NMR residual solvent (wt. %) | none detected |
| HPLC chemical purity (area %) | 99.46 |
| DVS mass change 5-95% RH (wt. %) | 0.20 |
| Morphology | Rhombohedral plates |

Form V freebase was the least hygroscopic of the Forms studied by DVS, had a relatively high-melting onset temperature by DSC (which is an indicator of desirable stability), appeared to be the most thermodynamically stable form studied (as determined by the $2^{nd}$ set of competitive slurry experiments), and exhibited good solid-form and chemical stability at elevated RH (as observed by no form change or purity decrease after one-week at 75% RH and 40° C.). Form V freebase was thus considered a form suitable for manufacturability and clinical purposes based on its good physicochemical properties and demonstrated thermodynamic stability.

Single crystals of Form V freebase were grown by temperature cycling a slurry of Compound 1 Form V freebase (50 mg) in 90% v/v isopropanol/water (500 μL). The slurry was temperature cycled between 0-50° C. using profile 1 (200 rpm overhead stirring) [(1) Ramp to 50° C. at 2° C./min; (2) Isothermal hold for 2 minutes; (3) Ramp to 0° C. at 0.1° C./min; (4) Isothermal hold for 20 minutes; (5) Total of 50 cycles] to allow for the full conversion to Form V, followed by temperature cycling using profile 2 (no stirring) [(1) Ramp to 40° C. at 5° C./min; (2) Isothermal hold for 1 minutes; (3) Ramp to 0° C. at 0.05° C./min; (4) Isothermal hold for 20 minutes; (5) Total of 10 cycles; (6) Ramp to 30°

C. at 5° C./min; (7) Isothermal hold for 1 minutes; (8) Ramp to 0° C. at 0.05° C./min; (9) Isothermal hold for 20 minutes; (10) Total of 30 cycles] for crystal growth. Block like crystals approximately 140 μm in length were obtained and analyzed by PLM.

The structure of Form V freebase was solved and refined into the monoclinic space group $P2_1/c$. See Table 6F.

TABLE 6F

Crystallographic parameters of Form V freebase

| | |
|---|---|
| Empirical formula | $C_{17}H_{17}ClN_4O_2$ |
| Formula weight | 344.79 |
| Temperature/K | 100(2) |
| Crystal system | Monoclinic |
| Space group | $P2_1/c$ |
| a/Å | 13.1799(2) |
| b/Å | 9.11600(10) |
| c/Å | 13.6568(2) |
| α/° | 90 |
| β/° | 101.6140(10) |
| γ/° | 90 |
| Volume/Å³ | 1607.24(4) |
| Z | 4 |
| $\rho_{calc}$ g/cm³ | 1.425 |
| μ/mm⁻¹ | 2.260 |
| F(000) | 720.0 |
| Crystal size/mm³ | 0.11 × 0.08 × 0.05 |
| Radiation | Cu Kα (λ = 1.54184) |
| 2Θ range for data collection/° | 6.846 to 153.802 |
| Index ranges | −16 ≤ h ≤ 16, −11 ≤ k ≤ 11, −12 ≤ l ≤ 16 |
| Reflections collected | 15527 |
| Independent reflections | 3219 |
| Data/restraints/parameters | 3219/0/228 |
| Goodness-of-fit on F² | 1.072 |
| Final R indexes [I >= 2σ (I)] | R1 = 0.0377, wR2 = 0.0923 |
| Final R indexes [all data] | R1 = 0.0417, wR2 = 0.0945 |
| Largest diff. peak/hole/eÅ⁻³ | 0.28/−0.26 |

Figure 6F:
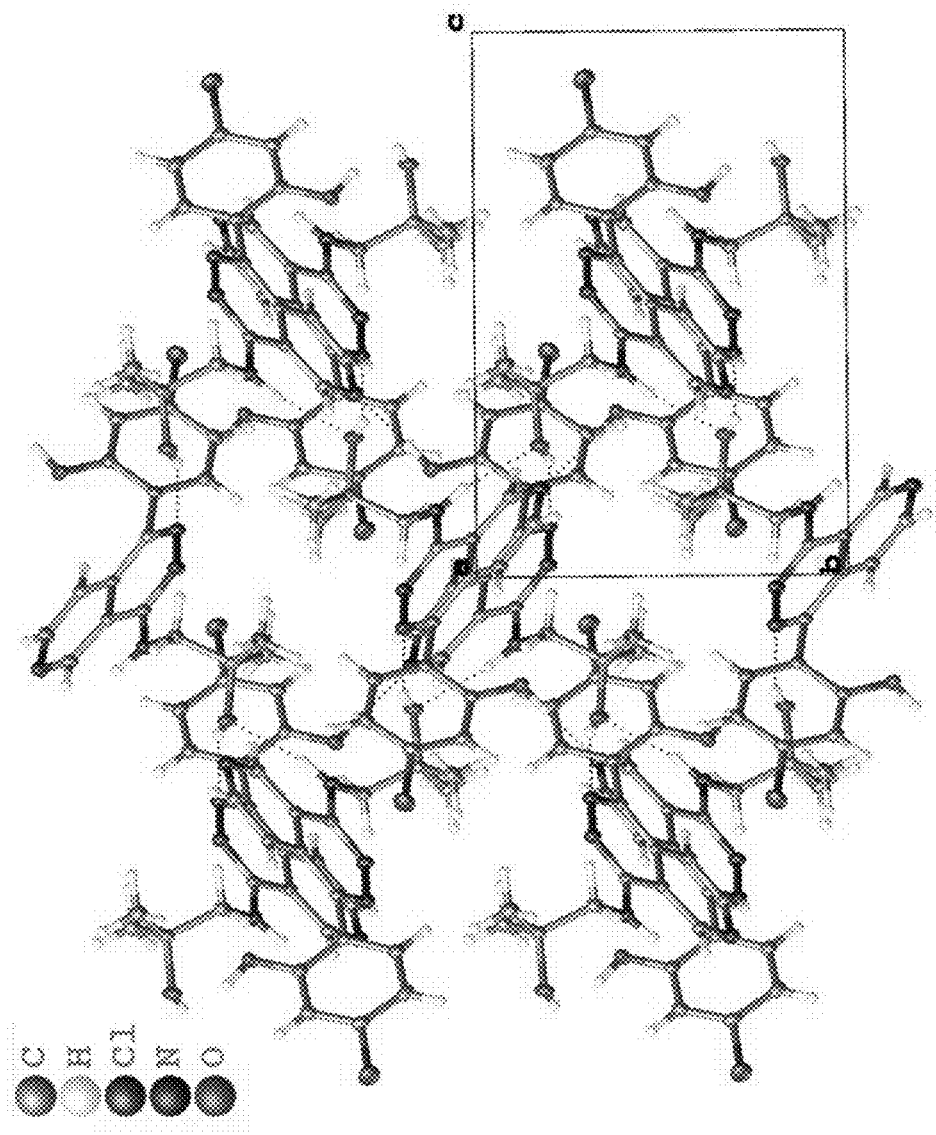
FIG. 6F depicts the SXRD along the a-axis of Form V Freebase.
Figure 6G:
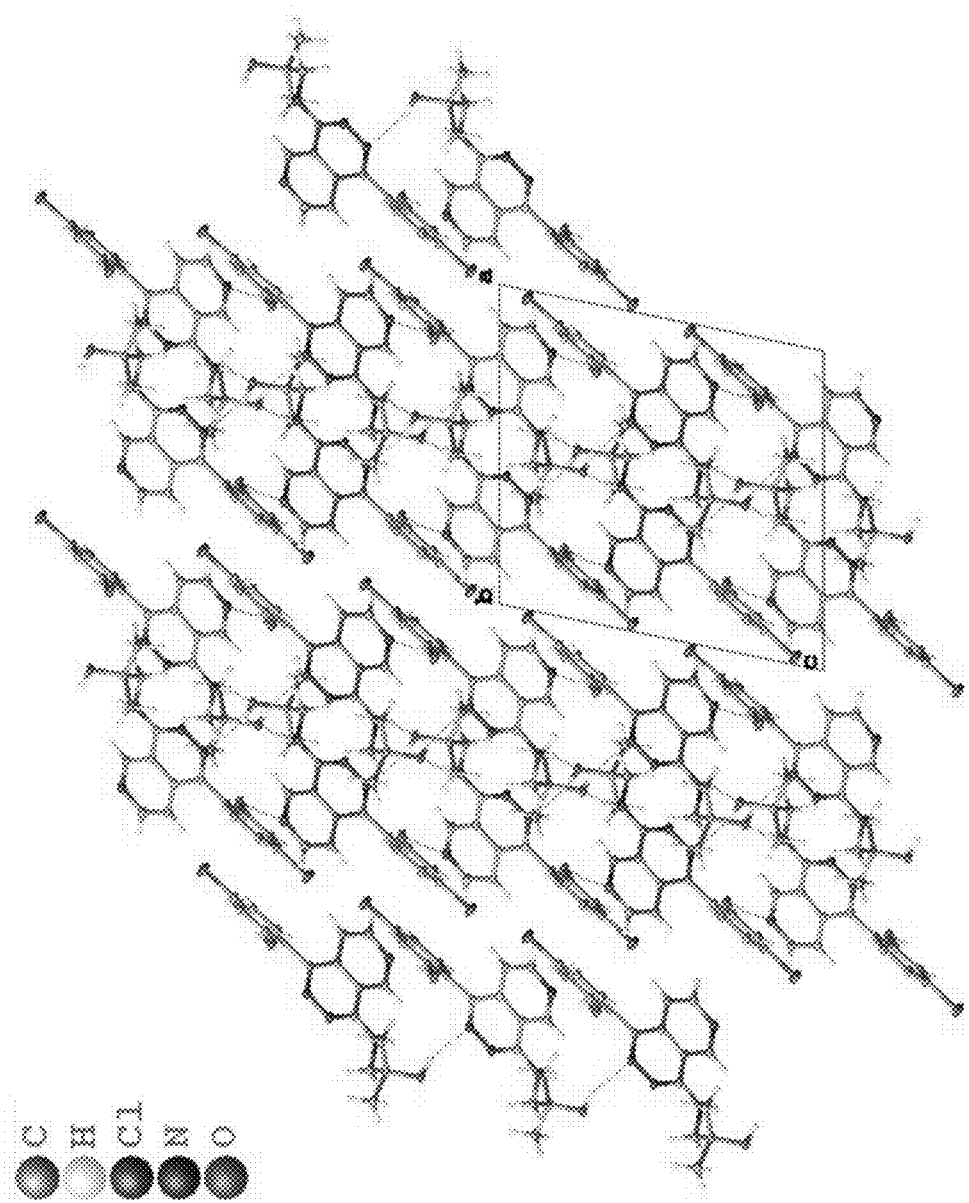
FIG. 6G depicts the SXRD along the b-axis of Form V Freebase.
Figure 6H:
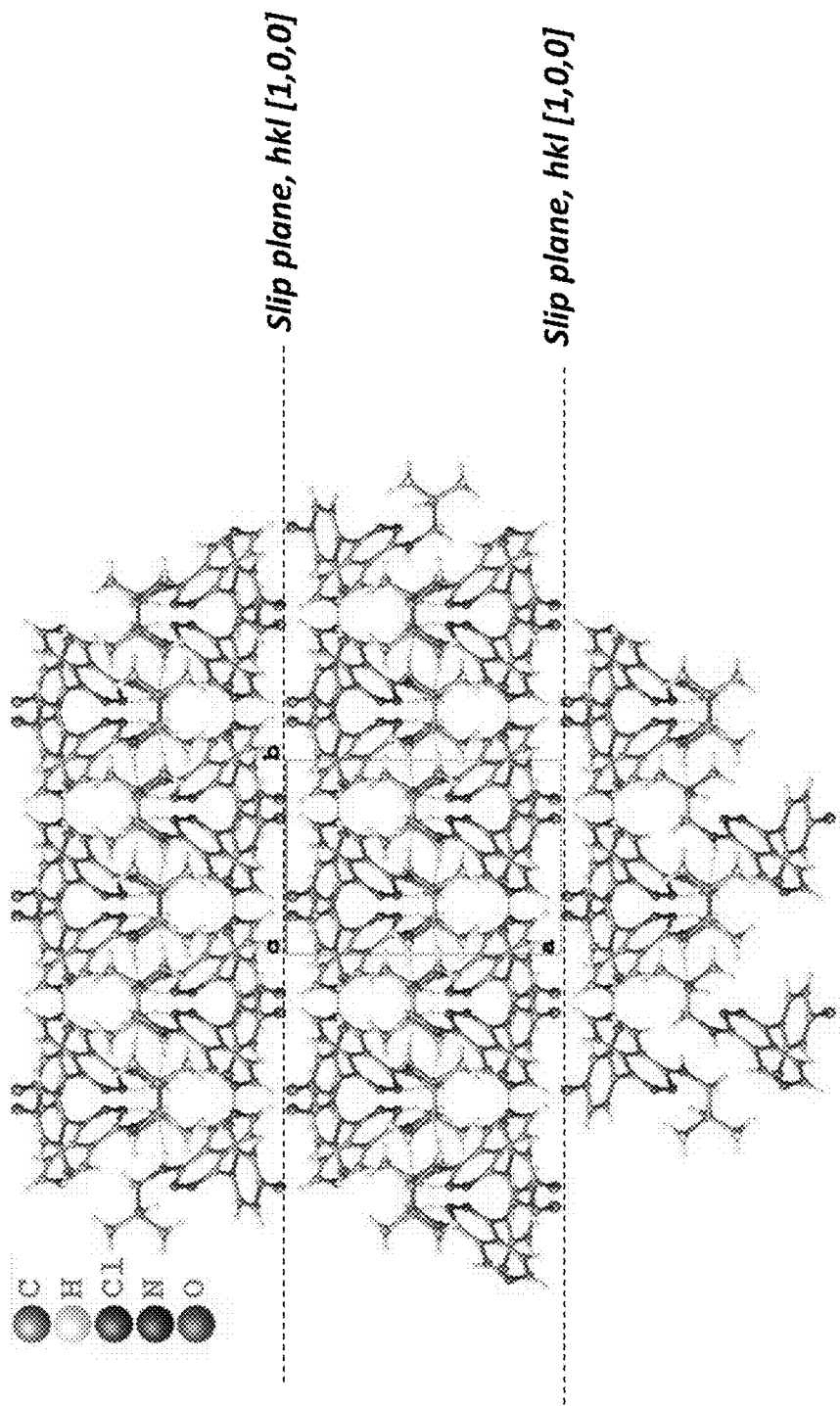
FIG. 6H depicts the SXRD along the c-axis of Form V Freebase.

The asymmetric unit comprised one molecule of Compound 1 freebase, and there were 4 asymmetric units in the unit cell. No solvent molecules were refined into the asymmetric unit and there were no regions of unrefined electron density in the Fourier map. No solvent accessible voids were observed along the a axis (FIG. 6F), b axis (FIG. 6G) or c axis (FIG. 6H). Investigation of the packing of Form V freebase down both b axis (FIG. 6G) and c axis (FIG. 6H) showed the existence of a slip planes. Slip planes along the c axis are indicated in FIG. 6H via dashed lines. Such crystalline lattice features may allow the crystal to deform plastically, resulting in potentially easier millability and high tableting performance. See, for example, Pallipurath et al., "Sulfamerazine: Understanding the Influence of Slip Planes in the Polymorphic Phase Transformation through X-Ray Crystallographic Studies and ab Initio Lattice Dynamics.", *Molecular Pharmaceutics* (2015) 12(10):3735-3748, and Wahyudi et al., "The Crystal Packing and Slip Plane Analysis in Mechanical Properties Improvement of Mefenamic Acid by Crystallization with Nicotinamide Conformer." *Communications in Science and Technology* (2020) 5(2)93-97, both demonstrating slip planes resulted in improved mechanical properties of the tested crystalline form.

Figure 6I:
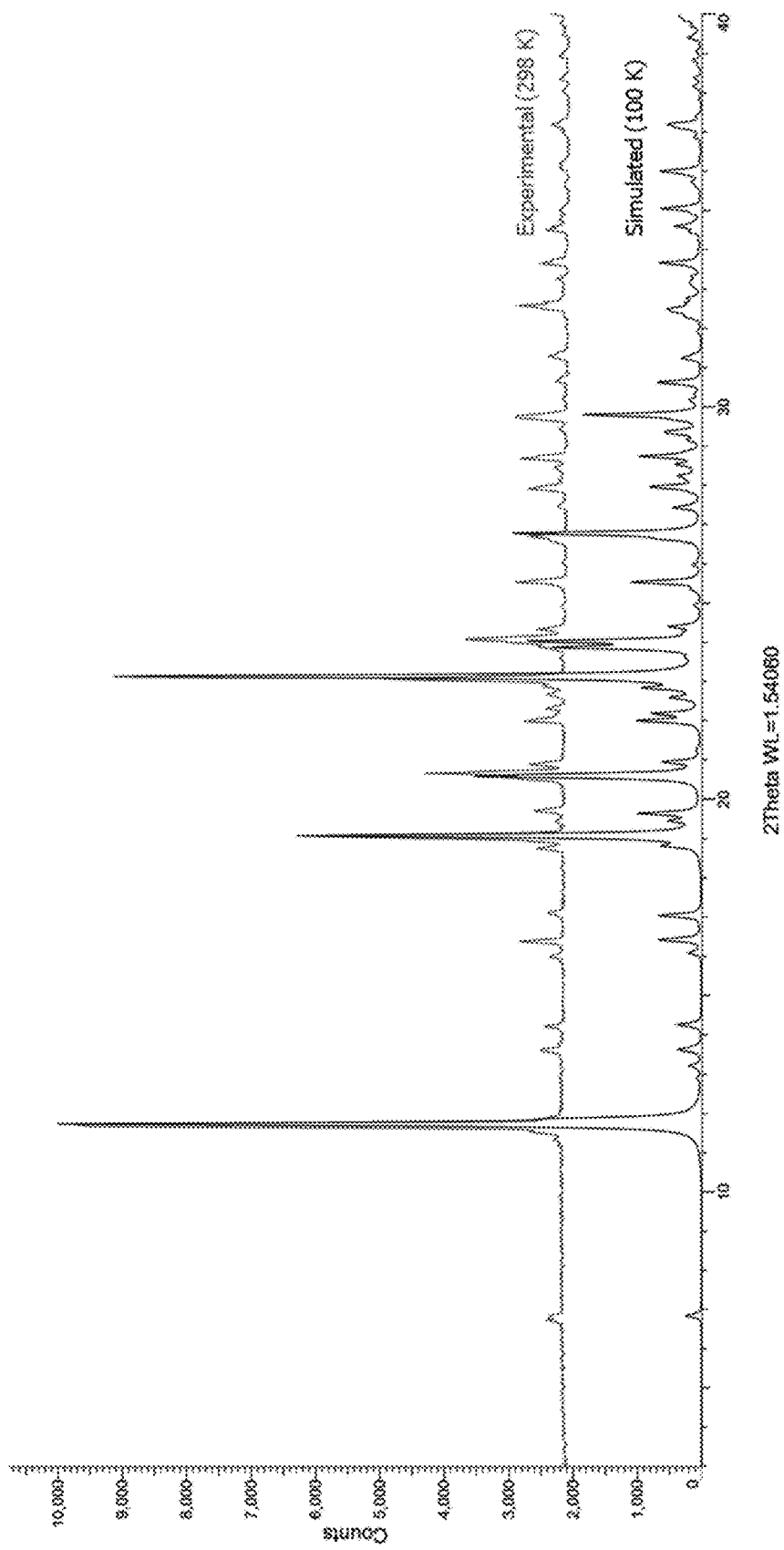
FIG. 6I depicts the XRPD (experimental and simulated) of Form V Freebase.

An overlay of the simulated (100 K) XRPD of the single crystal and experimental (about 293 K) XRPD diffractograms of Form V freebase is provided in FIG. 6I. Due to the thermal expansion effects caused by the difference in temperature between the two measurements, some shifting of the diffraction peaks is to be expected.

Example 7. Patterns A-C

Pattern A freebase was identified from trifluoroethanol (TFE), see Example 2, Table 2A, and was determined to be a low-crystalline version of Form I freebase. The XRPD of Pattern A freebase is provided in FIG. 7A, and the corresponding signal list is provided in Table 7A. Comparison of the XRPD of Pattern A freebase to Form I freebase is provided in FIG. 7B.

TABLE 7A

XRPD - Pattern A Freebase

| Signal No. | Angle (°2θ) | Relative intensity |
|---|---|---|
| 1 | 5.6 | 14 |
| 2 | 11.3 | 24 |
| 3 | 11.9 | 100 |
| 4 | 13.0 | 27 |
| 5 | 13.9 | 13 |
| 6 | 15.3 | 30 |
| 7 | 16.9 | 15 |
| 8 | 17.9 | 15 |
| 9 | 18.8 | 17 |
| 10 | 19.3 | 14 |
| 11 | 20.3 | 9 |
| 12 | 21.2 | 82 |
| 13 | 22.9 | 36 |
| 14 | 23.1 | 32 |
| 15 | 23.9 | 27 |
| 16 | 25.1 | 20 |
| 17 | 26.8 | 67 |
| 18 | 27.2 | 35 |
| 19 | 28.2 | 11 |
| 20 | 29.1 | 13 |

Pattern B freebase was obtained from dimethylacetamide (DMAc)/methyl isobutyl ketone (MIBK) after standing overnight at −20° C. See Example 2, Table 2B. Drying Pattern B freebase overnight at 50° C. led to conversion to Form I freebase, though a few intense, extra peaks were also present at 8.1 °2θ, 16.2 °2θ and 24.4 °2θ. The XRPD of Pattern B freebase, taken before drying, is provided in FIG. 7C, and the corresponding signal list is provided in Table 7B.

TABLE 7B

XRPD - Pattern B Freebase

| Signal No. | Angle (°2θ) | Relative intensity |
|---|---|---|
| 1 | 5.6 | 100 |
| 2 | 10.5 | 2 |
| 3 | 15.0 | 2 |
| 4 | 16.4 | 1 |
| 5 | 16.9 | 13 |
| 6 | 17.8 | 1 |
| 7 | 18.1 | 1 |
| 8 | 18.4 | 2 |
| 9 | 20.0 | 1 |
| 10 | 20.4 | 1 |
| 11 | 21.3 | 1 |
| 12 | 21.7 | 1 |
| 13 | 22.1 | 1 |
| 14 | 22.6 | 7 |
| 15 | 24.2 | 1 |
| 16 | 25.0 | 1 |
| 17 | 25.8 | 1 |
| 18 | 26.0 | 1 |

Pattern C freebase was obtained from isopropanol (IPA): water (9:1 vol.) at −20° C. See Table 2B of Example 2. Pattern C freebase converted to the low-crystalline version of Form I freebase (Pattern A freebase) after drying overnight at 50° C., with peaks at 4.5 °2θ and 8.9 °2θ either absent or greatly diminished in the dried samples, suggesting Pattern C freebase is an isopropanol solvate. The XRPD of Pattern C freebase is provided in FIG. 7D), and the corresponding signal list is provided in Table 7C.

TABLE 7C

XRPD - Pattern C Freebase

| Signal No. | Angle (°2θ) | Relative intensity |
|---|---|---|
| 1 | 4.5 | 100 |
| 2 | 9.0 | 41 |
| 3 | 11.3 | 2 |
| 4 | 13.4 | 8 |
| 5 | 17.0 | 1 |
| 6 | 17.9 | 2 |
| 7 | 20.7 | 1 |
| 8 | 22.5 | 1 |
| 9 | 24.8 | 4 |
| 10 | 26.7 | 1 |
| 11 | 27.0 | 3 |
| 12 | 28.5 | 1 |

Example 8. Form V Freebase Preparation Method

Compound 1 Form 11 freebase (40 mg/mL) was stirred in a mixture of water/THF (1:19 v/v, 25 vol) at 32° C. until a hazy solution was obtained. After cooling to 20° C. and filtration, the solution was concentrated at 40-50° C. under reduced pressure to a concentration of 133 mg/mL (7.5 vol). The solution was then maintained at 45° C., and to this solution was added seeds of Form V freebase (0.4 wt/wt %) after which the temperature was adjusted to 40° C. and maintained at this temperature for 58 minutes. The resulting suspension was then cooled to 22° C. over 160 minutes and then cooled to 20° C. and maintained at this temperature for 10 hours. The slurry was concentrated at 40-50° C. under reduced pressure to a concentration of 200 mg/mL (5 vol), after which the slurry was maintained at 41° C. for 42 minutes and then cooled to 21° C. over 57 minutes and then further maintained at this temperature for 40 minutes. Acetone (10 vol) was added over 63 minutes and the suspension was heated to 40° C. and maintained at this temperature for 72 minutes, and then cooled to 20° C. over 90 minutes and then further maintained at this temperature for 13.5 hours. The suspension was filtered and washed with firstly a mixture of acetone/THF (3:1 v/v, 4 vol) and secondly with acetone (4 vol). Finally, the Compound 1 Form V Freebase was dried at 40° C. under reduced pressure and a sweep of nitrogen.

Exemplary Embodiments

Embodiment 1. A crystalline freebase form of Compound 1:

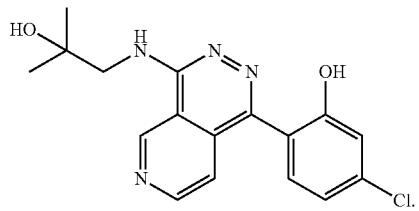 [SMILES: CC(C)(O)CNc1nnc(-c2ccc(Cl)cc2O)c2ccncc12]

Embodiment 2. The crystalline form of embodiment 1, having an X-ray powder diffraction signal at 6.8±0.2 or 11.7±0.2 °2θ, and having at least one additional signal at 18.9±0.2, 20.5±0.2, or 22.9±0.2 °2θ, using Cu K alpha radiation when measured at 25° C.

Embodiment 3. The crystalline form of any one of the preceding embodiments, having an X-ray powder diffraction signal at:
a) 6.8±0.2, 18.9±0.2, and 20.5±0.2 °2θ, using Cu K alpha radiation when measured at 25° C.;
b) 6.8±0.2, 20.5±0.2, and 22.9±0.2 °2θ, using Cu K alpha radiation when measured at 25° C.;
c) 11.7±0.2, 18.9±0.2, and 20.5±0.2 °2θ, using Cu K alpha radiation when measured at 25° C.; or
d) 11.7±0.2, 20.5±0.2, and 22.9±0.2 °2θ, using Cu K alpha radiation when measured at 25° C.

Embodiment 4. The crystalline form of any one of the preceding embodiments, having an X-ray powder diffraction signal at 6.8±0.2 and 11.7±0.2 °2θ, using Cu K alpha radiation when measured at 25° C.

Embodiment 5. The crystalline form of any one of the preceding embodiments, having an X-ray powder diffraction signal at 6.8±0.2, 18.9±0.2, 20.5±0.2, and 22.9±0.2 °2θ, using Cu K alpha radiation when measured at 25° C.

Embodiment 6. The crystalline form of any one of the preceding embodiments, having an X-ray powder diffraction signal at 11.7±0.2, 18.9±0.2, 20.5±0.2, and 22.9±0.2 °2θ, using Cu K alpha radiation when measured at 25° C.

Embodiment 7. The crystalline form of any one of the preceding embodiments, having an X-ray powder diffraction signal at 6.8±0.2, 11.7±0.2, 18.9±0.2, 20.5±0.2, and 22.9±0.2 °2θ, using Cu K alpha radiation when measured at 25° C.

Embodiment 8. The crystalline form of any one of the preceding embodiments, having at least one additional X-ray powder diffraction signal at 23.8±0.2, 23.9±0.2, or 26.5±0.2 °2θ using Cu K alpha radiation when measured at 25° C.

Embodiment 9. The crystalline form of any one of the preceding embodiments, having further X-ray powder diffraction signal at 23.8±0.2, and 26.5±0.2, or at 23.8±0.2, 23.9±0.2, and 26.5±0.2 °2θ using Cu K alpha radiation when measured at 25° C.

Embodiment 10. The crystalline form of any one of the preceding embodiments, having an X-ray powder diffraction signal at 6.8±0.2, 18.9±0.2, 20.5±0.2, 22.9±0.2, 23.8±0.2, and 26.5±0.2 °2θ, using Cu K alpha radiation when measured at 25° C.

Embodiment 11. The crystalline form of any one of the preceding embodiments, having an X-ray powder diffraction signal at 6.8±0.2, 18.9±0.2, 20.5±0.2, 22.9±0.2, 23.8±0.2, 23.9±0.2, and 26.5±0.2 °2θ, using Cu K alpha radiation when measured at 25° C.

Embodiment 12. The crystalline form of any one of the preceding embodiments, having an X-ray powder diffraction signal at 11.7±0.2, 18.9±0.2, 20.5±0.2, 22.9±0.2, 23.8±0.2, and 26.5±0.2 °2θ, using Cu K alpha radiation when measured at 25° C.

Embodiment 13. The crystalline form of any one of the preceding embodiments, having an X-ray powder diffraction signal at 11.7±0.2, 18.9±0.2, 20.5±0.2, 22.9±0.2, 23.8±0.2, 23.9±0.2, and 26.5±0.2 °2θ, using Cu K alpha radiation when measured at 25° C.

Embodiment 14. The crystalline form of any one of the preceding embodiments, having an X-ray powder diffraction signal at 6.8±0.2, 11.7±0.2, 18.9±0.2, 20.5±0.2, 22.9±0.2, 23.8±0.2, and 26.5±0.2 °2θ, using Cu K alpha radiation when measured at 25° C.

Embodiment 15. The crystalline form of any one of the preceding embodiments, having an X-ray powder diffraction signal at 6.8±0.2, 11.7±0.2, 18.9±0.2, 20.5±0.2, 22.9±0.2, 23.8±0.2, 23.9±0.2, and 26.5±0.2 °2θ, using Cu K alpha radiation when measured at 25° C.

Embodiment 16. The crystalline form of any one of the preceding embodiments, having at least one additional X-ray powder diffraction signal at 11.8±0.2, 13.7±0.2, 17.0±0.2, 19.6±0.2, 22.2±0.2, 22.5±0.2, 25.4±0.2, 29.2±0.2, or 29.6±0.2 °2θ using Cu K alpha radiation when measured at 25° C.

Embodiment 17. The crystalline form of any one of the preceding embodiments, having further X-ray powder diffraction signal at 11.8±0.2, 13.7±0.2, 17.0 0.2, 19.6±0.2, 22.2±0.2, 22.5±0.2, 25.4±0.2, 29.2±0.2, and 29.6±0.2 °2θ using Cu K alpha radiation when measured at 25° C.

Embodiment 18. The crystalline form of any one of the preceding embodiments, characterized by an endothermic event, such as by a single endothermic event, between about 215° C. to about 230° C., as measured by differential scanning calorimetry (DSC), such as DSC with a heating rate of 10.0° C./min.

Embodiment 19. The crystalline form of embodiment 18, characterized by an onset temperature between about 227.5 to about 227.7° C., such as between about 227.6 to about 227.7° C., as measured by DSC, such as DSC with a heating rate of 10.0° C./min.

Embodiment 20. The crystalline form of embodiment 18 or embodiment 19, characterized by a peak temperature between about 228.8 to about 229.9° C., as measured by DSC, such as DSC with a heating rate of 10.0° C./min.

Embodiment 21. The crystalline form of embodiment 18, wherein said endothermic event is characterized by an onset temperature between about 227.5 to about 227.7° C. and by a peak temperature between about 228.8 to about 229.9° C., as measured by DSC, such as DSC with a heating rate of 10.0° C./min.

Embodiment 22. The crystalline form of any one of the preceding embodiments, characterized by a mass loss of about 0.1%-0.5%, as measured by thermogravimetric analysis (TGA).

Embodiment 23. The crystalline form of any one of the preceding embodiments, wherein the morphology of the form comprises rhombohedral plates.

Embodiment 24. The crystalline form of embodiment 23, wherein the morphology of the form comprises rhombohedral plates of about 5 microns to about 20 microns in diameter.

Embodiment 25. The crystalline form of any one of the preceding embodiments, characterized by water uptake of about 0.20% weight gain between 5-95% relative humidity (RH) as measured by Dynamic Vapor Sorption (DVS).

Embodiment 26. The crystalline form of any one of the preceding embodiments, wherein the crystalline form is anhydrous.

Embodiment 27. The crystalline form of any one of the preceding embodiments, wherein the crystalline form is not a solvate.

Embodiment 28. The crystalline form of any one of the preceding embodiments, characterized by having an X-ray powder diffraction (XRPD) pattern substantially similar to that as set forth in FIG. 6A.

Embodiment 29. The crystalline form of any one of the preceding embodiments, characterized by having thermogravimetric analysis (TGA) scan substantially similar to that as set forth in FIG. 6D.

Embodiment 30. The crystalline form of any one of the preceding embodiments, characterized by having differential scanning calorimetry (DSC) scan substantially similar to that as set forth in FIG. 6E.

Embodiment 31. The crystalline form of any one of the preceding embodiments, wherein said crystalline form is Form V.

Embodiment 32. The crystalline form of embodiment 1 or any one of embodiments 2-31, wherein the freebase form of Compound 1 is pure-phase Form V.

Embodiment 33. The crystalline form of embodiment 1, having an X-ray powder diffraction signal at 11.2±0.2 or 12.0±0.2 °2θ, and having at least one additional signal at 5.6±0.2 °2θ, using Cu K alpha radiation when measured at 25° C.

Embodiment 34. The crystalline form of embodiment 1 or 33, having an X-ray powder diffraction signal at 5.6±0.2, 11.2±0.2, and 12.0±0.2 °2θ, using Cu K alpha radiation when measured at 25° C.

Embodiment 35. The crystalline form of embodiment 1 or any one of embodiments 33-34, having at least one additional X-ray powder diffraction signal at 16.9±0.2, 21.3±0.2, 26.8±0.2, or 28.3±0.2 °2θ using Cu K alpha radiation when measured at 25° C.

Embodiment 36. The crystalline form of embodiment 35, having additional X-ray powder diffraction signal at 16.9±0.2, 21.3±0.2, 26.8±0.2, and 28.3±0.2 °2θ using Cu K alpha radiation when measured at 25° C.

Embodiment 37. The crystalline form of embodiment 1 or any one of embodiments 31-36, having at least one additional X-ray powder diffraction signal at 13.1±0.2, 14.0±0.2, 15.4±0.2, 22.9±0.2, 24.0±0.2, or 24.9±0.2 °2θ using Cu K alpha radiation when measured at 25° C.

Embodiment 38. The crystalline form of embodiment 37, having additional X-ray powder diffraction signal at 13.1±0.2, 14.0±0.2, 15.4±0.2, 22.9±0.2, 24.0±0.2, and 24.9±0.2 °2θ using Cu K alpha radiation when measured at 25° C.

Embodiment 39. The crystalline form of embodiment 1 or any one of embodiments 31-38, having at least one additional X-ray powder diffraction signal at 14.8±0.2, 17.1±0.2, 18.0±0.2, 18.4±0.2, 20.3±0.2, 22.5±0.2, 23.0 0.2, 23.6±0.2, 26.6±0.2, 27.2±0.2, 29.0±0.2, or 31.0±0.2 °2θ using Cu K alpha radiation when measured at 25° C.

Embodiment 40. The crystalline form of embodiment 1 or any one of embodiments 31-39, characterized by a single endothermic event between about 210° C. to about 240° C., as measured by differential scanning calorimetry (DSC).

Embodiment 41. The crystalline form of embodiment 1 or any one of embodiments 31-40, characterized by an onset temperature between about 225° C. to about 228° C., such as between about 225° C. to about 227° C., between about 226° C. to about 228° C., or between about 226° C. to about 227° C., as measured by DSC.

Embodiment 42. The crystalline form of embodiment 1 or any one of embodiments 31-41, characterized by a peak temperature between about 227° C. to about 229° C., as measured by DSC.

Embodiment 43. The crystalline form of embodiment 1 or any one of embodiments 31-42, wherein the morphology of the form comprises rhombohedral plates.

Embodiment 44. The crystalline form of embodiment 1 or any one of embodiments 31-43, wherein the crystalline form is anhydrous.

Embodiment 45. The crystalline form of embodiment 1 or any one of embodiments 31-44, wherein the crystalline form is not a solvate.

Embodiment 46. The crystalline form of embodiment 1 or any one of embodiments 31-45, characterized by having an X-ray powder diffraction (XRPD) pattern substantially similar to that as set forth in FIG. 2A.

Embodiment 47. The crystalline form of embodiment 1 or any one of embodiments 31-46, characterized by having differential scanning calorimetry (DSC) scan substantially similar to that as set forth in FIG. 2B or in FIG. 2D.

Embodiment 48. The crystalline form of embodiment 1 or any one of embodiments 31-47, wherein the freebase form of Compound 1 is Form I.

Embodiment 49. The crystalline form of embodiment 1 or any one of embodiments 31-48, wherein the freebase form of Compound 1 is pure-phase Form I.

Embodiment 50. The crystalline form of embodiment 1, having an X-ray powder diffraction signal at 11.1±0.2 or 13.6±0.2 °2θ, and having at least one additional signal at 12.1±0.2 °2θ, using Cu K alpha radiation when measured at 25° C.

Embodiment 51. The crystalline form of embodiment 1 or embodiment 50, having an X-ray powder diffraction signal at 11.1±0.2, 12.1±0.2, and 13.6±0.2 °2θ, using Cu K alpha radiation when measured at 25° C.

Embodiment 52. The crystalline form of embodiment 1 or any one of embodiments 50-51, having at least one additional X-ray powder diffraction signal at 22.5±0.2 or 26.3±0.2 °2θ using Cu K alpha radiation when measured at 25° C.

Embodiment 53. The crystalline form of embodiment 1 or any one of embodiments 50-52, having at least one additional X-ray powder diffraction signal at 16.7±0.2 or 28.0±0.2 °2θ using Cu K alpha radiation when measured at 25° C.

Embodiment 54. The crystalline form of embodiment 53, having additional X-ray powder diffraction signal at 16.7±0.2 and 28.0±0.2 °2θ using Cu K alpha radiation when measured at 25° C.

Embodiment 55. The crystalline form of embodiment 1 or any one of embodiments 50-54, having at least one additional X-ray powder diffraction signal at 14.8±0.2, 15.5±0.2, 16.1±0.2, 18.2±0.2, 19.7±0.2, 19.9±0.2, 20.1±0.2, 20.4±0.2, 21.6±0.2, 24.4±0.2, 24.8±0.2, 27.0±0.2, or 27.4±0.2 °2θ using Cu K alpha radiation when measured at 25° C.

Embodiment 56. The crystalline form of embodiment 55, having additional X-ray powder diffraction signal at 14.8±0.2, 15.5±0.2, 16.1±0.2, 18.2±0.2, 19.7±0.2, 19.9±0.2, 20.1±0.2, 20.4±0.2, 21.6±0.2, 24.4±0.2, 24.8±0.2, 27.0±0.2, and 27.4±0.2 °2θ using Cu K alpha radiation when measured at 25° C.

Embodiment 57. The crystalline form of embodiment 1 or any one of embodiments 50-56, having at least one additional X-ray powder diffraction signal at 5.6±0.2, 13.1±0.2, 20.4±0.2, 29.4±0.2, 32.5±0.2, 33.6±0.2, 34.7±0.2, 38.0±0.2, or 39.6±0.2 °2θ using Cu K alpha radiation when measured at 25° C.

Embodiment 58. The crystalline form of embodiment 1 or any one of embodiments 50-57, characterized by an endothermic event, such as by a single endothermic event, between about 221° C. to about 230° C., as measured by differential scanning calorimetry (DSC), such as DSC with a heating rate of 10.0° C./min.

Embodiment 59. The crystalline form of embodiment 1 or any one of embodiments 50-58, characterized by an onset temperature between about 221.5° C. to about 221.9° C., as measured by DSC, such as DSC with a heating rate of 10.0° C./min.

Embodiment 60. The crystalline form of embodiment 1 or any one of embodiments 50-59, characterized by a peak temperature between about 225.0° C. to about 225.8° C., as measured by DSC, such as DSC with a heating rate of 10.0° C./min.

Embodiment 61. The crystalline form of embodiment 1 or any one of embodiments 50-60, characterized by an onset temperature between about 221.5° C. to about 221.9° C., and a peak temperature between about 225.0° C. to about 225.8° C., as measured by DSC, such as DSC with a heating rate of 10.0° C./min.

Embodiment 62. The crystalline form of embodiment 1 or any one of embodiments 50-61, characterized by a mass loss of about 0.5-1%, as measured by thermogravimetric analysis (TGA).

Embodiment 63. The crystalline form of embodiment 1 or any one of embodiments 50-62, wherein the morphology of the form comprises rhombohedral plates, such as rhombohedral plates of between about 5 microns and about 40 microns in diameter.

Embodiment 64. The crystalline form embodiment 1 or of any one of embodiments 50-63, characterized by water uptake of about 1.03% weight gain between 5-95% relative humidity (RH) as measured by Dynamic Vapor Sorption (DVS).

Embodiment 65. The crystalline form of embodiment 1 or any one of embodiments 50-64, wherein the crystalline form is anhydrous.

Embodiment 66. The crystalline form of embodiment 1 or any one of embodiments 50-65, wherein the crystalline form is not a solvate.

Embodiment 67. The crystalline form of embodiment 1 or any one of embodiments 50-66, characterized by having an X-ray powder diffraction (XRPD) pattern substantially similar to that as set forth in FIG. 3A.

Embodiment 68. The crystalline form of embodiment 1 or any one of embodiments 50-67, characterized by having thermogravimetric analysis (TGA) scan substantially similar to that as set forth in FIG. 3D.

Embodiment 69. The crystalline form of embodiment 1 or any one of embodiments 50-68, characterized by having differential scanning calorimetry (DSC) scan substantially similar to that as set forth in FIG. 3E.

Embodiment 70. The crystalline form of embodiment 1 or any one of embodiments 50-69, wherein the freebase form of Compound 1 is Form II.

Embodiment 71. The crystalline form of embodiment 1 or any one of embodiments 50-70, wherein the freebase form of Compound 1 is pure-phase Form II.

Embodiment 72. The crystalline form of embodiment 1, having an X-ray powder diffraction signal at 6.4±0.2 °2θ, and having at least one additional signal at 10.2±0.2 or 12.7±0.2 °2θ, using Cu K alpha radiation when measured at 25° C.

Embodiment 73. The crystalline form of embodiment 1 or 72, having an X-ray powder diffraction signal at 6.4±0.2, 10.2±0.2, and 12.7±0.2 °2θ, using Cu K alpha radiation when measured at 25° C.

Embodiment 74. The crystalline form of embodiment 1 or any one of embodiments 72-73, having at least one additional X-ray powder diffraction signal at 17.8±0.2, 18.1±0.2, 20.7±0.2, or 21.8±0.2 °2θ using Cu K alpha radiation when measured at 25° C.

Embodiment 75. The crystalline form of embodiment 1 or any one of embodiments 72-74, having at least one additional X-ray powder diffraction signal at 8.6±0.2, 16.3±0.2, 17.2±0.2, 23.4±0.2, 24.7±0.2, 24.9±0.2, 25.4±0.2, 25.5±0.2, 26.3±0.2, or 26.6±0.2 °2θ using Cu K alpha radiation when measured at 25° C.

Embodiment 76. The crystalline form of embodiment 1 or any one of embodiments 72-75, having at least one additional X-ray powder diffraction signal at 15.0±0.2, 19.5±0.2, 20.5±0.2, 22.2±0.2, 22.6±0.2, 28.1±0.2, 29.2±0.2, 32.4±0.2, 33.5±0.2, or 37.9±0.2 °2θ using Cu K alpha radiation when measured at 25° C.

Embodiment 77. The crystalline form of embodiment 1 or any one of embodiments 72-76, characterized by a single endothermic event between about 220° C. to about 245° C., as measured by differential scanning calorimetry (DSC).

Embodiment 78. The crystalline form of embodiment 1 or any one of embodiments 72-77, characterized by an onset temperature between about 221.5° C. to about 229.4° C., such as between about 224° C. to about 229° C. as measured by DSC.

Embodiment 79. The crystalline form of embodiment 1 or any one of embodiments 72-78, characterized by a peak temperature between about 228° C. to about 232° C., such as between about 230.0° C. to about 231.5° C., or such as between about 229.0° C. to about 230.0° C., as measured by DSC.

Embodiment 80. The crystalline form of embodiment 1 or any one of embodiments 72-79, characterized by a mass loss of about 0.1-0.5% as measured by thermogravimetric analysis (TGA).

Embodiment 81. The crystalline form of embodiment 1 or any one of embodiments 72-80, wherein the morphology of the form comprises rectangular plates.

Embodiment 82. The crystalline form of embodiment 1 or any one of embodiments 72-81, wherein the crystalline form is anhydrous.

Embodiment 83. The crystalline form of embodiment 1 or any one of embodiments 72-82, wherein the crystalline form is not a solvate.

Embodiment 84. The crystalline form of embodiment 1 or any one of embodiments 72-83, characterized by having an X-ray powder diffraction (XRPD) pattern substantially similar to the XRPD pattern as set forth in FIG. 4A.

Embodiment 85. The crystalline form of embodiment 1 or any one of embodiments 72-84, characterized by having thermogravimetric analysis (TGA) scan substantially similar to the TGA scan as set forth in FIG. 4D.

Embodiment 86. The crystalline form of embodiment 1 or any one of embodiments 72-85, characterized by having differential scanning calorimetry (DSC) scan substantially similar to the DSC scan as set forth in FIG. 4E.

Embodiment 87. The crystalline form of embodiment 1, wherein the freebase form of Compound 1 is pure-phase Form III.

Embodiment 88. The crystalline form of embodiment 1, having an X-ray powder diffraction signal at 16.0±0.2 °2θ, and having at least one additional signal at 6.5±0.2, 8.5±0.2, or 10.2±0.2 °2θ, using Cu K alpha radiation when measured at 25° C.

Embodiment 89. The crystalline form of embodiment 1 or 88, having an X-ray powder diffraction signal at:
a. 6.5±0.2, 8.5±0.2, and 16.0±0.2 °2θ, using Cu K alpha radiation when measured at 25° C.;
b. 6.5±0.2, 10.2±0.2, and 16.0±0.2 °2θ, using Cu K alpha radiation when measured at 25° C.; or
c. 8.5±0.2, 10.2±0.2, and 16.0±0.2 °2θ, using Cu K alpha radiation when measured at 25° C.

Embodiment 90. The crystalline form of embodiment 1 or any one of embodiments 88-89, having at least one additional X-ray powder diffraction signal at 18.0±0.2, 20.5±0.2, 21.0±0.2, or 22.0±0.2 °2θ using Cu K alpha radiation when measured at 25° C.

Embodiment 91. The crystalline form of embodiment 1 or any one of embodiments 88-90, having at least one additional X-ray powder diffraction signal at 16.9±0.2, 20.4±0.2, 22.6±0.2, 23.4±0.2, 24.4±0.2, 25.1±0.2, or 27.2±0.2 °2θ using Cu K alpha radiation when measured at 25° C.

Embodiment 92. The crystalline form of embodiment 1 or any one of embodiments 88-91, having at least one additional X-ray powder diffraction signal at 12.9±0.2, 15.1±0.2, 17.2±0.2, 18.9±0.2, 24.8±0.2, 25.9±0.2, 26.0±0.2, 28.2±0.2, 29.7±0.2, 30.7±0.2, 31.5±0.2, 33.5±0.2, 35.7±0.2, 37.4±0.2, or 39.5±0.2 °2θ using Cu K alpha radiation when measured at 25° C.

Embodiment 93. The crystalline form of embodiment 1 or any one of embodiments 88-92, characterized by a single exotherm event between about 185° C. to 205° C., and by a single endothermic event between about 215° C. to about 240° C., as measured by differential scanning calorimetry (DSC).

Embodiment 94. The crystalline form of embodiment 1 or any one of embodiments 88-93, characterized by an onset temperature of the exothermic event from about 192.2° C. to about 195.1° C., as measured by DSC.

Embodiment 95. The crystalline form of embodiment 1 or any one of embodiments 88-94, characterized by an onset temperature of the endothermic event between about 226.7° C. to about 227.6° C., as measured by DSC.

Embodiment 96. The crystalline form of embodiment 1 or any one of embodiments 88-95, characterized by a peak temperature between about 229.6° C. to about 229.8° C., as measured by DSC.

Embodiment 97. The crystalline form of embodiment 1 or any one of embodiments 88-96, characterized by a mass loss of about 0.3-0.8% as measured by thermogravimetric analysis (TGA).

Embodiment 98. The crystalline form of embodiment 1 or any one of embodiments 88-97, wherein the morphology of the form comprises needles.

Embodiment 99. The crystalline form of embodiment 1 or any one of embodiments 88-98, wherein the crystalline form is anhydrous.

Embodiment 100. The crystalline form of embodiment 1 or any one of embodiments 88-99, wherein the crystalline form is not a solvate.

Embodiment 101. The crystalline form of embodiment 1 or any one of embodiments 88-100, characterized by having an X-ray powder diffraction (XRPD) pattern substantially similar to that as set forth in FIG. 5A.

Embodiment 102. The crystalline form of embodiment 1 or any one of embodiments 88-101, characterized by having thermogravimetric analysis (TGA) scan substantially similar to that as set forth in FIG. 5D.

Embodiment 103. The crystalline form of embodiment 1 or any one of embodiments 88-102, characterized by having differential scanning calorimetry (DSC) scan substantially similar to that as set forth in FIG. 5E.

Embodiment 104. The crystalline form of embodiment 1 or any one of embodiments 88-103, wherein the freebase form of Compound 1 is pure-phase Form IV.

Embodiment 105. A crystalline freebase form of Compound 1:

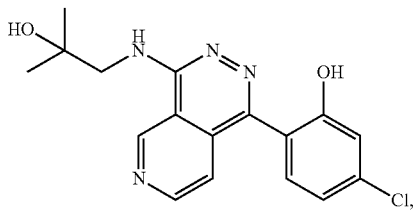

(i) having an X-ray powder diffraction signal at 6.8±0.2, 11.7±0.2, 18.9±0.2, 20.5±0.2, 22.9±0.2, 23.8±0.2, 23.9±0.2, and 26.5±0.2 °2θ, using Cu K alpha radiation when measured at 25° C.; and (ii) characterized by a single endothermic event between about 215° C. to about 230° C., as measured by differential scanning calorimetry (DSC), with an onset temperature between about 227.5 to about 227.7° C., and a peak temperature between about 228.8 to about 229.9° C., as measured by DSC, such as DSC with a heating rate of 10.0° C./min.

Embodiment 106. A crystalline freebase form of Compound 1:

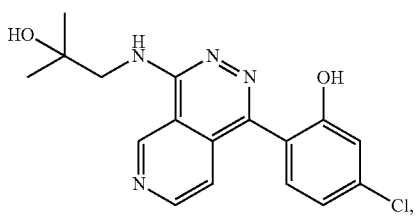 [SMILES: CC(C)(O)CNc1nnc(-c2ccc(Cl)cc2O)c2ccncc12]

(i) having an X-ray powder diffraction signal at 6.8±0.2, 11.7±0.2, 18.9±0.2, 20.5±0.2, 22.9±0.2, 23.8±0.2, 23.9±0.2, and 26.5±0.2 °2θ, using Cu K alpha radiation when measured at 25° C.; (ii) characterized by a single endothermic event between about 215° C. to about 230° C., as measured by differential scanning calorimetry (DSC), with an onset temperature between about 227.5 to about 227.7° C., and a peak temperature between about 228.8 to about 229.9° C., as measured by DSC, such as DSC with a heating rate of 10.0° C./min, and (iii) wherein the crystalline form is anhydrous.

Embodiment 107. A crystalline freebase form of Compound 1:

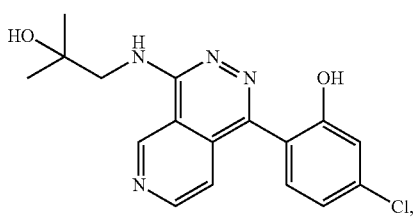 [SMILES: CC(C)(O)CNc1nnc(-c2ccc(Cl)cc2O)c2ccncc12]

(i) having an X-ray powder diffraction signal at 11.1±0.2, 12.1±0.2, 13.6±0.2 °2θ, 22.5±0.2 and 26.3±0.2 °2θ using Cu K alpha radiation when measured at 25° C.; and (ii) characterized by a single endothermic event between about 221° C. to about 230° C., as measured by differential scanning calorimetry (DSC), with an onset temperature between about 221.5° C. to about 221.9° C., and a peak temperature between about 225.0° C. to about 225.8° C., as measured by DSC, such as DSC with a heating rate of 10.0° C./min.

Embodiment 108. A crystalline freebase form of Compound 1:

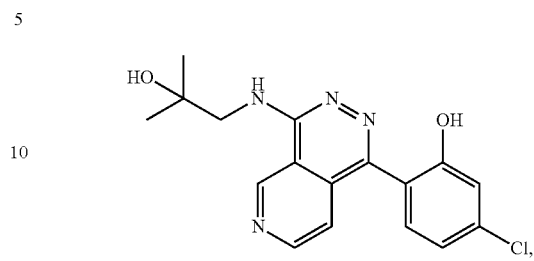

(i) having an X-ray powder diffraction signal at 11.1±0.2, 12.1±0.2, 13.6±0.2 °2θ, 22.5±0.2 and 26.3±0.2 °2θ using Cu K alpha radiation when measured at 25° C.; (ii) characterized by a single endothermic event between about 221° C. to about 230° C., as measured by differential scanning calorimetry (DSC), with an onset temperature between about 221.5° C. to about 221.9° C., and a peak temperature between about 225.0° C. to about 225.8° C., as measured by DSC, such as DSC with a heating rate of 10.0° C./min; and (iii) wherein the crystalline form is anhydrous.

Embodiment 109. The crystalline form of any one of embodiments 77-79, 93-96, 103 and 105-108, wherein said DSC measurement is performed with a heating rate of 10.0° C./min and/or using a TA Discovery DSC and/or on a sample of 1-5 mg.

Embodiment 110. Amorphous Compound 1 freebase:

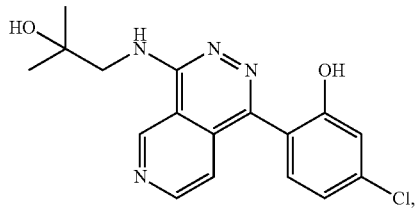

having a single broad halo signal between about 10 to about 32 °2θ using Cu K alpha radiation when measured at 25° C.

Embodiment 111. The amorphous freebase of embodiment 110 characterized by having an X-ray powder diffraction pattern substantially similar FIG. 1A.

Embodiment 112. The crystalline form of any one of embodiments 1-111, wherein the crystalline form is substantially free of:
  a) amorphous freebase characterized as set forth in the X-ray powder diffraction pattern of FIG. 1A;
  b) crystalline Compound 1 freebase characterized as set forth in the X-ray powder diffraction pattern of FIG. 7A;
  c) crystalline Compound 1 freebase characterized as set forth in the X-ray powder diffraction pattern of FIG. 7C; and/or
  d) crystalline Compound 1 freebase characterized as set forth in the X-ray powder diffraction pattern of FIG. 7D.

Embodiment 113. A composition comprising a mixture Compound 1 freebase forms, wherein 75% of the mixture is the crystalline form of any one of embodiments 1-109.

Embodiment 114. The composition of embodiment 113, wherein 95% of the mixture is the crystalline form of any one of embodiments 1-109.

Embodiment 115. A composition comprising a mixture Compound 1 freebase forms, wherein 75% of the mixture is the crystalline form of any one of embodiments 2-32 or of embodiments 105-106.

Embodiment 116. A composition comprising a mixture Compound 1 freebase forms, wherein 95% of the mixture is the crystalline form of any one of embodiments 2-32 or of embodiments 105-106.

Embodiment 117. A composition comprising a mixture Compound 1 freebase forms, wherein 75% of the mixture is the crystalline form of any one of embodiments 50-71 or of embodiments 107-108.

Embodiment 118. A composition comprising a mixture Compound 1 freebase forms, wherein 95% of the mixture is the crystalline form of any one of embodiments 50-71 or of embodiments 107-108.

Embodiment 119. The composition of any one of embodiments 113-118, wherein the pharmaceutical composition further comprises one or more pharmaceutically acceptable carrier.

Embodiment 120. A pharmaceutical composition comprising a form of any one of embodiments 1-112, and a pharmaceutically acceptable carrier.

Embodiment 121. A method of treating a disease or disorder, the method comprising administering to a subject a form of any one of embodiments 1-112, or a composition of any one of embodiments 113-120.

Embodiment 122. The method of embodiment 121, wherein the disease or disorder is a disease or disorder of the central nervous system (CNS), a disease or disorder of the peripheral nervous system (PNS), a primary neurological disease of the muscles, an inflammatory disorder, an autoimmune disorder, cancer, an infection, a metabolic disease, a cardiovascular disease, a respiratory disease, a kidney disease, a liver disease, an ocular disease, a skin disease, a lymphatic disease, a rheumatic disease, a psychological disease, graft versus host disease, pain (including disorders related to pain management), or an NLRP3-related disease in a subject that has been determined to carry a germline or somatic non-silent mutation in NLRP3.

Embodiment 123. A method of preparing a solid state form of Compound 1 freebase of any one of the preceding embodiments, as described herein and/or in the Examples.

OTHER EMBODIMENTS

This application refers to various patents and publications, each of which is incorporated herein by reference. The foregoing has been described of non-limiting embodiments of the present disclosure. Those of ordinary skill in the art will appreciate that various changes and modifications to this description may be made without departing from the spirit or scope of the present disclosure, as defined in the following claims.

The invention claimed is:

1. A crystalline freebase form of Compound 1:

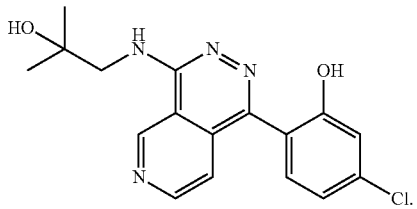 [SMILES: CC(C)(O)CNc1nnc(-c2ccc(Cl)cc2O)c2ccncc12]

2. The crystalline form of claim 1, having an X-ray powder diffraction signal at 6.8±0.2 or 11.7±0.2 °2θ, and having at least one additional signal at 18.9±0.2, 20.5±0.2, or 22.9±0.2 °2θ, using Cu K alpha radiation when measured at 25° C.

3. The crystalline form of claim 1, having an X-ray powder diffraction signal at:
   (a) 6.8±0.2, 18.9±0.2, and 20.5±0.2 °2θ, using Cu K alpha radiation when measured at 25° C.;
   (b) 6.8±0.2, 20.5±0.2, and 22.9±0.2 °2θ, using Cu K alpha radiation when measured at 25° C.;
   (c) 11.7±0.2, 18.9±0.2, and 20.5±0.2 °2θ, using Cu K alpha radiation when measured at 25° C.; or
   (d) 11.7±0.2, 20.5±0.2, and 22.9±0.2 °2θ, using Cu K alpha radiation when measured at 25° C.

4. The crystalline form of claim 1, having an X-ray powder diffraction signal at 6.8±0.2, 11.7±0.2, 18.9±0.2, 20.5±0.2, 22.9±0.2, 23.8±0.2, 23.9±0.2, and 26.5±0.2 °2θ, using Cu K alpha radiation when measured at 25° C.

5. The crystalline form of claim 1, characterized by a single endothermic event, between about 215° C. to about 230° C., as measured by differential scanning calorimetry (DSC).

6. The crystalline form of claim 5, characterized by an onset temperature between about 227.5 to about 227.7, as measured by DSC and/or by a peak temperature between about 228.8 to about 229.9, as measured by DSC.

7. The crystalline form claim 1, characterized by a mass loss of about 0.1%-0.5%, as measured by thermogravimetric analysis (TGA).

8. The crystalline form of claim 5, characterized by having thermogravimetric analysis (TGA) scan wherein the mass loss up to the endotherm was 0.16 weight percent (wt. %).

9. The crystalline form of claim 1, characterized by having an X-ray powder diffraction (XRPD), signal at 11.1±0.2, 12.1±0.2, 13.6±0.2, 16.1±0.2, 16.7±0.2, 18.2±0.2, 22.5±0.2, 24.4±0.2, 24.8±0.2, 26.3±0.2, and 28.0±0.2 °2θ, using Cu K alpha radiation when measured at 25° C.

10. A crystalline freebase form of Compound 1:

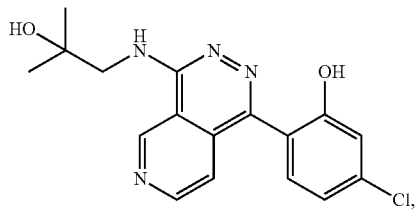

having an X-ray powder diffraction signal at 6.8±0.2, 11.7±0.2, 18.9±0.2, 20.5±0.2, 22.9±0.2, 23.8±0.2, 23.9±0.2, and 26.5±0.2 °2θ, using Cu K alpha radiation when measured at 25° C., and characterized by a single endothermic event between about 215° C. to about 230° C., as measured by differential scanning calorimetry (DSC), with an onset temperature between about 227.5 to about 227.7° C., and a peak temperature between about 228.8 to about 229.9° C., as measured by DSC, and wherein the crystalline form is anhydrous.

11. Amorphous Compound 1 freebase:

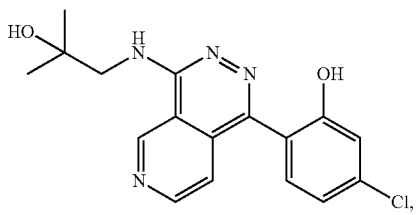 [SMILES: CC(C)(O)CNc1nnc(-c2ccc(Cl)cc2O)c2ccncc12]

having a single broad halo signal between about 10 to about 32° 2θ using Cu K alpha radiation when measured at 25° C.

12. A composition comprising a mixture of 5-chloro-2-(4-((2-hydroxy-2-methylpropyl)amino)pyrido[3,4-d]pyridazin-1-yl)phenol freebase forms, wherein 75% of the mixture is the crystalline form of claim 1.

13. A composition comprising a mixture of 5-chloro-2-(4-((2-hydroxy-2-methylpropyl)amino)pyrido[3,4-d]pyridazin-1-yl)phenol freebase forms, wherein 75% of the mixture is the crystalline form of claim 12.

14. A composition comprising a mixture of 5-chloro-2-(4-((2-hydroxy-2-methylpropyl)amino)pyrido[3,4-d]pyridazin-1-yl)phenol freebase forms, wherein 75% of the mixture is the crystalline form of claim 13.

15. A pharmaceutical composition comprising a compound of claim 1 and one or more pharmaceutically acceptable carriers.

16. A pharmaceutical composition comprising a compound of claim 10 and one or more pharmaceutically acceptable carriers.

17. A pharmaceutical composition comprising a compound of claim 11 and one or more pharmaceutically acceptable carriers.

18. A method of treating nonalcoholic fatty liver disease (NAFLD) or non-alcoholic steatohepatitis (NASH) comprising administering to a subject in need thereof an effective amount of a compound of claim 1.

19. A method of treating nonalcoholic fatty liver disease (NAFLD) or non-alcoholic steatohepatitis (NASH) comprising administering to a subject in need thereof an effective amount of a compound of claim 10.

20. A method of treating nonalcoholic fatty liver disease (NAFLD) or non-alcoholic steatohepatitis (NASH) comprising administering to a subject in need thereof an effective amount of a compound of claim 11.

21. A method of treating acute kidney disease, chronic kidney disease, or a rare kidney disease comprising administering to a subject in need thereof an effective amount of a compound of claim 1.

22. A method of treating acute kidney disease, chronic kidney disease, or a rare kidney disease comprising administering to a subject in need thereof an effective amount of a compound of claim 10.

23. A method of treating acute kidney disease, chronic kidney disease, or a rare kidney disease comprising administering to a subject in need thereof an effective amount of a compound of claim 11.

24. A method of treating cardiovascular disease or stroke comprising administering to a subject in need thereof an effective amount of a compound of claim 1.

25. A method of treating cardiovascular disease or stroke comprising administering to a subject in need thereof an effective amount of a compound of claim 10.

26. A method of treating cardiovascular disease or stroke comprising administering to a subject in need thereof an effective amount of a compound of claim 11.

* * * * *